United States Patent [19]

Kotoh et al.

[11] Patent Number: 5,660,588
[45] Date of Patent: Aug. 26, 1997

[54] AIR-DIRECTION ADJUSTING APPARATUS IN AIR-CONDITIONING EQUIPMENT

[75] Inventors: Satoru Kotoh, Hyogo; Kiyoshi Sakuma, Shizuoka; Takayuki Yoshida, Shizuoka; Hiromi Sano, Shizuoka; Katuyuki Aoki, Shizuoka; Shin'ichi Suzuki, Shizuoka; Hideaki Koizumi, Shizuoka; Kaoru Yamamoto, Shizuoka; Kunio Matsushita, Shizuoka; Kenichi Unno, Shizuoka; Tomoko Oguma, Shizuoka, all of Japan

[73] Assignee: Mitsubishi Denki Kabushiki Kaisha, Tokyo, Japan

[21] Appl. No.: 202,258

[22] Filed: Feb. 25, 1994

[30] Foreign Application Priority Data

Mar. 5, 1993 [JP] Japan .................................. 5-045142
Aug. 24, 1993 [JP] Japan .................................. 5-209419

[51] Int. Cl.$^6$ .................................................. F24F 13/15
[52] U.S. Cl. ........................................ 454/285; 454/320
[58] Field of Search ............................. 454/153, 285, 454/320

[56] References Cited

U.S. PATENT DOCUMENTS

| | | | |
|---|---|---|---|
| 1,725,353 | 8/1929 | Hinrich | 454/320 |
| 3,063,357 | 11/1962 | Eberhart | 454/320 |
| 3,330,202 | 7/1967 | Colle | 454/285 |
| 5,176,568 | 1/1993 | Nagatomo et al. | |
| 5,299,978 | 4/1994 | Dennis et al. | 454/285 |
| 5,354,235 | 10/1994 | Rittle et al. | 454/285 |

FOREIGN PATENT DOCUMENTS

| | | | |
|---|---|---|---|
| 58-69735 | 5/1983 | Japan . | |
| 61-265442 | 11/1986 | Japan . | |
| 61-268942 | 11/1986 | Japan | 454/153 |

OTHER PUBLICATIONS

Patent Abstracts of Japan, vol. 13, no. 462, Oct. 19, 1989, JP-A-01 181 035, Jul. 19, 1989.

*Primary Examiner*—Harold Joyce
*Attorney, Agent, or Firm*—Oblon, Spivak, McClelland, Maier & Neustadt, P.C.

[57] ABSTRACT

A mechanism for controlling the flow of air from an air-conditioning unit includes a row of guide vanes which are pivotally held by an outlet nozzle. The guide vanes are located at the lower end of an air course which has been formed within a body of the air-conditioning unit. The guide vanes control the flow of air in both left and right directions. This new design is characterized in that the angle of inclination of each guide vane progressively changes toward the end of the row. The air flow is controlled accurately in both the left and right directions so that the air flow reaches the desired location.

10 Claims, 35 Drawing Sheets

AVERAGE VANE ANGLE ±45°

VANE ANGLE 45°

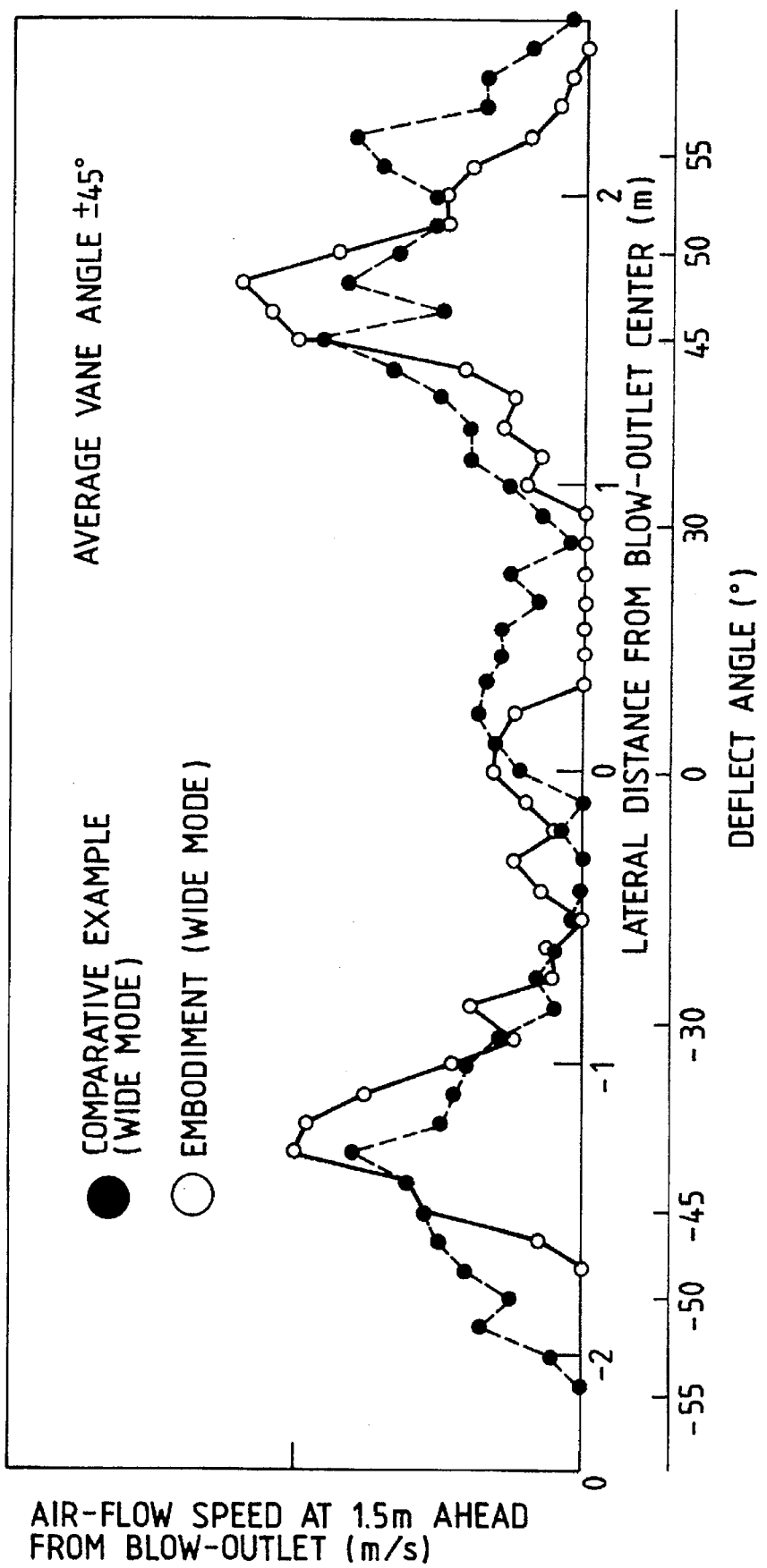

AIR-DIRECTION ADJUSTING APPARATUS IN AIR-CONDITIONING EQUIPMENT

BACKGROUND OF THE INVENTION

1. Field of the Invention

The present invention relates to a mechanism which controls a direction of air flow from an outlet of an air-conditioning unit.

2. Description of the Related Art

FIGS. 60–62 show the air-directing control mechanism in a conventional air conditioning unit as disclosed in the unexamined Japanese Utility Model Publication No. Sho-58-69735. FIG. 60 shows the body of an air-conditioning unit, FIG. 61 shows a cross section of the body of FIG. 60, and FIG. 62 shows a vertical section of the body of FIG. 60.

In the figures, the reference numeral 1 represents the body of an air conditioning unit, 2 represents a front panel having an air inlet 3 which covers the front surface of the body 1, 4 represents an air-outlet having an opening at a front lower portion of the body 1, 5 represents a heat exchanger oriented so as to face air inlet 3, 6 represents a casing which is situated inside of the main body 1 which enables an air course 13 to be formed, 7 represents a movable vane situated close to the air outlet 4 and is pivotally mounted to the left and right side walls 11 and 15 of the front panel to by a shaft 16 which is mounted to the left and right end portions of the air-outlet 4. Movable vane 7 changes the air direction both horizontally, vertically, or any combination of these directions. Reference numeral 8 represents a series of parallel guide vanes which run between walls 10 and 14 of the left and right side portions of an air outlet nozzle 9 so as to be held by a pivotal shaft 17 and to change the air direction from the left side to the right side, 9 represents an air outlet nozzle and is positioned under the inner casing 6 to thereby provide an air course, 12 represents a line flow fan located on the air course 13 before the air outlet 4 and is driven by motor 18, and 19 represents coiled springs suspended from the shaft 16.

FIG. 63 shows the layout of the right guide vanes depicted in FIG. 62, and FIG. 64 shows one of the guide vanes depicted in FIG. 63.

In the figures, the reference numeral 20 represents left/right movable rod which is pivotally mounted to the row of guide vanes 8 by shafts 21. This rod enables the angles of the guide vanes 8 to be simultaneously changed to an arbitrary valve in either the left or right direction.

The operation of the apparatus will be described below. When the line flow fan 12 is driven in a conventional air conditioning unit constructed as described above, air is sucked from the room through the inlet 3, passes through the heat exchanger 5 and is cooled in a cooling mode or heated in a heating mode. The air is then drawn down the air course 13 as blown out to the room through the air outlet 4. This flow of air is represented by the arrow U in FIG. 61. The upward/downward air direction and the leftward/rightward air direction are adjusted by the movable vane 7 and the guide vanes 8, respectively. The shafts 21 that pivotally hold the guide vanes 8 and the leftward/rightward movable rod 20 are connected to the shaft 17 that pivotally holds the guide vanes 8. These are connected at intervals of a predetermined distance, enabling all of the guide vanes 8 to be turned in the same direction at the same time. This is controlled on the basis of the displacement quantity +A supplied to the leftward/rightward movable rod 20.

Due to design restrictions it is not possible to expose the movable vane 7 and the guide vanes 8 to the outside of the front panel 2. It is necessary to position the movable vane 7 to the outermost part of the air-outlet because this vane 7 must also serve as a blocking cover for the air outlet. Accordingly, the guide vanes 8 cannot be positioned further back from the air outlet than movable vane 7. In this case, the operation of the mechanism which controls the direction of air flow is as follows. For example, when the leftward/rightward movable rod 20 is moved to the right by a displacement quantity +A as shown in FIG. 63, the guide vanes 8 will direct the air to the right side. Air will then be reflected by the surface of the wall 14 and a forward straight air current will be formed before the air is blown out. In this case, the flow of air in the direction of the guide vanes is represented by $W_2$ and the flow of air after reflection is represented by $V_2$. The flow $W_2$ is disturbed by the flow $V_2$ so that it is deflected according to the vector representing the direction of $(V_2+W_2)$. As a result, the outlet air direction cannot be accurately controlled in a conventional air conditioning unit even in the case where the air direction is said to be at a left-rightwise oblique angle with respect to the air-conditioning equipment.

FIGS. 65 and 66 show another mechanism for controlling the direction of air in a conventional air-conditioning unit as described in Japanese Utility Model Unexamined Publication No. Sho-63-147650. FIG. 65 is a cross section of the apparatus and FIG. 66 shows the operating state of the apparatus depicted in FIG. 65. In the figures, the reference numeral 201 represents an air-outlet, 202 represents the inner wall of the air-outlet 201, and 203 represents two rows of vanes. These vanes are located at equal intervals and change the air direction.

The reference numeral 204 represents shafts which are connected to the vanes 203 and enable them to be connected to the inner wall 202.

The reference numeral 205 represents connection arms each of which connects the groups of vanes 203. Connection shafts 206 pivotally hold the other edge side of the arm with respect to shafts 204 of the vanes 203 are joined. As shown in FIG. 65, the connection shafts 206 are arranged in a line inclined with respect to a line connecting the respecter shafts 204 of the vanes 203 so that the distance between the shaft 204 of the vane 203 furthest from the inner wall 202 (inner vane) and the connection shaft 206 in FIG. 65 is said to be shorter than the distance between the shaft 204 of the vane 203 closest to inner wall 202 (outer vane) and the connection shaft 206 in FIG. 65.

The configuration of a mechanism for controlling the direction of air from a conventional air conditioning unit is shown in FIGS. 65 and 66 and has been described above. As shown in FIG. 66, this mechanism is used such that two groups of vanes 203 are arranged with their lower portions spread out. In this condition, the inclination of inner vane 203 in FIG. 66 is nearer to the horizontal line than the inclination of outer vane 203 in FIG. 66. Accordingly, the respective angles of blown air deflected by the vanes 203 are formed as represented by the solid arrows in FIG. 66 so that the inclination of the inner vane 203 is nearer to the horizontal line than the inclination of the outer vane 203.

Further, a narrow gap is formed at a center portion between the two groups of vanes 203. Accordingly, air 207 blow out through this gap cannot flow smoothly, so that the air flow 207 is weakened. As a result, secondary air 208 in the vicinity of the air 207 is entrained, so that a dew 209 is produced on the vanes 203.

As the air directing apparatus in conventional indoor units is configured as described above, in general blown air currents are deflected toward the front of the indoor unit. This resultant deflection can be attributed to the fact that the air flow is reflected from both the nozzles and from the right and left walls of the front panel. It becomes apparent that the resulting air current cannot be made to arrive accurately at the point aimed at. This occurs particularly when the blown air current is controlled by using a human body sensor so the direction of the air flow tracks a human's location.

In the aforementioned mechanism for controlling the direction of air flow, when the left/right deflection rod 20 is moved by a large displacement, the pressure loss caused by the guide vanes 8 increases so that the quantity of air blown out of the air-outlet 4 through the air course 13 is extremely reduced. As a result, particularly in an air heating mode, heated air is blown upwards so that the heated air cannot reach the floor of the living room.

As the temperature of the blown air is lowered in an air cooling mode, dew is deposited onto respective portions of the air-outlet 4 and the units body 1. This can result in dew droplets falling into the space being air conditioned and/or it can promote mildew growth. Further, more of the blown air falls down to the floor near the air-conditioning equipment rather than being blown in a forward direction as in the previous case. Accuracy in controlling an air currents direction is undoubtedly lowered.

Due to the fact that the air direction is primarily controlled by the guide vanes 8, the air current is separated so that dew is deposited onto respective parts of the air outlet 4 in an air cooling mode. Furthermore, in the case where the air conditioning equipment is positioned close to a wall on the conditioned space, the blown air currents are deflected on the wall so that this air current is sucked into the equipment through the suction inlet 3. Accordingly, the air current does not circulate in the living rooms so that a comfortable environment cannot be achieved.

In order to prevent the aforementioned problem, it is necessary to limit the deflection angle of the left/right air deflection plates. In conventional apparatuses this has been done, although this limited angle similarly limits the flow direction in an air heating mode when there is no dew deposition and also when the unit is not mounted near a wall. In these cases an uneven space temperature may result in a subsequent lack of comfort.

In the air directing mechanism used in conventional air-conditioning units as shown in FIGS. 65 or in 66, the respective vanes 203 are produced while the distances between the shafts 204 and the connection shafts 206 are successively changed in accordance with the positions of the arrangement of the vanes 203. The production and assembly of these vanes 203 requires lengthy labor time.

Furthermore, a narrow gap is formed between the two groups of vanes 203. Accordingly, the air 207 blown out through this gap is weak so that secondary air 208 in the close vicinity is entrained. Dew 209 will thus be deposited on the vanes 203 and eventually fall down into the space to be air-conditioned.

In addition, it is difficult to ensure that the vanes 203 at the pivotally mounted portions are able to move smoothly and noiselessly.

SUMMARY OF THE INVENTION

The present invention solves the aforementioned problems. Subsequently, the first object of the present invention is to provide a mechanism to accurately control the air flow from left to right and to ensure that the air current accurately reaches the desired position.

The second object of the present invention is to widen the allowable range in which air can be blown into a room and thereby improve space comfort. It is intended that this air direction control mechanism can be both manufactured and assembled easily and cheaply. The third object of this mechanism is to reduce the amount of dew deposition which occurs on the vanes and to substantially reduce the amount of dew which is deposited in the air conditioned space.

The fourth object of this mechanism is to ensure that the rotating operations of the vanes are smooth and have a reduced noise level.

In this mechanism for controlling the direction of air flow from an air-conditioning unit, guide vanes are controlled so that the angle of inclination of each guide vane becomes larger as the end of the arrangement is approached.

In this mechanism for controlling the direction of air flow from an air conditioning unit, the guide vanes are controlled so that only the vanes occupying the positions at the left and right of the arrangement have angles of inclination larger than the other guide vanes so that the space between the guide vanes can be blocked. The angles of inclination of the remaining guide vanes can then be set to be equal to one another in the direction of the air flow.

In this mechanism for controlling the direction of air flow from an air conditioning unit, the side walls of the units body are constructed of smoothly curved surfaces so that their cross-sectional area gradually becomes larger as the outlet of the unit is approached.

The guide vanes will preferably be controlled by two driving systems. These driving systems will swing the guide vanes from left to right and make the inclinations of the guide vanes independent of one another.

In this mechanism for controlling the direction of air flow from an air-conditioning unit, only one driving system is used to swing the guide vanes from left to right and this is performed via a connection rod attached to the guide vanes. The distances between the guide vanes and the connection points of the connection rod are made different from one another.

In this mechanism for controlling the direction of air flow from an air-conditioning unit, the present invention has a structure whereby the guide vanes located to the left and right of the arrangement and the left/right side walls of the unit body are connected to one another. This is achieved via a bellows-like bulkhead without disturbing the motion of the guide vane, and blocks a space between the vane an the side wall of the unit body.

In this mechanism for controlling the direction of air flow from an air conditioning unit, the present invention has the space between the guide vanes located to the left and right of the arrangement and the unit's left/right side walls filled with a sponge-like material.

In accordance with each of the mechanisms mentioned above that control the direction of air flow from an air-conditioning unit, preferably two driving systems (left and right) should be used to accurately and independently control the guide vanes.

In this mechanism for controlling the direction of air flow from an air-conditioning unit, the present invention has a sensor for detecting the location of a human body so that the conditioned air can be directed at this location.

In this mechanism for controlling the direction of air flow from an air-conditioning unit, the present invention has a sensor for detecting the location of human bodies. If these human bodies are in different positions, then the sensor will inform the controller to direct the air-conditioned air to the area where the human bodies are located.

In this mechanism for controlling the direction of air flow from an air-conditioning unit, the present invention ensures that the guide vanes are controlled such that the angle of inclination of each guide vane becomes smaller as the end of the guide vane arrangement is approached.

In this mechanism for controlling the direction of air flow from an air-conditioning unit, the side walls of the unit's body are constructed of smoothly curved surfaces so that the cross-sectional area gradually becomes larger as the outlet of the unit is approached.

In order to accurately control the guide vanes two driving systems are preferably used. These driving systems will swing the guide vanes from left to right and make the inclinations of the guide vanes independent of one another.

In order to control the guide vanes only one driving system is used to swing the guide vanes from left to right and this is performed via a connection rod attached to the guide vanes. The distances between the guide vanes and the connection points of the connection rod are made different from one another.

In this mechanism for controlling the direction of air flow from an air conditioning unit, the present invention has a structure whereby the guide vanes located at the left and right sides of the arrangement and the left/right side walls of the unit body are connected to one another with a bellows-like bulkhead without disturbing the motion of the guide vanes which thereby blocks the space between the vanes and the side walls of the unit body.

In this mechanism for controlling the direction of air flow from an air conditioning unit, the present invention has the space between the guide vanes located at the left and right of the guide vane arrangement and the unit walls filled with a sponge like material.

In accordance with each of the above-mentioned mechanisms for controlling the direction of air flow from an air conditioning unit, preferably two driving systems (left and right) should be used to accurately and independently control the guide vanes.

In this mechanism for controlling the direction of air flow from an air conditioning unit, a sensor for detecting the location of an object so that the conditioned air can be directed to this location is provided.

In this mechanism for controlling the direction of air flow from an air-conditioning unit, the present invention has a sensor for detecting the location of objects. If the objects are in different positions, then the sensor will inform a controller to direct the conditioned air to the areas in which the objects are located.

In this mechanism for controlling the direction of air flow from an air-conditioning unit, the present invention consists of a cross flow fan which is provided in the body of the unit, up/down air deflection plates provided at the air outlet of the unit body, a series of left/right air deflection plates connected to one another, a motor which enables the angles of the left-right air deflection plates to be changed, and a controller which controls the magnitude of the angles of the deflection plates and ensures that the rotational speed of the cross flow fan is increased when the angles of the left/right air deflection plates exceed a predetermined critical value.

In this mechanism for controlling the direction of air flow in an air-conditioning unit, the present invention consists of a cross flow fan which is provided in the body of the unit, up/down air deflection plates provided at the air outlet of the unit body, a series of left/right air deflection plates connected to one another, a motor which enables the angles of the left/right air deflection plates to be changed, and a controller which controls the magnitude of the angles of the left/right deflection plates and ensures that the up/down air deflection plates direct air downward in an air cooling mode and upward in an air heating mode when the angles of said up/down air deflection plates become greater than a predetermined critical value.

In this mechanism for controlling the direction of air flow from an air-conditioning unit, the present invention consists of a cross flow fan which is provided in the body of the unit, up/down air deflection plates provided at the air outlet of the unit body, a series of left/right air deflection plates connected to one another, a motor which enables the angles of the left/right air deflection plates to be changed, and a controller which controls the magnitude of the angles of the left/right air deflection plates and ensures that the angles of these left/right air deflection plates are reduced in an air cooling mode and increased in an air heating mode.

In this mechanism for controlling the direction of air flow from an air-conditioning unit, the present invention comprises a cross flow fan which is provided in the body of the unit, up/down air deflection plates provided at the air outlet of the unit body, a series of left/right air deflection plates connected to one another, a motor which enables the angles of the left/right air deflection plates to be changed, and a controller which controls the magnitude of the angles of the left/right air deflection plates and ensures that these angles are reduced after a predetermined period of time should these angles exceed a critical value upon the start of the air cooling operation.

In this mechanism for controlling the direction of air flow from an air-conditioning unit, the present invention comprises a cross flow fan which is provided in the body of the unit, up/down air deflection plates provided at the air outlet of the unit body, a series of left/right air deflection plates connected to one another, a motor which enables the angles of the left/right air deflection plates to be changed, and a controller which controls the magnitude of the angles of the left/right air deflection plates and ensures that the range of deflection of the left/right air deflection plates is corrected so that the air flow is not directed at a wall when one side of said unit is located near a wall.

In this mechanism for controlling the direction of air flow from an air-conditioning unit, the present invention comprises three types of vanes mounted in the air outlet via a pivotal bearing so as to engage in rotational movement to direct the flow of air. The first and second vanes are located at opposite ends of the series of vanes and both have rotational bearings. The rotational and pivotal bearings of the second vane are closer together than those of the first vane. The rotational bearings of the first and second vanes are connected via a connection arm. From this connection arm, intermediate connection shafts are pivotally connected to movable fittings of the third vane. These movable fittings consist of elongated holes.

In this mechanism for controlling the direction of an air flow from an air-conditioning unit, the present invention comprises three types of vanes mounted in the air outlet via pivotal bearing which engage in rotational movement to direct the flow of air. The first and second vanes are located at opposite ends of the series of vanes and both have rotational bearings. The rotational and pivotal bearings of the second vane are closer together than those of the first vane. The rotational bearings of the first and second vanes are connected via a connection arm. From this connection arm, intermediate connection shafts are pivotally connected to the movable fittings of the third vane. These movable fittings consist of bearings located above an elongated hole which is equal in length to the bottom of the third vane. This bearing pivotally holds the intermediate joint shaft which is connected to the intermediate connection shaft.

In this mechanism for controlling the direction of air flow from an air-conditioning unit, the present invention comprises two series of vanes which are located at the left and right sides of an air outlet. Both series of vanes engage in rotational movement in opposite directions to thereby change the air direction. A narrow space between the left and right series of vanes is formed. Each of the vanes has a series of cavities on its surface which can receive dew.

In this mechanism for controlling the direction of air flow from an air-conditioning unit, the present invention comprises vanes located at an air outlet which engage in rotational movement to change the direction of air flow. Pivotal bearings located in the edge portions on one side of each of the vanes form a C-shape. Sleeves fitted over the pivotal bearings hold them in place and shafts connected to the unit's inner wall are inserted in the sleeves, respectively.

In this mechanism for controlling the direction of air flow from an air-conditioning unit, the angle of inclination of each guide vane becomes larger as the end of the guide vane arrangement is approached. If conditioned air collides with the left/right side of the nozzle or with the left/right side of the front panel and reflects off of it, it will rejoin the bulk air flow and subsequently displace it. This new bulk air flow will travel out of the unit at an angle larger than the left/right inclination angle. This resultant direction can be established by adding together the vectors of the air flow before they collide. As a result, the bulk air flow can be directed in the required left/right direction.

In this mechanism for controlling the direction of air flow from an air-conditioning unit, the angle of inclination of the guide vanes located at the left and right ends of the guide vane arrangement or any number of guide vanes from the left or rights ends of the arrangement can be set to have a larger angle than the remaining vanes. This enables a portion and/or portions of the outlet air nozzle to be blocked between the guide vanes and the unit's body. Accordingly, the air flow reflected from the left/right portion of the nozzle wall and the left/right side of the front panel which may have been deflected into a forward straight direction can be eliminated. As a result, the bulk air flow can be directed in the desired direction.

In this mechanism for controlling the direction of air flow from an air-conditioning unit, the side walls of the unit are comprised of smoothly curved surfaces. This enables the air's cross sectional area to gradually become larger as air is blown out of the unit. The air's direction can subsequently be carefully controlled even at angles of steep inclination.

In this mechanism for controlling the direction of air flow from an air conditioning unit, the guide vanes are controlled by two driving systems. These driving systems are used to swing the guide vanes from left to right or vice versa and will facilitate appropriate inclinations of the guide vanes with respect to the direction of the bulk air flow. This will enable a reduction in cost.

In this mechanism for controlling the direction of air flow from an air-conditioning unit, manufacturing costs can be reduced by employing one driving system only. This will control deflection angles of the guide vanes and will operate via a connection member attached to each guide vane. The respective distances between the respective rotating centers of the guide vanes and the respective connection points of the connection member with the guide vanes will be made different from one another.

In this mechanism for controlling the direction of air flow from an air-conditioning unit, the guide vanes at the left and right sides of the guide vane arrangement can be connected to the unit body via a bellows-like bulkhead without disturbing the motion of the guide vanes. This allows a space to be blocked between the vane and the side walls of the unit's body. This space can be filled with a sponge like material. Accordingly, the air flow reflected from the wall surface on the left/right portion of the nozzle and/or on the left/right side wall of the front panel can be eliminated and the direction of the bulk air flow can be accurately set.

In this mechanism for controlling a direction of air flow from an air-conditioning unit, if two driving systems are provided for independent control of the two sets of guide vanes then the unit can be operated in a wide mode even in the case where humans are located in different positions.

In this mechanism for controlling a direction of air flow in an air-conditioning unit, a sensor for detecting a location of a human body is included. This ensures that the direction of the conditioned air flow is automatically concentrated on the human body occupying the space.

In this mechanism for controlling a direction of air flow in an air-conditioning unit, when the human sensor is used and in the event that humans are located in different positions, the controller will automatically inform the two systems to ensure that conditioned air is uniformly supplied to the full range of the human occupied locations. Accordingly, the system can also be operated in a wide mode while automatically adjusting the air direction.

In this mechanism for controlling a direction of air flow from an air-conditioning unit, the guide vanes are controlled so that the angle of inclination of each guide vane becomes smaller as the end of the guide vane arrangement is approached at both the left and the right side. In the case where the vane inclination angle is large or the distance between guide vanes and the nozzle outlet is large, the bulk air flow may interfere with the unit walls or a portion of the nozzles left and right walls. In this case, the guide vanes can be controlled so that the inclination angle of each guide vane becomes smaller as the end of the guide vane arrangement is approached. This method will reduce the quantity of air incident on the wall surfaces and therefore suppress the amount of interference. As a result, the bulk air flow can be accurately directed in the required direction.

In this mechanism for controlling a direction of air flow from an air-conditioning unit as described above, the side walls of the unit are constructed of smoothly curved surfaces. This enables the air's cross sectional area to gradually become larger as air is blown out of the unit. These curved surfaces enable the air flow to be accurately controlled even when the guide vanes have steep inclination angles.

In this mechanism for controlling a direction of air flow from an air-conditioning unit, only two driving systems are used to swing the guide vanes from left to right so as to make the respective inclinations of the guide vanes different from one another. Therefore reduction in cost can be achieved.

In this mechanism for controlling a direction of air flow from an air-conditioning unit, only one driving system for swinging the guide vanes from left to right is required. The positions of the connection points of the connection rod with the respective guide vanes are fixed and the distances between the respective rotating centers of the guide vanes and the connection points are made different from one another. It is possible to omit a mechanism for making the respective inclinations of the guide vanes different from one another and subsequently an improvement in reliability and a reduction in cost will be achieved.

In this mechanism for controlling a direction of air flow from an air-conditioning unit, the guide vanes situated closest to the casing walls of the unit and the walls themselves can be connected to one another via a bellows-like bulkhead. This enables the space between the guide vane and the unit's body to be blocked and filled with a sponge-like material. This has no effect on the motion of the guide vanes, and eliminates reflection of the air current from the surface of the walls.

In this mechanism for controlling a direction of a flow of air from an air-conditioning unit, if two systems (left and right) are provided to make the inclinations of the guide vanes independent of one another, then the unit can be operated in a wide mode even in the case where human bodies are located in different positions.

In this mechanism for controlling a direction of an air flow from an air-conditioning unit, a sensor for detecting the location of the human body is included. This ensures that the direction of the conditioned air flow is automatically concentrated on the human body.

In this mechanism for controlling a direction of an air flow from an air-conditioning unit, two guide vane control systems (left and right) together with the human body locating sensor are employed. When the human body locating sensor locates more than one human body in different positions, then the controller will automatically inform the two systems to ensure that conditioned air is uniformly supplied to the full range of the human occupied locations. The unit can also be operated in a wide mode with automatic adjustment of the air direction.

In this mechanism for controlling a direction of air flow from an air-conditioning unit, the rotational speed of the cross flow fan is increased when the angle of the left/right air deflection plates exceeds a predetermined critical value. This ensures that the quantity of conditioned air becomes approximately equal to the quantity when the angle of the left/right air deflection plates is small. Accordingly, the temperature of the conditioned air current in an air cooling mode is maintained relatively high even when the angle of the left/right air deflection plates is large. The back flow of the air in the living room toward the air outlet is prevented so that dew formation at the air outlet decreases. Furthermore, even when the angle of left/right air deflection plates is large, warm air can still reach the floor surface in an air heating mode and comfort criteria can subsequently be maintained.

In this mechanism for controlling the direction of air flow from an air-conditioning unit, the controller which controls the magnitude of the angles of the left/right deflection plates ensures that when the plate's angles become greater than a predetermined critical value, the up/down air deflection plates direct air downward in an air cooling mode and upward in an air heating mode.

In this mechanism for controlling a direction of air flow from an air-conditioning unit, the controller controls the magnitude of the angles of the left/right air deflection plates and ensures that these angles are reduced in an air cooling mode and increased in an air heating mode. Accordingly, dew formation can be prevented in an air cooling mode, and warm air still reaches the required portion of the living room in an air heating mode.

In this mechanism for controlling a direction of air flow from an air-conditioning unit, the controller which controls a magnitude of the angles of the left/right air deflection plates in an air cooling mode ensures that if the magnitude of these angles exceed a predetermined critical value then they will gradually be reduced after a predetermined period of time has elapsed.

In this mechanism for controlling a direction of air flow from an air-conditioning unit, the controller ensures that when one side of the unit is located near a wall then the range of the deflection of the left/right air deflection plates is corrected so that the air flow is not directed at the wall. Accordingly, the direction of the air current is moved to such an angle that the air flow does not reflect on the wall surface and circulates normally in the living room.

In this mechanism for controlling a direction of an air flow from an air-conditioning unit, a series of three vanes are located in an intermediate position and are pivotally held by connection shafts.

In this mechanism for controlling a direction of an air flow from an air conditioning unit, the series of three vanes are located in an intermediate position so that the number of vanes is reduced.

In this mechanism for controlling a direction of an air flow from an air-conditioning unit, a narrow space is formed between two conditioned air jets. Within this space, the air flow is weak so that secondary air is entrained in and reaches the guide vanes. Due to the difference in temperature of the guide vanes and the secondary air, dew droplets are formed and they are allowed to collect and flow down into the dew receiving cavities.

In this mechanism for controlling a direction of an air flow from an air conditioning unit, the guide vanes located at the air outlet are pivoted on shafts connected from the inner wall of the unit to the sleeves and pivotal bearings of the guide vanes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures, wherein:

FIG. 25 shows the results when the average guide vane angle is made to be ±–45°, according to the sixth embodiment of the present invention;

DETAILED DESCRIPTION OF THE PREFERRED EMBODIMENTS

Embodiment 1

Figure 1:
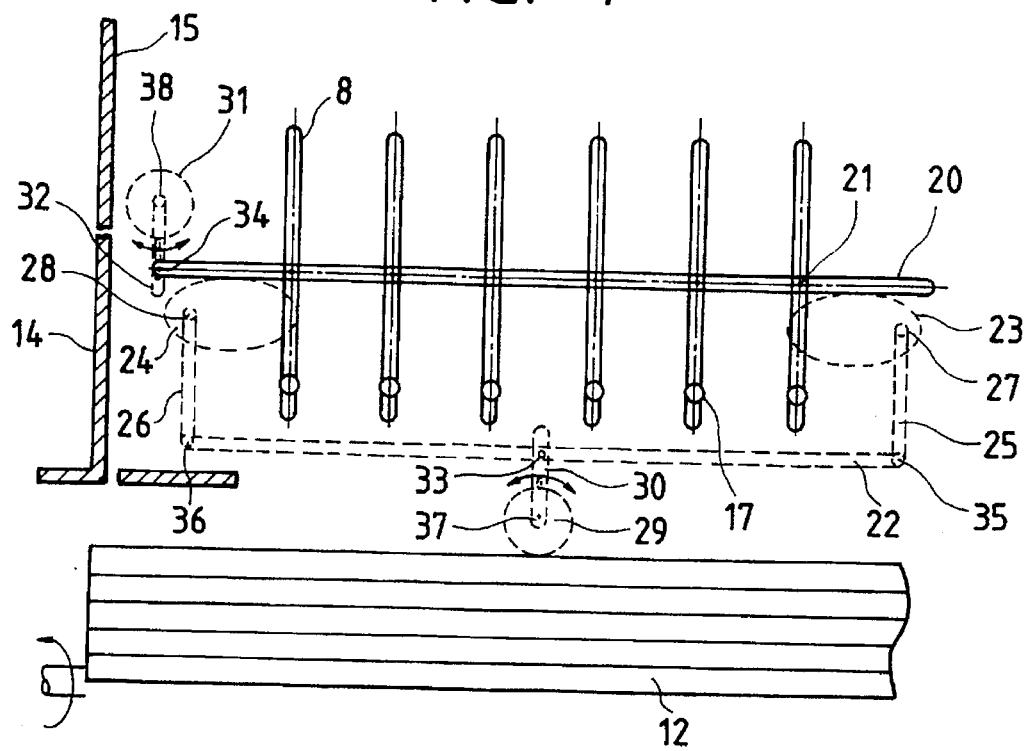
FIG. 1 shows the guide vanes on the right side of a guide vane arrangement according to a first embodiment of the present invention.
Figure 2:
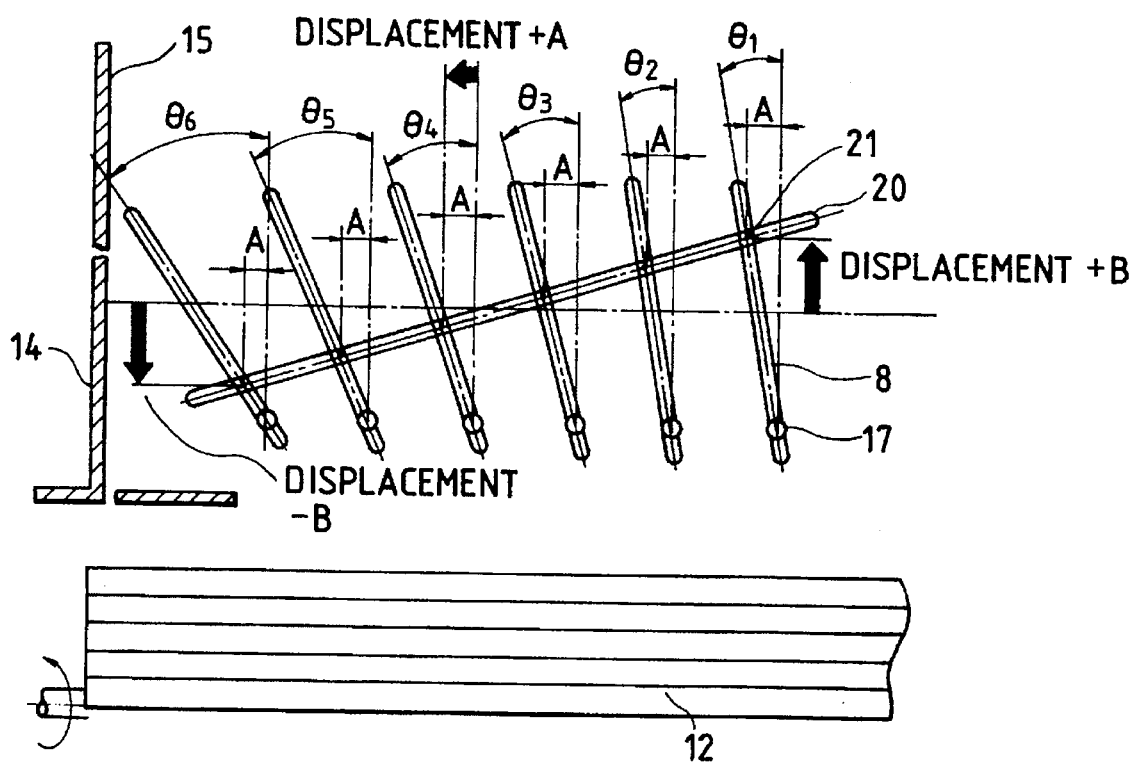
FIG. 2 shows the guide vanes on the right side of a guide vane arrangement inclined to the right, according to the first embodiment of the present invention.
Figure 3A:
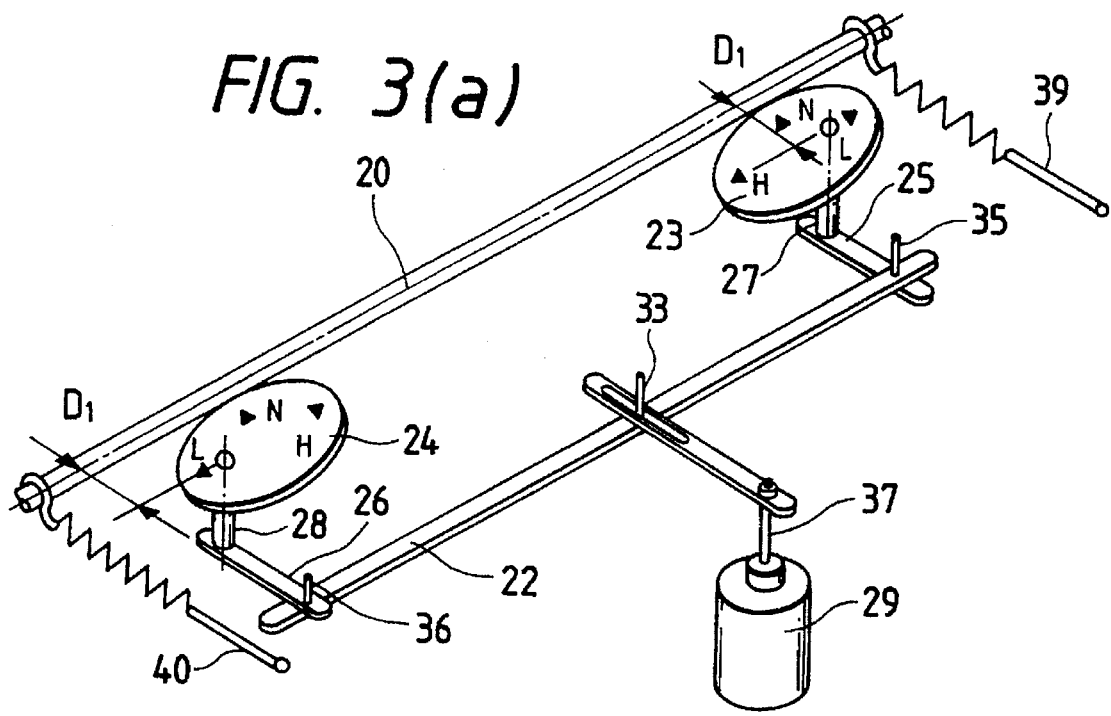
FIGS. 3a and 3b show the operation of the driving system according to the first embodiment of the present invention.
Figure 3B:
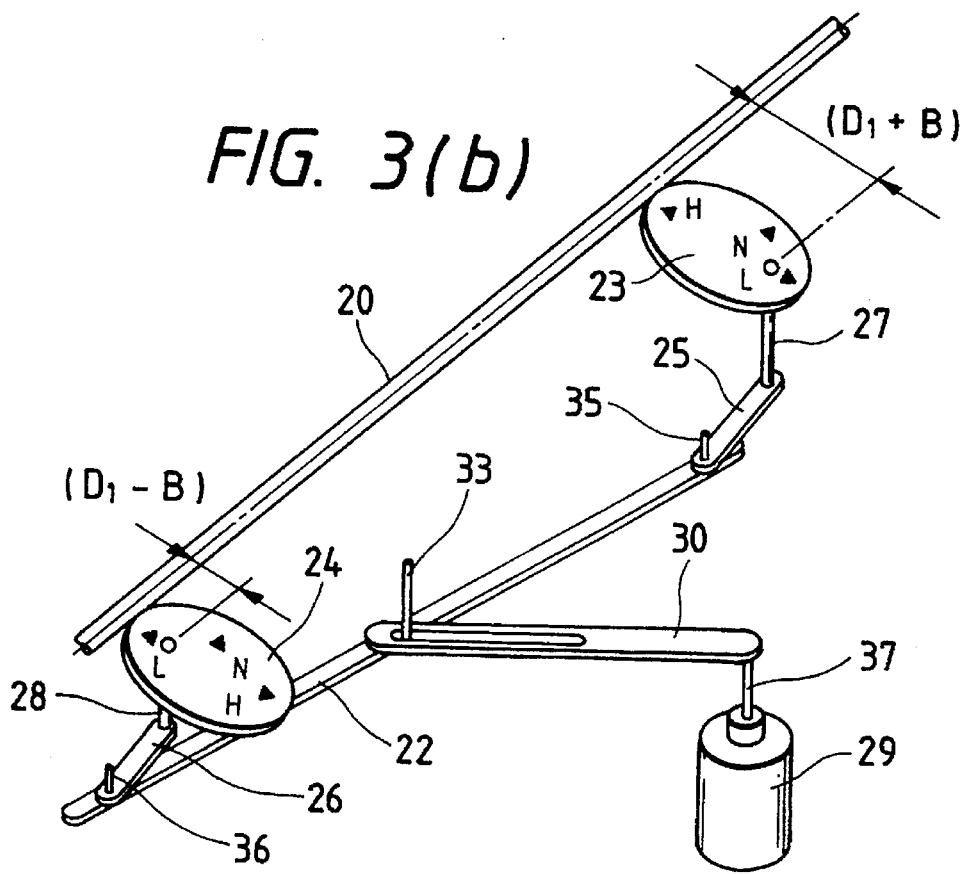

An embodiment of the present invention will be described with reference to the drawings. FIG. 1 shows the guide vanes of the right side of a guide vane arrangement, FIG. 2 shows the guide vanes of the right side inclined to the right, and FIGS. 3a and 3b show the operation of the driving system of FIG. 1.

In the drawing figures, the reference numeral 8 represents a series of guide vanes located in parallel between the right and left walls 10 and 14 of an air outlet nozzle 9. The guide vanes are held by pivots 17, and guide the direction of the conditioned air in the left/right direction. A cross flow fan 12 is provided on the side of the air outlet 4 in the air course 13, and is driven by a motor 18. Reference numeral 15 represents the right side wall of the front panel 2. The reference numeral 20 represents a left/right changing rod which can simultaneously direct the series of guide vanes 8 at a desired angle in the left/right directions. Reference numeral 21 represents the inner section between the guide vanes 8 and the rod 20. The inner sections 21 can move longitudinally with the rod 20. The reference numeral 22 represents a rod which is used to change the left/right direction and inclination of rod 20 in a perpendicular direction. The reference numerals 23 and 24 represent left and right cams located at the left and right end portions of the rod 20. This enables them to be able to rotate about rotation shafts 27 and 28. By changing the distances between the rod 20 and the rotation shafts 27 and 28, the cams 23 and 24 enable rod 20 to move from left to right and to incline in a perpendicular direction to the pivots 17. The reference numerals 25 and 26 represent left and right cantilevers. These can rotate around the rotation shafts 27 and 28 with the left and right cams 23 and 24, respectively. The cams are connected to the rod 22 via the rotation shafts 35 and 36. The reference numeral 29 represents a variable motor which has a rotation shaft 37. Reference numeral 30 represents a lever which can be rotated around the rotation shaft 37 by the variable motor 29. It attaches to rod 22 via a pivot 33, and is thus able to move rod 22 in the left/right directions. The pivot 33 can move in the same longitudinal direction as the lever 30. The reference numeral 31 represents a variable motor which has a rotation shaft 38. Reference numeral 32 represents a lever which can be rotated around the rotation shaft 38 by the variable motor 31. This lever 32 is pivotally held by the rod 20 via a pivot 34, and through this the rod 20 can be moved both to the left and to the right. The pivot 34 can move in the longitudinal direction of the lever 32. The reference numerals 39 and 40 represent coiled springs which make the rod contact the outside circumference of the left cam 23 and the right cam 24. This ensures the rod will follow the movement of the cams.

The system operation will now be described. The intersection points 21 of the guide vanes 8 and the rod 20 can move in a direction perpendicular to the pivot 17. When the rod 20 is parallel to a straight line connecting the respective pivots 17 as shown in FIG. 1 and at the rotation shaft 38 of the variable motor 31 is rotated to rotate the lever 32 and move the rod 20 in the left/right directions via the pivot 34, then the distance between the intersections 21 of the guide vanes and the rod 20 and the pivot 17 are the same on each guide vane 8. Accordingly, the respective guide vanes 8 are all inclined at the same angle. However, if the rod 20 is inclined by +B at the left end and −B at the right end with respect to the reference position and relative to the straight line connecting the respective pivot 17 as shown in FIG. 2, the distances between the pivot 17 and the intersections 21 of the guide vanes and the rod 20 become shorter as the right end of the guide vanes 8 is approached. Therefore, in this situation if the rotation shaft 38 of the variable motor 31 is rotated to rotate the lever 32, and move the rod 20 in the right direction by the displacement +A via the pivot 34, displacements of the intersections 21 to the right are indeed the same magnitude of +A on each guide vane 8. However, the distances between the pivot 17 and the intersections 21 are so different that the inclinations of the respective guide vanes 8 get larger gradually from $\theta_1$ to $\theta_6$. Although this lever 32 is pivotally held by the rod 20 via the pivot 34, the pivot 34 can move in the longitudinal direction of the lever 32. This is achieved by providing a groove in the lever 32 so the displacement ±B is absorbed in the case where rod 20 is inclined.

Next, a mechanism for inclining the rod 20 relative to the straight line and connecting the respective pivot 17 will be described.

FIG. 3a shows a situation in which the rod 20 is parallel to the straight line connecting the respective pivot 17. In this instance, it is assumed that the distance between the rotation shafts 27 and 28 and the rod 28 is $D_1$. Although the rod 20 is pulled to the left cam 23 and right cam 24 by the coiled springs 39 and 40, the rod 20 can still move. If the rotation shaft 37 of the variable motor 29 is rotated to rotate the lever 30, the rod 22 is moved in the left/right direction via the pivot 33. As the left lever 25 and the right lever 26 rotate, the rotation shaft 27 and 28 are centered, respectively. The rod 22 now moves in the left/right direction to center the rotation shaft 27 and 28 via the rotation shafts 35 and 36. As the left lever 25 and the right lever 26 are interlinked with the left cam 23 and the right cam 24 via the rotation shaft 27 and 28 respectively, the rotations of the left lever 25 and the right lever 26 cause the left cam 23 and the right cam 24 to rotate, respectively. If the variable motor 29 is rotated as shown in FIG. 3b, the left cam 23 enlarges the distance between the rotation shaft 27 and the rod 22 ($D_1$+B). Conversely, the right cam 24 reduces the distance between the rotation shaft 28 and the rod 20 to ($D_1$−B). As a result, the rod 20 is inclined relative to the straight line in connecting the respective pivot 17. The reference marks H, N, and L on the left cam 23 and the right cam 24 show the positions in which the distance between the respective rotation shafts 27 and 28 and the rod 20 is made equal to ($D_1$+B), $D_1$, and ($D_1$−B), respectively.

If all of the guide vanes are controlled so that the angle of inclination of each guide vane becomes larger as the end of the guide vane arrangement is approached, then, for example, if air is blown to the right and is reflected on the right wall 14 of the nozzle and the right wall 15 of the front panel, or the air flow is deflected to a forward straight flow, then the flow passing between the guide vanes adjacent to or near the flow that is deflected will be blown out at an angle larger than the preset angle of inclination. Accordingly, the bulk flow will be deflected according to the composite vector of both the flows, so that the bulk air flow can be blown into the preset direction.

A similar method to that described in the above embodiment can be utilized when inclining the guide vanes to the left.

Figure 4:
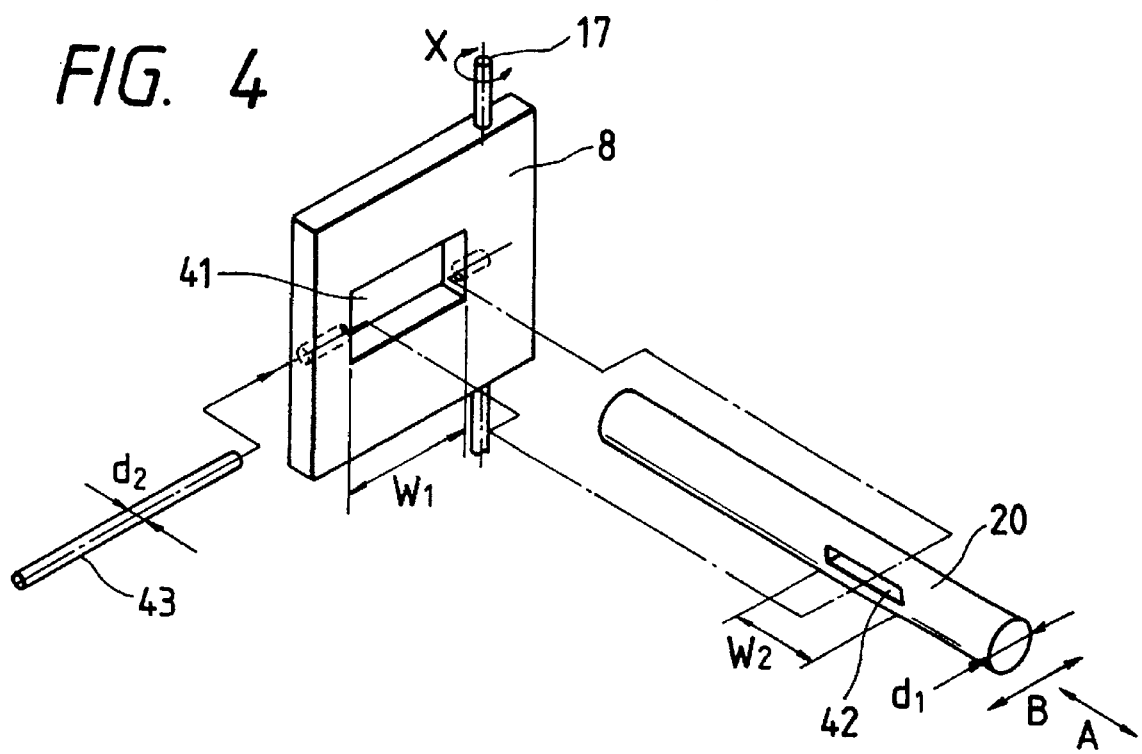
FIG. 4 illustrates the method for connecting the guide vanes to the left/right changing rod according to the first embodiment of the present invention.

FIG. 4 illustrates the details of the mechanism for connecting the guide vanes 8 to the rod 20 in embodiment 1.

In this figure, the reference numeral 8 represents a guide vane pivotally held by a pivot 17. Reference numeral 20 represents a rod used to direct the series of guide vanes 8 at a desired angle. Reference numeral 41 represents a hole in the guide vane with a long side $W_1$ so that the rod 20 can move by ±–B in the direction perpendicular to the pivot 17. Reference numeral 42 represents an opening on the rod 20 with a width $W_2$ in the longitudinal direction of the rod so that violent stress does not occur on the slide shaft 43 even if the angle between the guide vane and the rod 20 changes quickly. With such a configuration, the rod 20 can be slided along the slide shaft 43 in the direction perpendicular to the pivot of the guide vane 8.

Figure 5:
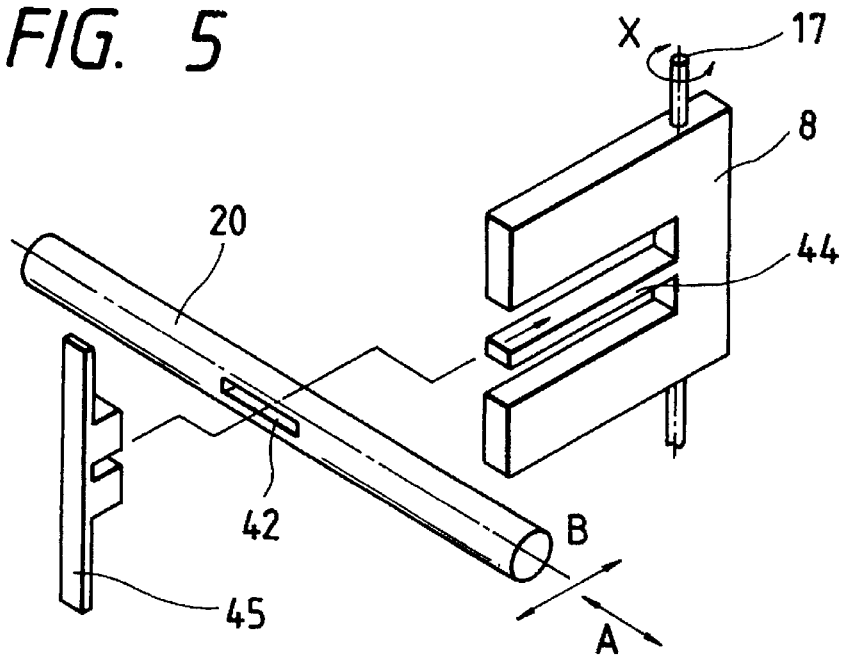
FIG. 5 illustrates another method of connecting the guide vanes and the left/right changing rod according to the first embodiment of the present invention.

FIG. 5 illustrates in detail another mechanism for connect the guide vanes 8 and the rod 20 in embodiment 1.

In this figure, the reference numeral 8 represents a guide vane pivotally held by a pivot 17. Reference numeral 20 represents a rod for directing the series of guide vanes to a desired angle. Reference numeral 44 represents a slide bar formed by cutting the guide vane into an E-shape, and reference numeral 45 represents a guide vane frame attached to the end of the guide vane to prevent the rod 20 from coming off the slide bar. The guide vane 8 and the guide vane frame 45 were built to enable the slide bar 44 to have enough length for the rod plane to move by a + or –B. The reference numeral 42 represents an opening in the rod with a width $W_2$ in the longitudinal direction of the rod so that violent stress is not applied to the slide bar 44 even if the angle between the guide vane 8 and the rod 20 changes quickly. With such a configuration, the rod 20 can be slided along the slide bar 44 and in direction perpendicular to the pivot 17 of the guide vane 8.

Figure 6:
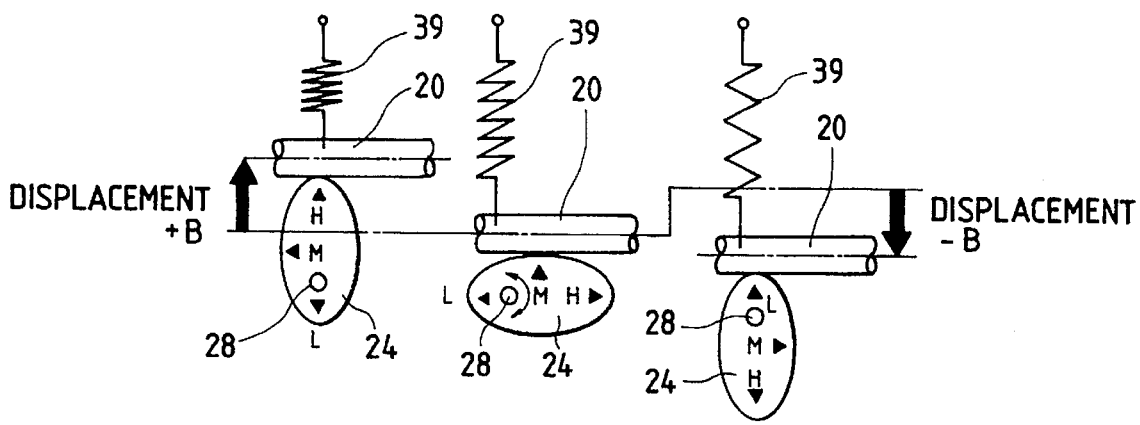
FIG. 6 illustrates an alternative method for moving a left/right changing rod while the rod touches the circumference of the left or right cam according to the first embodiment of the present invention.

FIG. 6 is a diagram illustrating a mechanism for moving the rod 20 while making it remain in contact with a part of the circumference of the left cam 23 or the right cam 24. In this figure, the reference numeral 20 represents a rod and reference numeral 24 represents the right cam which rotates around a rotation shaft 28. The reference numeral 39 represents a coiled spring which is designed to press the rod 20 toward the right cam, while the coiled spring in the embodiment of FIG. 3 is designed to pull the rod 20 toward the right cam. With such a configuration, rod 20 can be moved while remaining in contact with a portion of the circumference of the left cam 23 or the right cam 24.

Figure 7:
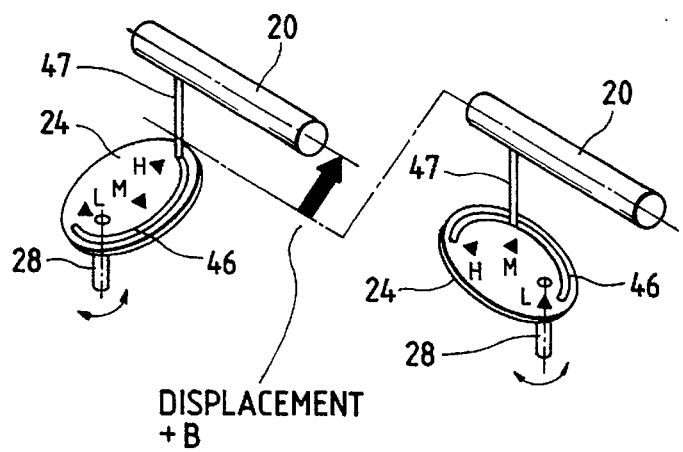
FIG. 7 illustrates a second alternative method for moving the left/right changing rod while the rod touches the circumference of the left or right cam according to the first embodiment of the present invention.

FIG. 7 is a diagram illustrating a mechanism for moving rod 20 while ensuring that it remains in contact with the portion of the circumference of the left cam 23 or the right cam 24 as in the above-mentioned Embodiment 1. In the figure, the reference numeral 20 represents a rod, 24 represents a right cam which rotates around a rotation shaft 28, 46 represents a profiled groove on the right cam, and 47 represents a guide pin which moves along the profiled groove 46 as a right cam 24 rotates. One end of the guide pin 47 is fixed to the rod 20, and the other end is inserted into the profile groove 46. According to this embodiment, the coiled spring 39 can be omitted, and a mechanism for restraining the cam from rotating beyond its rotational limit can also be eliminated.

Although the above-mentioned embodiment was described in connection with the mechanism surrounding the right cam 24, it similarly applies to the left cam 23.

If the guide vanes are controlled independently using two systems (left and right), and the driving mechanisms are similarly employed, as in the previously mentioned embodiment, then the system can be driven with high accuracy in a wide mode even when humans are in different locations in the spaced to be conditioned. If the blowing directions of the respective systems are the same, then the guide vanes whose angles need to be changed are controlled in the same manner as in the above embodiment, while the other group of guide vanes are controlled in the same manner as in the conventional art.

Figure 8:
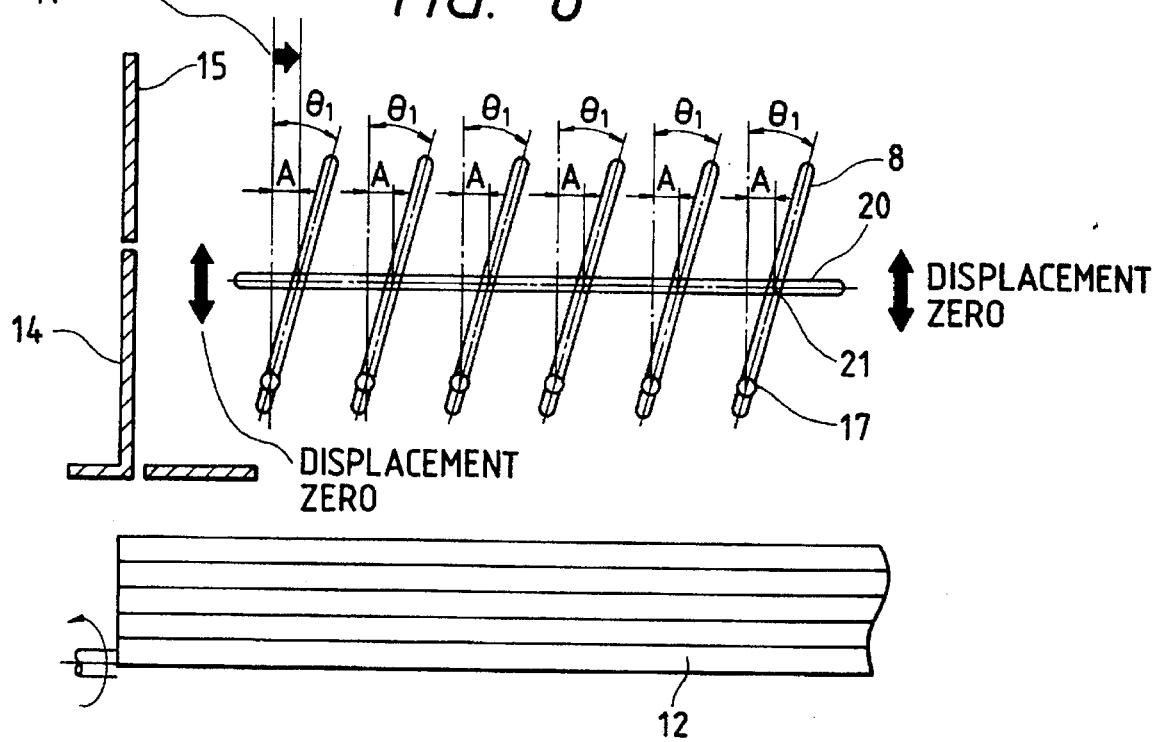
FIG. 8 explains the method of control when the guide vane control system is divided into two systems according to the first embodiment of the present invention.

FIG. 8 shows a group of guide vanes arranged on the right similar to those in FIG. 1 but inclined in the left direction. As illustrated in the drawing, the rod 20 is made parallel with a straight line in connection the respective pivot 17, that is, the displacements of both ends of rod 20 are made B=0. In this case, if both ends of the rod 20 are moved in the left direction by displacement –A, then the inclinations of all the respective guide vanes 8 have the same value $\theta_1$. This is because the distances between the respective intersections 21 and the pivot 17 are the same, and therefore the amount of movement of the respective intersections 21 and the left/right direction are the same –A. An effect similar to that in the above embodiment can be obtained if the control system of the guide vanes is divided into two (left and right systems), and these systems are driven by different driving systems. The system can be used to control the group of guide vanes inclined as shown in FIG. 2 and the group of guide vanes shown in FIG. 8.

Figure 9:
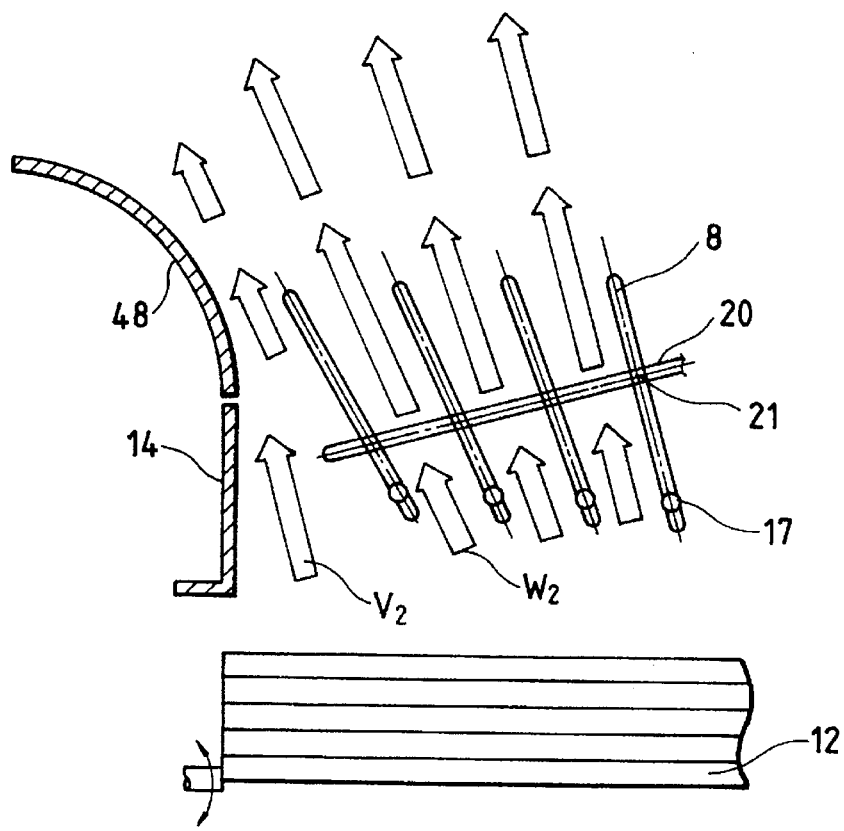
FIG. 9 illustrates another example of the flow pattern near the side wall according to the first embodiment of the present invention.

FIG. 9 shows the right set of guide vanes as shown in FIG. 1 inclined to the right. The left and right side walls of the front panel are formed into a bell-mouth shape as described in embodiment 1. This bell-mouth shape allows the distance between the left side wall 11 and the right side wall 15 to gradually become larger as the air exits the unit. Reference numeral 48 represents the right sidewall. Within the unit the air flow $V_2$ can be reflected on the right nozzle wall 14 and on the right side wall 15 of the front panel. This may result in it being deflected into a forward straight flow. If the flow $W_2$ passes between the guide vanes adjacent to or near the flow $V_2$ it may well be deflected at a larger angle than its present angle of inclination. Accordingly, the flow $V_2$ has deflected in the direction of the composite vector $(V_2+W_2)$ of both the flows. An added effect is that this flow adheres to the bell-mouth side wall 48 by the Coanda effect, so that the direction of the air flow can be controlled even more accurately.

Embodiment 2

Figure 10:
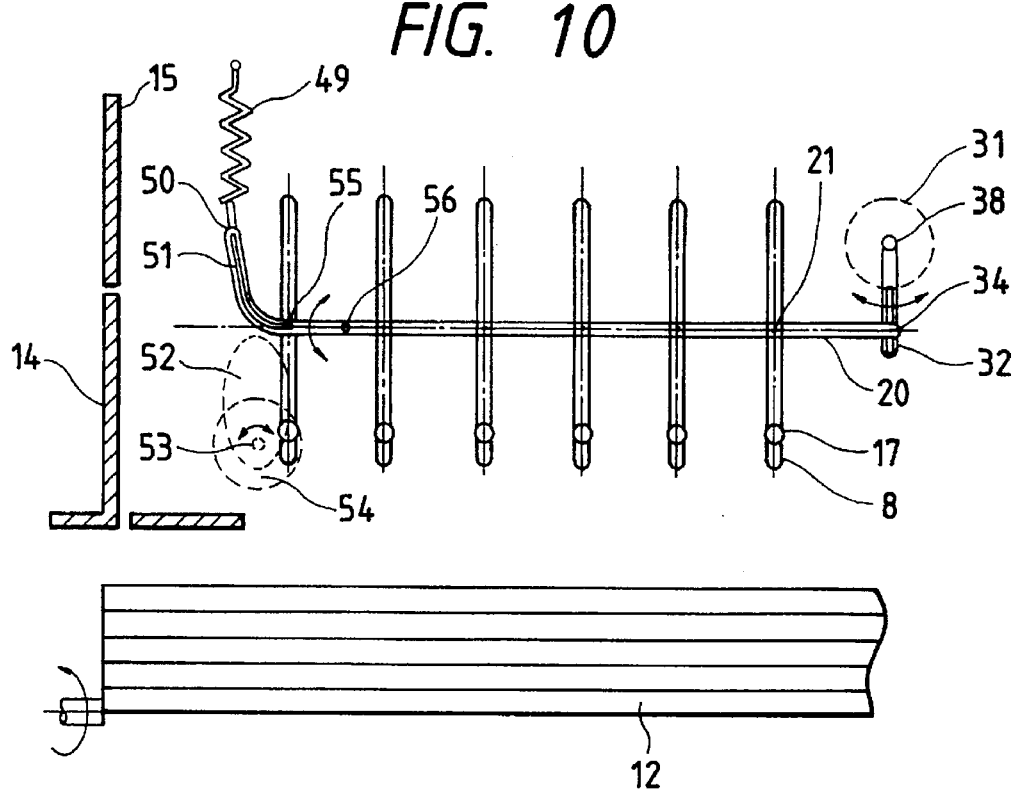
FIG. 10 shows the guide vanes on the left side according to a second embodiment of the present invention.
Figure 11:
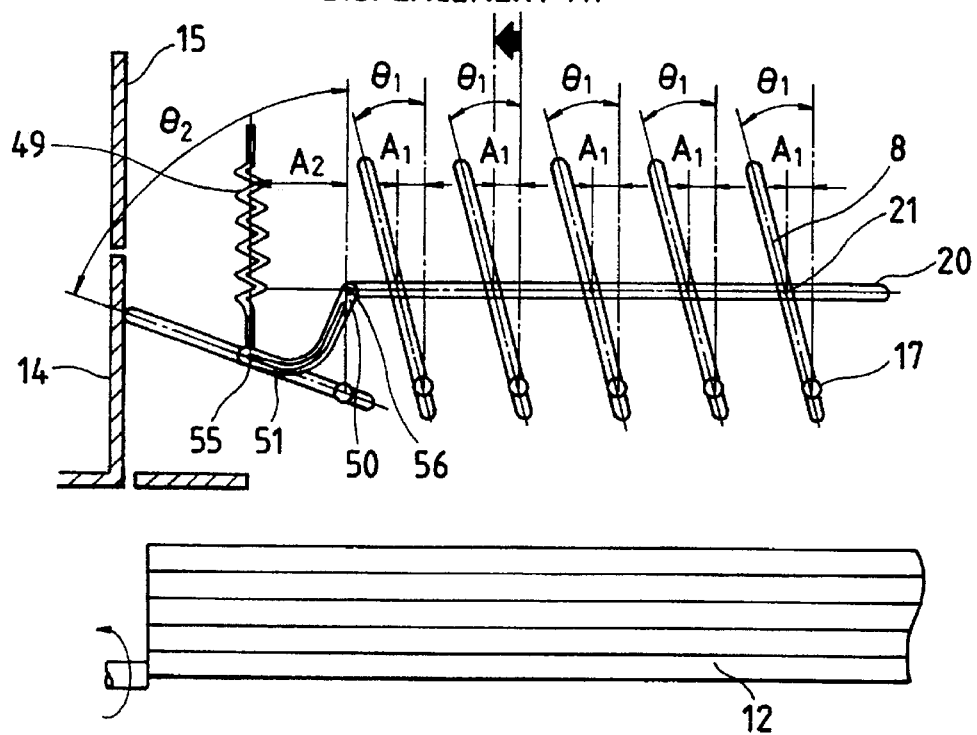
FIG. 11 shows the guide vanes on the left side when they are inclined to the left according to the second embodiment of the present invention.
Figure 12A:
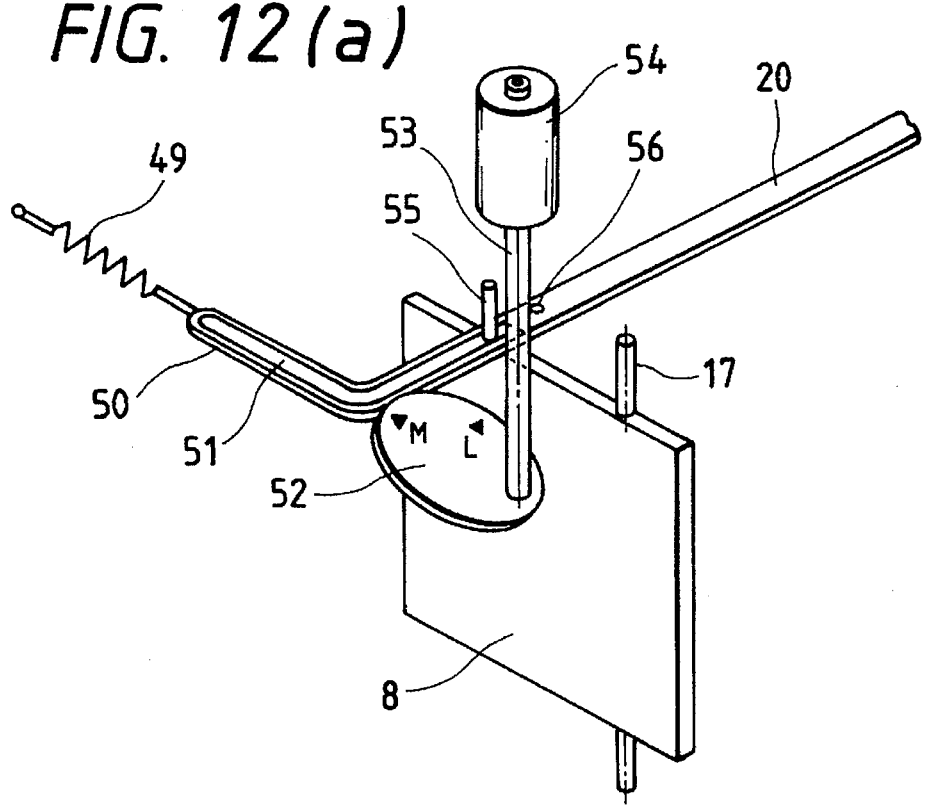
FIGS. 12a and 12b explain the operation of the driving system according to the second embodiment of the present invention.
Figure 12B:
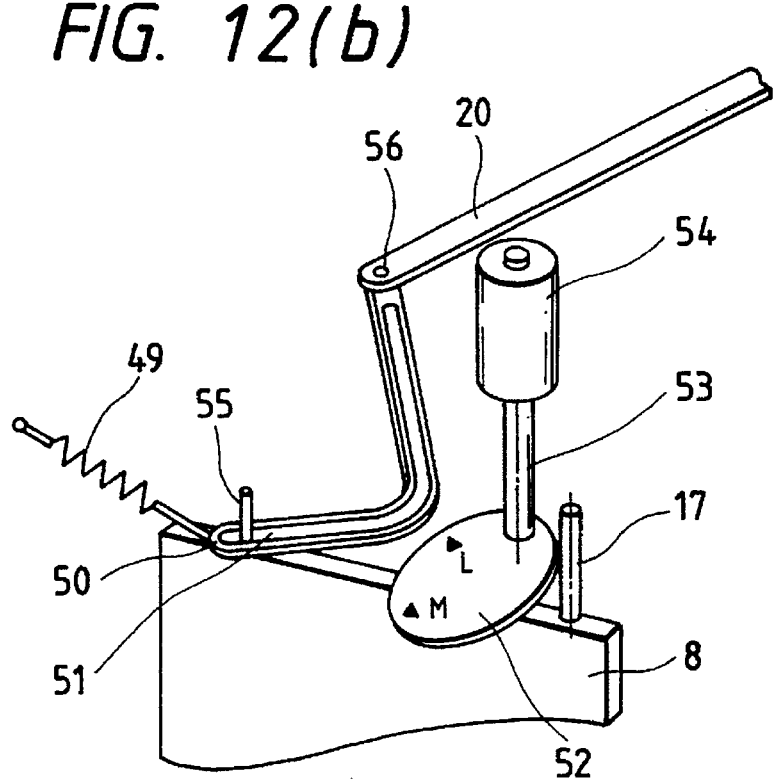

A second embodiment of the present invention will now be described. FIG. 10 shows the guide vanes of the right side of a guide vane arrangement, FIG. 11 shows the guide vanes of FIG. 10 inclined in the left direction, and FIGS. 12a and 12b show the operation of the driving system. In the figures, the reference numeral 8 represents a series of parallel guide vanes located between the walls 10 and 14 in the portion of the left and right sides of the outlet nozzle 9. The guide vanes are pivotally held by pivots 17 and guide the air flow in the left and right directions. Reference numeral 12 is a cross flow fan located in the air outlet 4 inside the air course 13, and it is driven by a motor 18. Reference numeral 15 represents the left side wall of the front panel 2. The reference numeral 20 represents a rod pivotally held on the guide vanes 8 by shafts 21 in order to simultaneously direct the guide vanes 8 to a desired angle in the left/right directions. In this case which is similar to Embodiment 1, the distances between the pivot 17 and the shaft 21 are constant throughout all of the guide vanes 8. The reference numeral 31 represents a variable motor which has a rotation shaft 38. Reference numeral 32 represents a lever which can be rotated around the rotation shaft 38 by means of the variable motor 31. This lever is pivotally held by the rod 20 via a pivot 34, and moves the rod 20 in the left and right directions. The pivot 34 can be moved in a longitudinal direction of the lever 32. The reference numeral 50 represents an L-shaped rod which is pivotally held by one end of the rod 20 via a rotation shaft 56. Reference numeral 51 is an L-shaped guide groove provided so as to extend in the longitudinal direction of the L-shaped rod 50. Reference numeral 54 represents a variable motor having a rotation shaft 53. Reference numeral 52 represents a cam which can be rotated around the rotation shaft 53 by the variable motor 54 so it contacts with the L-shaped rod. Reference numeral 55 represents a guide pin that holds the L-shaped rod 50 onto the guide vanes 8 via the guide groove 51. The guide pin 55 moves freely along the guide groove 51. The reference numeral 49 represents a coiled spring designed to press one end of the L-shaped rod 50 toward the cam 52 and this allows the L-shaped rod 50 to move while remaining in contact with a portion of the cam 52.

The operation of this system will now be described. Firstly, the distances between the shafts 21 and the guide pin 55 are designed to be the same in the case where the angle of the L-shaped rod 50 is fixed as shown in FIG. 10. In this case, if the rotation shaft 38 is rotated by the variable motor 31, the lever 32 is also rotated and this causes the rod 20 via the pivot 34 to be moved either to the left or right in a straight line. All the guide vanes 8 are then inclined by the same angle. The rotation radii of the guide vanes will be equal to each other because the distances between the shafts 21 or the guide pin 55 and the pivot 17 are equal, and also the distances between the shafts 21 and the guide pin 55 are equal. The L-shaped rod has been designed so that the distance between the guide pin 55 and the adjacent shaft 21 can be made longer than the distance between the shafts 21 themselves. This is achieved when the cam 52 is rotated as shown in FIG. 11. This causes the L-shaped rod 50 to move toward cam 52. In this case, if the rotation shaft 38 is rotated by the variable motor 31, then the lever 32 is also rotated. The rotating motion of the lever 32 is changed into left and right straight line motion (of a distance $A_1$) by rod 20 via the pivot 34. Subsequently, the radii of rotation of their guide vanes 8 are equal due to the distance in between the shafts 21 or the guide pin 55 and the pivot 17 being equal, the distances between the shafts 21 adjacent to each other and the guide pin 55 and the adjacent shaft 21 are different. Therefore, the shafts 21 are moved by $A_1$ and the guide pin 55 is moved by $A_2$ ($A_1<A_2$) and the rod 20 is moved by the distance $A_1$ also. As a result, only the guide vane 8 at the far right end of the guide vane arrangement is inclined by the angle $\theta_2$ while the remaining guide vanes are inclined by $\theta_1$ ($\theta_1<\theta_2$). Accordingly, only the inclination angle of the guide vane at the far left end of the guide vane arrangement can be set to be larger than that of the other guide vanes 8.

The mechanism for changing the altitude of the L-shaped rod 50 to enlarge the inclination angle of only the guide vane 8 at the far left end of the guide vane arrangement will now be described. FIG. 12a shows that the position of the cam 52 is set so that the distance between the connection point of the cam 52, the L-shaped rod 50, and the rotation shaft 53 becomes a maximum. In the figure, the guide pin 55 is positioned in the guide groove 51 as near as possible to the rotation shaft 56. In this case, the distances between the shafts 21 and the distance between the guide pin 55 and the adjacent shaft 21 are equal. In this state, all the guide vanes 8 have the same angle of inclination. Next, if the rotation shaft 53 is rotated by the variable motor 54 to rotate the cam 52 so that the distance between the connection point of the cam 52 and the L-shaped rod 50 and the rotation shaft 52 is reduced, then the L-shaped rod 51 is pressed by the coiled spring 49 to move toward the cam. This cam rotates around the rotation shaft 56, while the guide pin 55 is guided by the guiding groove 51 so as to move away from the rotation shaft 56. In this state, the distances between the guide pin 54 and the adjacent shaft 21 become greater than the distances between the shaft 21 adjacent to one another. With respect to the letters drawn on the cam 52, M refers to the position where the distances between the adjacent shaft 21, and between the guide pin 55 and the adjacent shaft 21 are equal. L refers to the position where the distances between adjacent shafts 21 and the distance between the guide pin 55 and the adjacent shaft 21 are largest.

Although in the above embodiment, the mechanism for controlling the guide vanes was described when the guide vanes were inclined to the right, the same mechanism can be applied to the left guide vane system. Accordingly, the guide vane at the far left end of the guide vane arrangement is made to have a larger angle of inclination than any other guide vane so that the space between one of these and either the left or right wall of the unit's body is blocked. It is therefore possible to prevent a part of the bulk air flow from being reflected on the wall surfaces of the left and right sides of the nozzle and/or the front panel. The majority of the flow between the far right or far left vane and the adjacent vane flows in the inclination direction of the adjacent vane, and the cross sectional area is expanded. From this effect, the flow will reduce in speed and thus will have no influence on the left/right direction of the flow as a whole. As a result, it is possible for the conditioned bulk air to flow in the required preset direction.

Although the coiled spring 49 is made to push the L-shaped rod 50 toward the cam 52 in the above embodiment, a similar effect can be obtained if the coil spring 49 is made to pull the L-shaped rod 50 toward the inclination changing cam 52.

The mechanism to make the inclination angle of the far left or far right guide vane larger than that of any other guide vane was shown in the above embodiment. If the position of the branch point where the L-shaped rod 50 is inserted is changed, and the guide vanes can be divided into groups on opposite sides of the branch point, then they be connected by different rods so that a particular number of guide vanes from the left or right portion are made to have larger angles of inclination than those of the remaining guide vanes. It is then possible to block the space between the far left or far right guide vane and the left or right side wall of the body. In addition, the distance between the number of vanes having a large inclination angle becomes smaller than the distance between the remaining vanes, so that the resistance to the air flow becomes so large that it is difficult for a flow to enter these spaces. Effectively, the flow has been made negligible. It is therefore possible to blow out the bulk air flow as a whole in the desired left/right direction.

Figure 13:
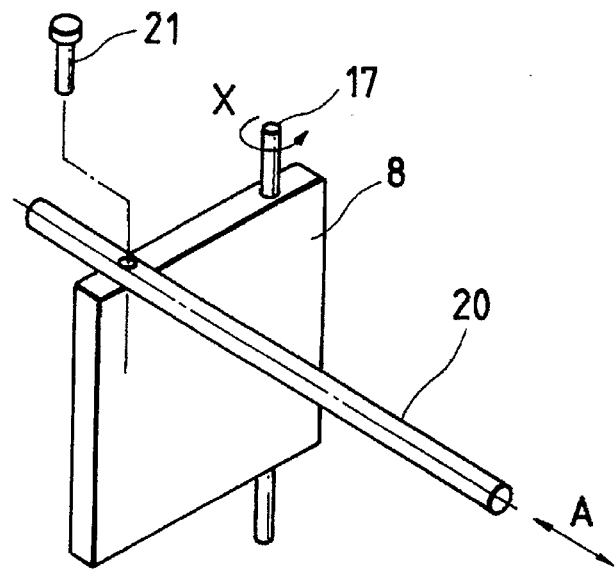
FIG. 13 illustrates a method to connect the guide vanes to the left/right changing rod according to the second embodiment of the present invention.
Figure 14:
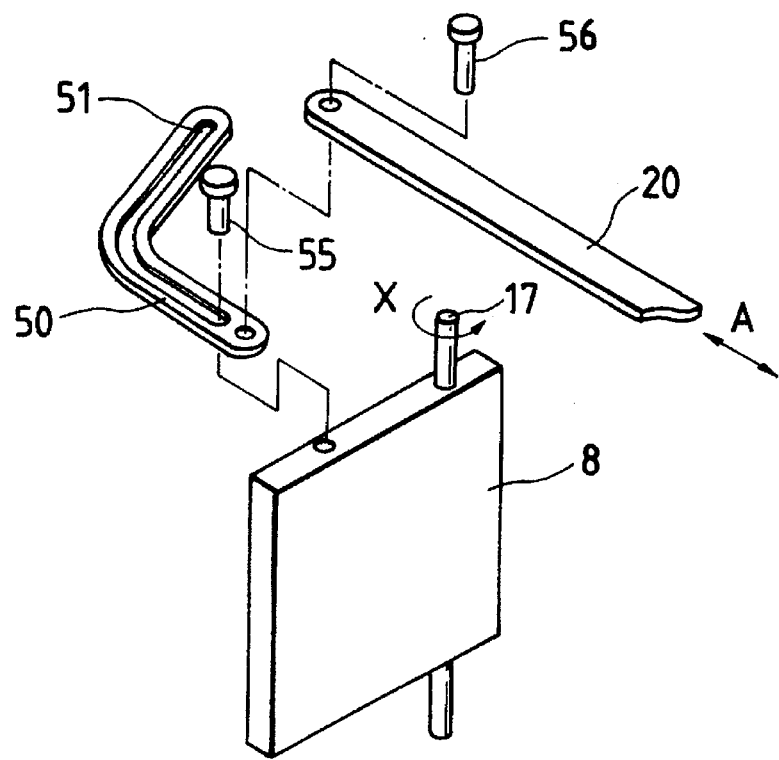
FIG. 14 illustrates a method to connect a guide vane to an L-shaped rod which changes the inclination angle according to the second embodiment of the present invention.

FIG. 13 illustrates the mechanism for connecting the guide vanes 8 to the rod 20 in the above embodiment, and FIG. 14 illustrates the mechanism for connecting the guide vanes to the L-shaped rod 50.

In the figures, reference numeral 8 represents a guide vane pivotally head by a pivot and 20 represents a rod pivotally attached to the guide vane 8 by the shaft 21. The rod is used to simultaneously direct a series of guide vanes 8 to a desired angle in the left or right directions. The reference numeral 55 represents a guide pin for pivotally holding an L-shaped rod 50 on the guide vanes 8 via a guide groove 51. The guide pin 55 moves freely along the guide groove 51.

Embodiment 3

Figure 15:
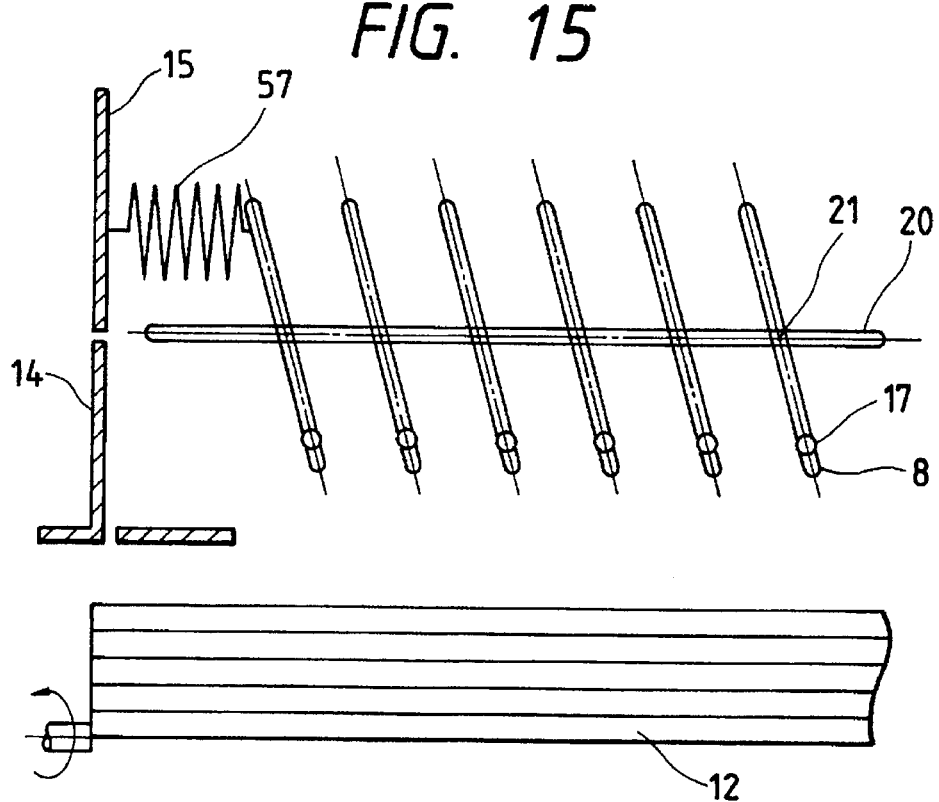
FIG. 15 shows the guide vanes on the right side according to a third embodiment of the present invention.

FIG. 15 illustrates another embodiment of the present invention. It shows in detail the guide vanes located on the right side. In the figure, the reference numeral 8 represents the guide vanes which are located between the walls 10 and 14 of the blow out nozzle 9. These vanes are pivotally held by the pivot 17 and are used to guide the conditioned air in the left and right directions. Reference numeral 12 represents a cross blow fan located in the air outlet 4 of the air course 13 and is driven by a motor 18. Reference numeral 15 represents the right side wall of the front panel 2. The reference numeral 20 represents a rod pivotally attached to the guide vanes 8 by shaft 21 and is used to direct the series of guide vanes 8 to a desired angle in the left or right directions. The distances between the pivot 17 and the shafts 21 are constant throughout the guide vanes 8 the reference numeral 57 represents a bellows-like bulkhead containing the far right guide vane and the right side wall 15 without interfering with the motion of the guide vanes 8. This bulkhead 57 blocks the spaces between the respective vanes and the side walls of the unit.

As described previously, if the space between the far left or far right guide vanes and the left or right side walls of the body are always blocked by the bellows-like bulkhead, it is possible to eliminate the flow reflected on the surface of the left and right walls of the air outlet and the units body. The air flow can then be directed in the desired direction. The mechanism used to incline the guide vanes and the bellows-like bulkhead can be used on the left and right sides of the arrangement similarly without interfering with the motion of the guide vanes.

Embodiment 4

Figure 16:
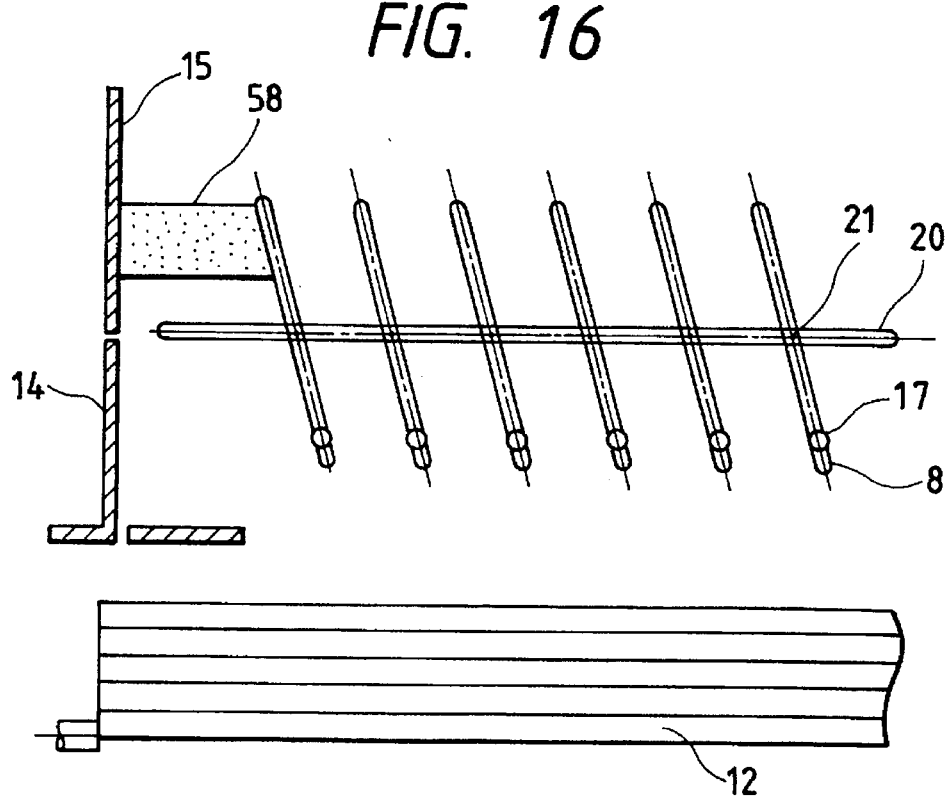
FIG. 16 shows the guide vanes on the right side according to a fourth embodiment of the present invention.

FIG. 16 illustrates another embodiment of the present invention, and shows the guide vanes located to the right of the guide vane arrangement. In the figure, the reference numeral 8 represents a series of guide vanes. They are located between walls 10 and 14 of the air outlet nozzle 9. The guide vanes are pivotally held by pivot 17 and guide the direction of conditioned air in the left and right directions. Reference numeral 12 represents a cross flow fan located in the air outlet 4 of the air course 13 and is driven by a motor 18. Reference numeral 15 represents a right side wall of the front panel 2. The reference numeral 20 represents a rod pivotally attached to the guide vanes 8 by shafts 21 and is used to direct the series of guide vanes 8 to a desired angle. The distances between the pivot 17 and the shafts 21 are equal throughout the entire guide vane arrangement. The reference numeral 58 represents a sponge-like bulkhead which connects the far right guide vane to the right side wall 15 of the body 1. This does not interfere with the motion of the guide vanes and blocks the space between the respective vanes and the side walls of the body.

As has been described, if the space between the far left or right guide vanes and the left to right side walls of the body is blocked by the sponge-like bulkhead when the guide vane is inclined in the right direction, it is possible to eliminate the flow reflected on the surface of the right side wall the nozzle and the surface of the right side wall the front panel. This enables the air flow as a whole to be blown out in the preset direction.

Although the mechanism controlling the guide vanes on the right side incline to the right was described in the previous embodiment, the same description is applicable when the vanes are inclined to the left. This blocking can similarly be achieve with a sponge-like bulkhead without interfering with the motion of the guide vanes.

Further, although the space between the guide vane and the body side wall is blocked by a sponge-like bulkhead when the guide vane is inclined, the sponge-like bulkhead may be designed so as to permanently block such space. In a mechanism which directs air in accordance with the above mentioned embodiment 2 or 4, two systems (left and right) may control the guide vanes, and each of these systems has a driving system for making the inclinations of the guide vanes different from one another. As a result, the mechanism can be operated in a wide mode even when the human bodies are located in different positions.

Embodiment 5

Figure 17:
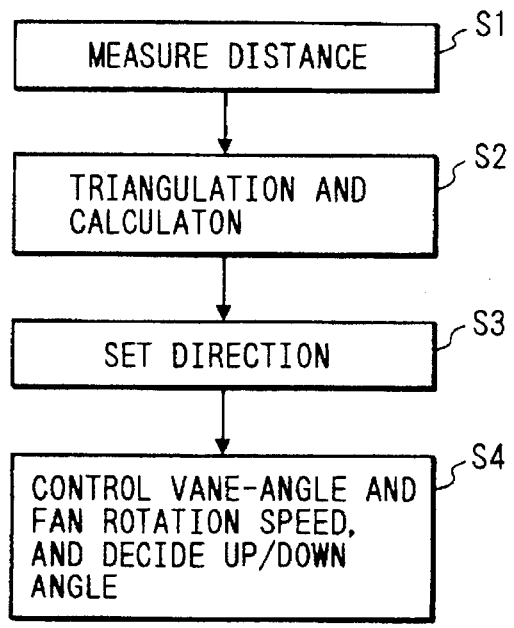
FIG. 17 is a flow chart that explains the control operation of the air-direction mechanism according to a fifth embodiment of the present invention.

When a sensor for detecting the location of a human body is used in conjunction with a mechanism for directing the flow of air from air-conditioning equipment and according to any of the embodiments mentioned above, the direction of the conditioned air current is controlled automatically. It is controlled in accordance with the output from the sensor to thereby make the conditioned air current arrive at the location of the human body. It is possible to direct the air current accurately, and it is also possible to design a mechanism for directing the flow of air which is superior in terms of its ability to be controlled. FIG. 17 is a flowchart for explaining the control operation of such a mechanism. First, step S1 measures the distance of a human body from the two radiant temperature sensors attached to the air-conditioning unit. Step S2 triangulates the outputs from the two radiant temperature sensors and determines the location and direction of the human body. Step S3 sets the mechanism for directing the flow of air to the required direction. Step S4 adjusts the angle for the guide vanes and changes the rotational speed of the fan so that the air velocity is sufficient to reach the location of the human body. Step S4 also controls the upward/downward angle of the exiting conditioned air and takes into account temperature drift.

If the guide vanes are controlled with two independent systems (left and right), a sensor is used for detecting the location of the human bodies. When the sensor detects that the human bodies are located in different positions, the two (left and right) guide vane systems inclined in the left and right directions, respectively, subsequently enable the air-conditioning unit to supply air to the full range of the space occupied by humans.

Although the system was described in operation with a wall mounted type air conditioning unit in the above embodiment, the system may also be used with a ceilinghung type unit or with a ceiling-buried type unit. A result similar to that in the above embodiment can be obtained.

Embodiment 6

Figure 18:
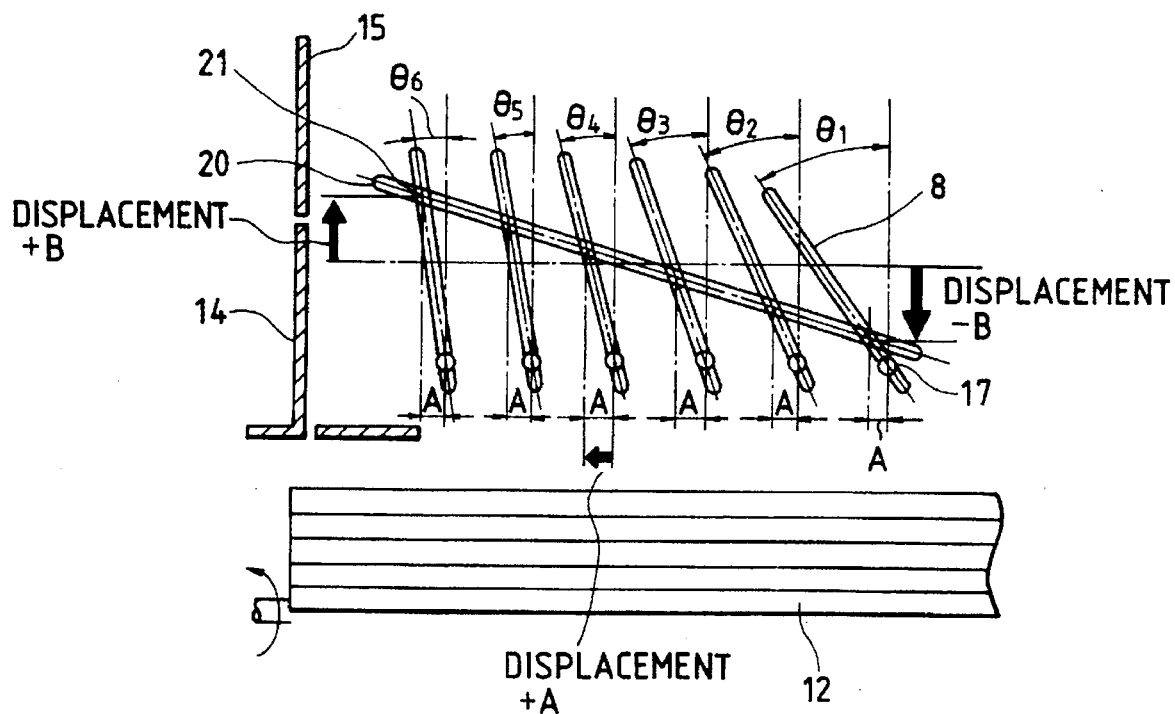
FIG. 18 shows the guide vanes on the right side according to a sixth embodiment of the present invention.

FIG. 18 illustrates another embodiment of the present invention. It shows in detail the guide vanes located to the right side of the guide vane arrangement which are inclined to the right. This inclination can be attained by a similar method to that of FIG. 1. In Embodiment 1, a variable motor 29 is rotated counter clockwise, the rod 20 is moved to the left and this motion is transferred to the left and right cantilevers 25 and 26. The left and right cams 23 and 24 are then rotated clockwise around the rotation shafts 27 and 28 respectively, and the rod 20 is inclined by +B at its left end and −B at its right end. These inclinations are measured relative to the straight line connecting the respective pivots 17. Next, the rotation shaft 38 of the variable motor 31 is rotated to rotate the cantilever 32 so that the rod 20 is moved by the displacement +A to the right via the pivot 34. Conversely, in this embodiment, when the variable motor 29 is rotated clockwise, rod 20 is moved to the right and this motion is then transferred to the left and right cantilevers 25 and 26. The left and right cams 23 and 24 are rotated counter clockwise around the rotation shafts 27 and 28 respectively, and the rod 20 is then inclined by −B at its left end and +B at its right end. These inclinations are measured relative to the straight line connecting the respective pivot 17. Furthermore, when the rotation shaft 38 of the variable motor 31 is rotated to rotate the cantilever 32, rod 20 is moved to the right by +A via the pivot 34. Subsequently, the distances between the pivot 17 and the intersections 21 become gradually larger from the far left guide vane to the far right guide vane. Accordingly, the inclinations of the respective guide vanes 8 become gradually smaller from $\theta_1$ to $\theta_6$. The cantilever 32 is pivotally held by the rod 20 via the pivot 34. This is similar to the manner of that embodiment 1, except that a groove in the cantilever 32 makes the pivot 34 movable in the longitudinal direction of the cantilever 32. Therefore, it becomes possible to absorb the displacement +B when the rod 20 is inclined.

Figure 19:
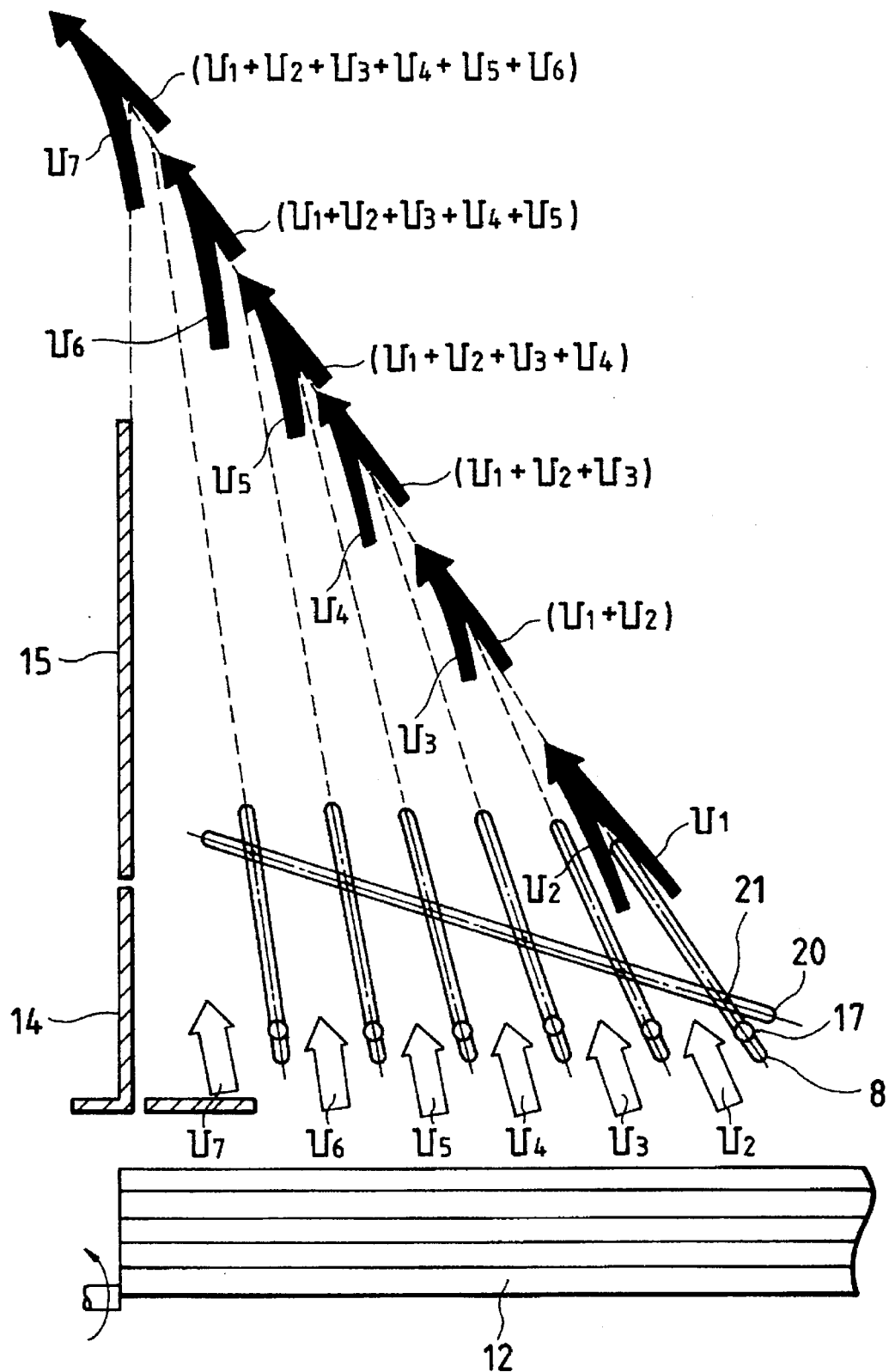
FIG. 19 shows the air flow pattern in the vicinity of the guide vanes on the right side, according to the sixth embodiment of the present invention.
Figure 20:
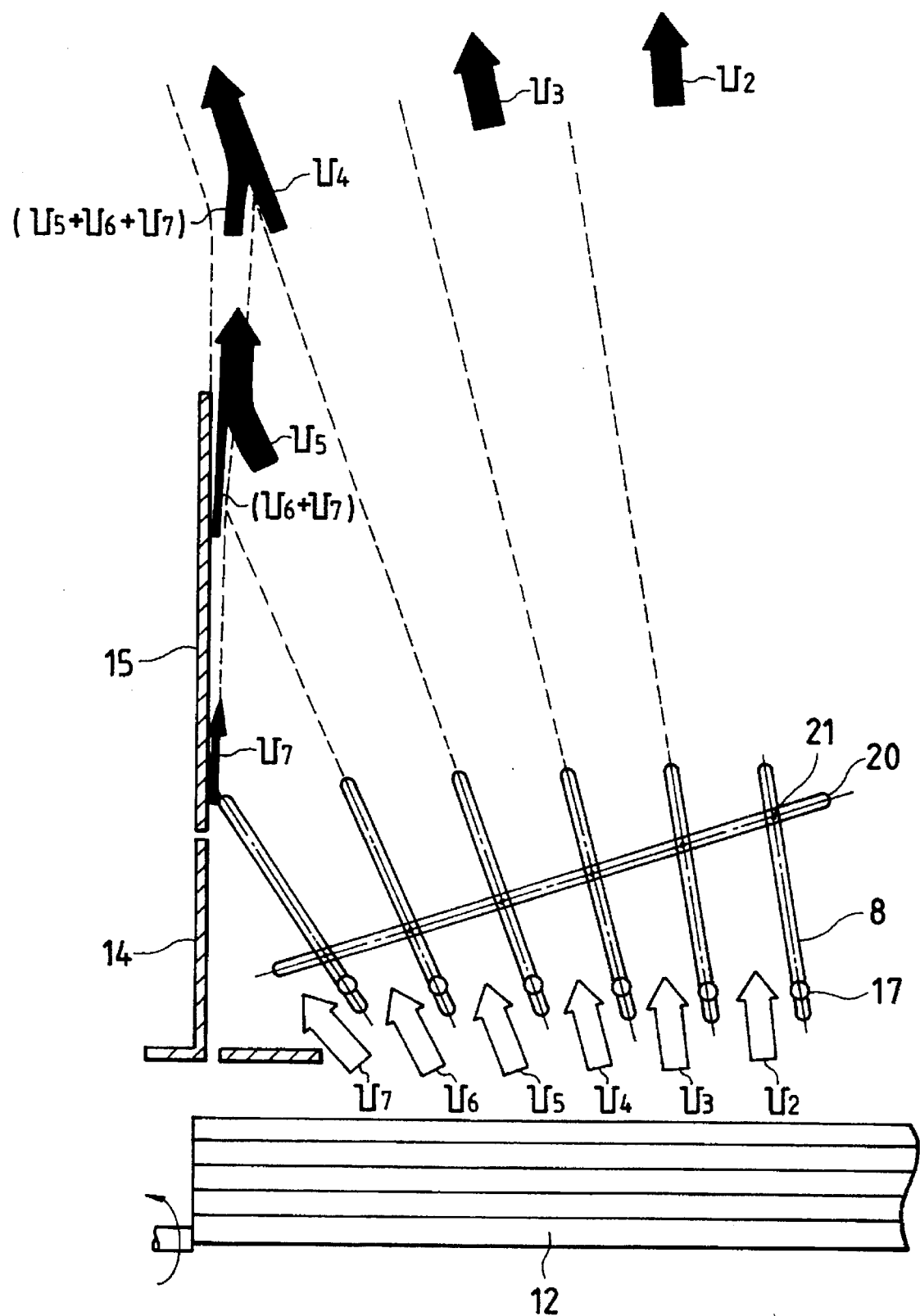
FIG. 20 shows the air flow pattern in the vicinity of the guide vanes on the right side according to the first embodiment of the present invention.

The operation of this system will now be described. FIGS. 19 and 20 show the air flow near the right guide vanes in accordance with this embodiment and embodiment 1. This air pattern occurs when the air flow exciting the guide vane to the far left or far right of the arrangement interferes with the left or right wall of the nozzle or front panel. This usually occurs when the inclinations of the guide vanes are large or when the distance between the guide vanes and the outlet nozzle is large. In such a case, if the inclination of each guide vane is made larger as the end of the guide vane arrangement is approached as shown in FIG. 20, then the air flows $U_5-U_7$ collide with the right side wall 14 of the nozzle and front panel and form into a forward straight flow expressed by the composite vector $(U_5+U_6+U_7)$. Accordingly, after being blown out of the nozzle, the flow can be inclined only in the direction of the composite vectors $(U_5+U_6+U_7)$ and $U_4$. In such a case, the inclination angle is made smaller as the end of the arrangement is approached. This prevents the interference of the flow with the right side wall 14 of the nozzle and front panel. The inclination angle of the far guide vane is made to have a large inclination angle and therefore no interference occurs. As shown in FIG. 19, composite vectors $(U_1+U_2)$, $(U_1+U_2+U_3)$, D, and $(U_1+U_2+U_3+U_4+U_5+U_6+U_7)$ are formed between the flow $U_1$ of the guide vane flows to the left and the flow $U_2$, between the composite flow $(U_1+U_2)$ and the flow $U_3$, etc., so that it is possible to incline the flows on a large scale. When this invention is used, it is possible to reduce the static pressure loss previously caused by a part of the blow colliding with the right side wall 14 of the nozzle and the right side wall of the front panel. Subsequently, the quantity of conditioned air can be increased.

Figure 21:
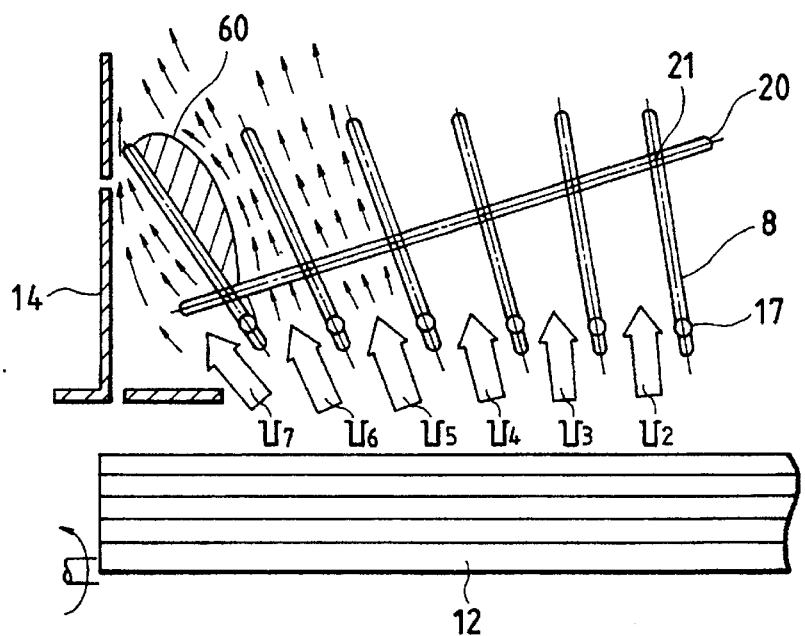
FIG. 21 shows flows separation around the guide vanes on the right side when the vanes according to the first embodiment of the present invention are inclined rightward.

When the system is in an air cooling mode and operating as in Embodiment 1, and the inclination angle of the guide vane to the far end of the arrangement is large, a separation area 60 is produced on the negative pressure side of the guide vane as shown in FIG. 21. This negative pressure area entrains air with a high temperature and a high moisture content which will produce dew drops upon coming in contact with the low temperature guide vane. Since these dew drops will be blown into the room, it is necessary to consider a way of draining them before they are blown off. In the case of this embodiment, however, the inclination angle of the guide vane furthest to the right is so small the separation area 60 on the negative pressure side is also very small. In this case it is therefore not necessary to provide a dew drop drain.

Although this method is not located near the guide vane on the far right inclined to the right was described in the above embodiment, it applies equally well to the far left guide vane inclined to the left.

Figure 22A:
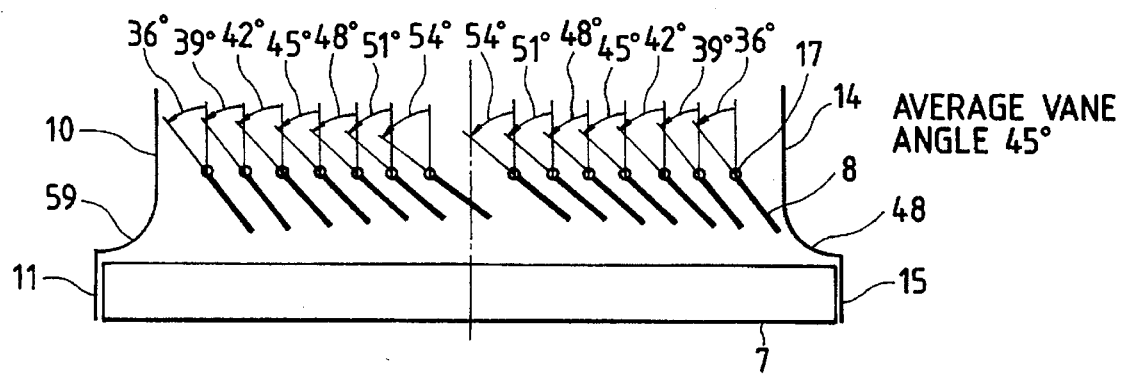
FIGS. 22a and 22b show that the average guide vane angle can be made to be 45°, according to the sixth embodiment of the present invention.
Figure 22B:
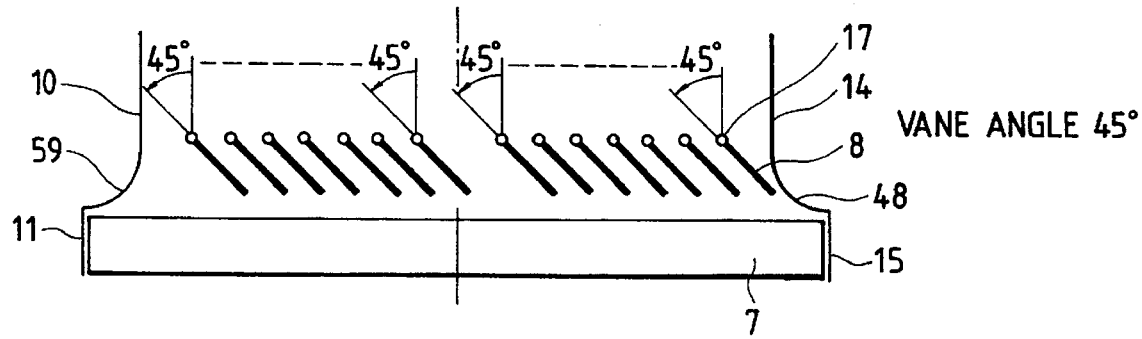
Figure 23:
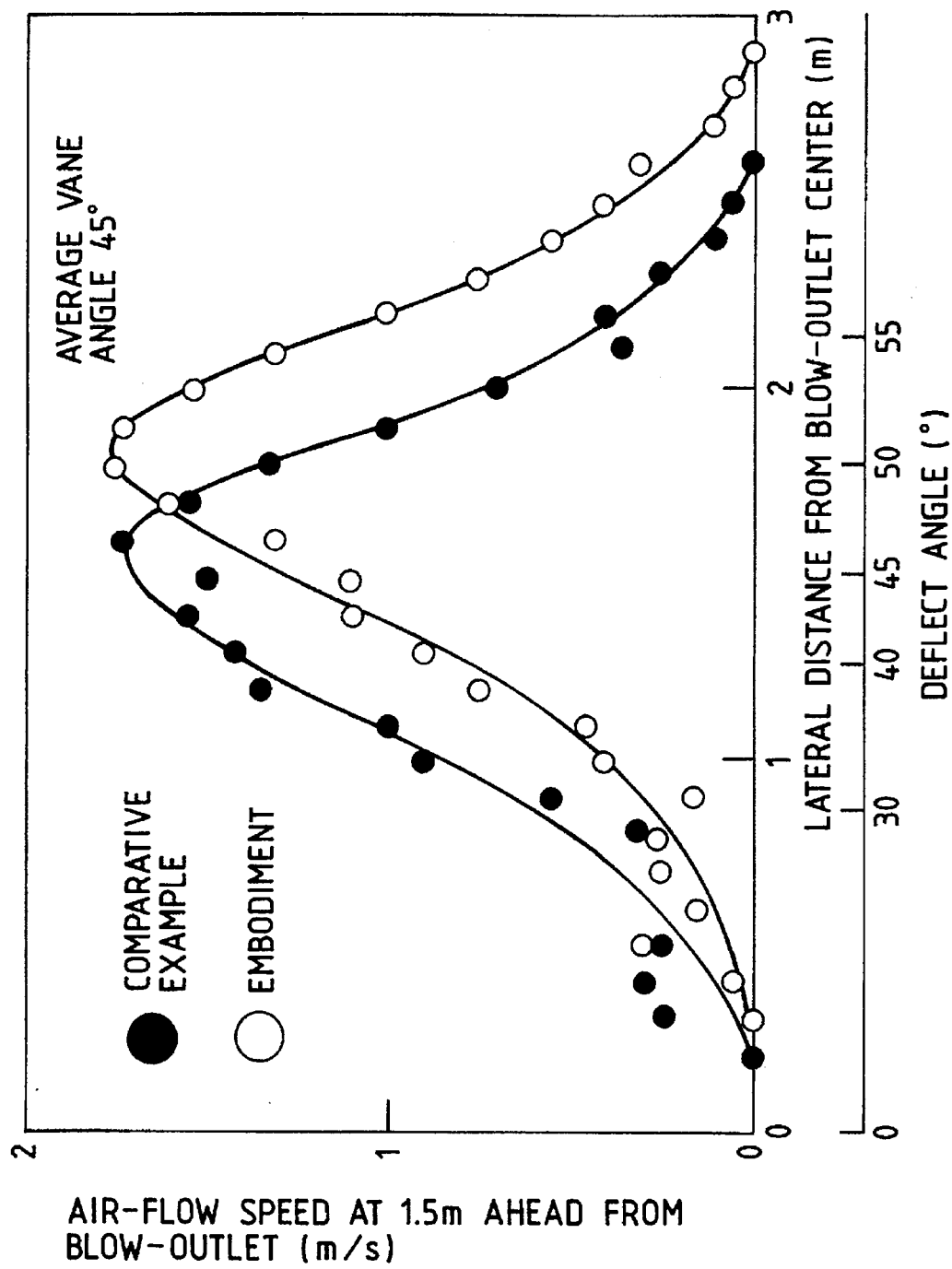
FIG. 23 shows the results when the average guide vane angle is made to be 45°, according to the sixth embodiment of the present invention.
Figure 24A:
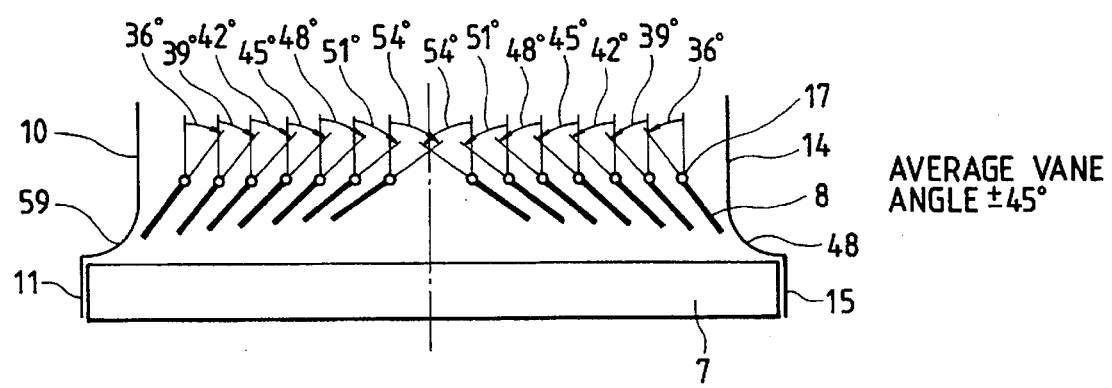
FIGS. 24a and 24b explain the results when the average guide vane angle is made to be ±–45°, according to the sixth embodiment of the present invention.
Figure 24B:
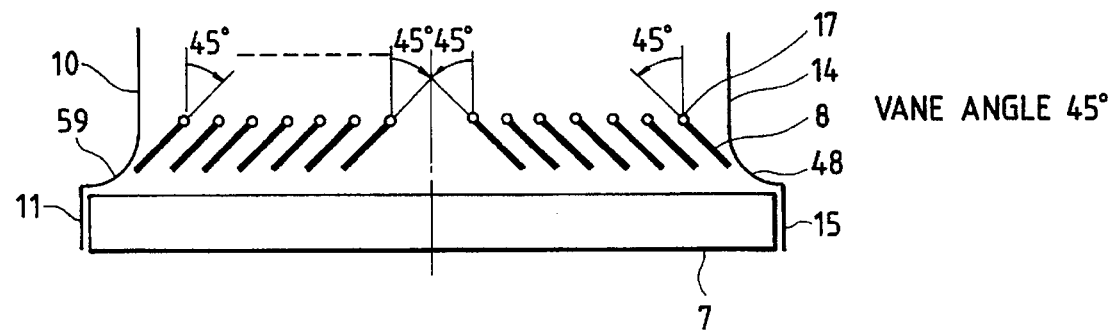

FIG. 23 shows the distribution of air velocity at 1.5 m in front of the air outlet when using the two mechanisms shown in FIGS. 22a and 22b, respectively. In FIGS. 22a and 22b, the reference numeral 59 represents a left side wall. The distance between the left side wall 11 and the right side wall 15 is made gradually larger, forming a bell shape as the outlet of the unit is approached. FIG. 22a shows the mechanism for directing the air flow as described in embodiment 3. In this mechanism, the left and right sets of 7 guide vanes are made smaller by 3° increments, i.e., from 54° to 51° to 48°, etc. finishing at 36°. The angles are largest between the vanes which are positioned in the center of the unit. An average angle of 45° is thus obtained. FIG. 22b is the conventional mechanism for directing the flow of air in which all the guide vanes, 14 total, are inclined by 45°. According to FIG. 23, the distribution of outlet velocity does not significant vary between the embodiment and the conventional example. However, a relatively large deflection angle of 50° can be obtained in the embodiment compared with 45° in the conventional example. According to the embodiment, it is possible to deflect the air through a large angle with a high degree of accuracy. FIG. 25 shows the distribution of the conditioned air at a position 1.5 meters in front of the air outlet when using both the conventional and the previously described mechanism for controlling the direction of air flow. In both instances, air is being blown out in a wide mode and the guide vanes are arranged as shown in FIGS. 24a and 24b. FIG. 24a shows the air directing mechanism described in embodiment 6. In this mechanism, the left and right guide vane sets are each composed of 7 guide vanes and their inclination angles have been made smaller in +3° increments: ±54°, + or ±51°, . . . ±36°, from the center of the arrangement to the end. Overall, this results in an average angle of 45°. FIG. 24b shows the conventional air detecting mechanism in which there are seven guide vanes in both the left and right sets, each inclined at 45°. According to FIG. 25, it is possible to reduce a greater quantity of air blown in the forward direction by the wide mode embodiment than by the wide mode comparative example. This effectively means that the embodiment can direct air more accurately in both the left and right directions. Therefore, if the air directing mechanism shown in this embodiment is used together with a human body sensor, then the conditioned air flow can automatically be controlled so that either a hot air current or a cold air draft is not directly aimed at the human. Accordingly, it is possible to uniformly heat a room as a whole.

Figure 26:
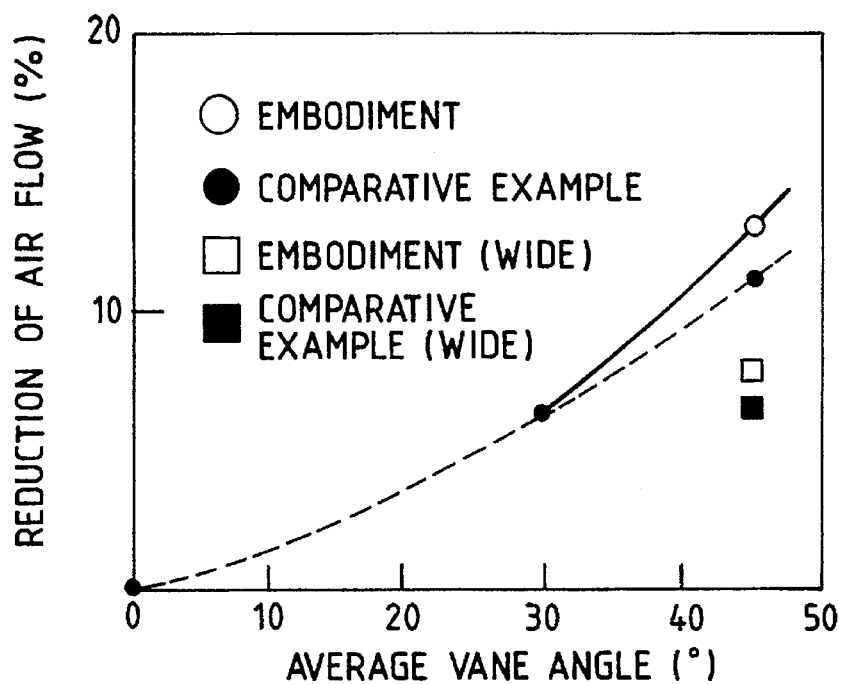
FIG. 26 shows the rate of reduction of the quantity of conditioned air relative to the guide vane angle according to the sixth embodiment of the present invention.

FIG. 26 shows the ratio of the reduction of conditioned air to the quantity of air blown forward versus the average guide vane angle when the air directing mechanism is configured as shown in FIGS. 22a, 22b, 24a, and 24b. In the figure, the vane angle in the embodiment is made smaller in three degree increments with an average vane angle of 45°, and smaller in two degree increments with an average vane angle of 30°, with the central vanes having the largest angles. In a wide mode, the average angle is made to be ±45°. It can be seen from the figure that by using a mechanism for directing the air flow similar to that of the embodiment, that it is possible to obtain a large deflection angle in comparison with the ratio of the reduction of conditioned air to the quantity of air blown forward. This is very small (1%) relative to the conventional example when the guide vanes have a deflection angle of 45°.

It is possible to deflect an air current by a large amount both when the distance between the guide vanes and the air outlet nozzle is large as described in the above embodiment, and when it is small. When this distance is small, the reduction in the quantity of conditioned air can be further restrained.

Embodiment 7

Figure 27:
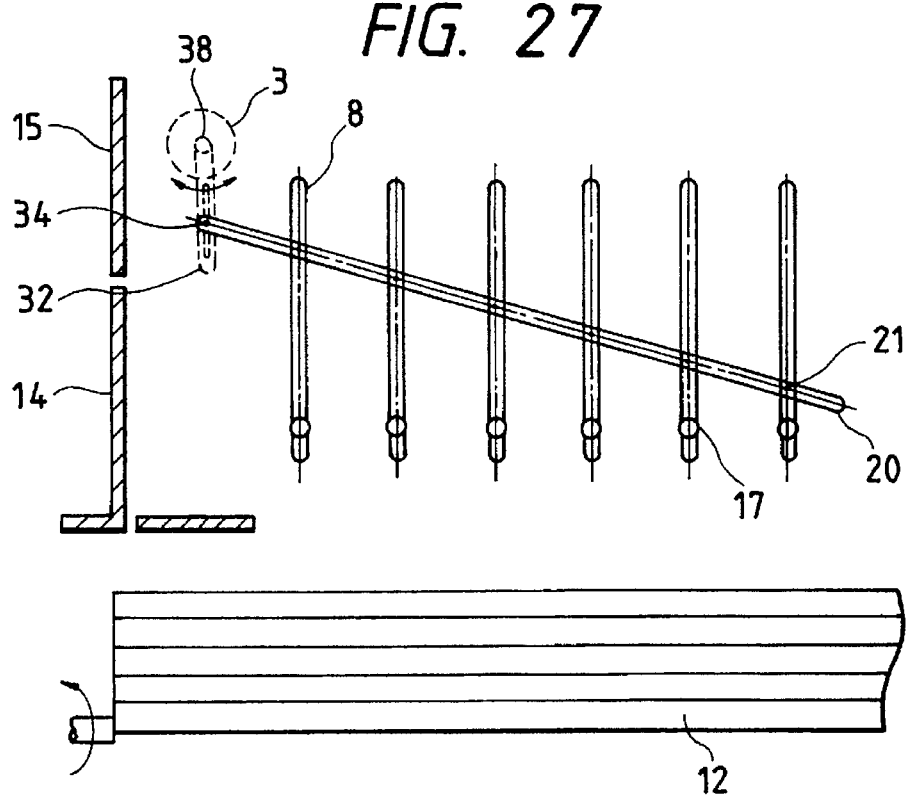
FIG. 27 shows the guide vanes on the right side according to a seventh embodiment of the present invention.

FIG. 27 shows another embodiment of the present invention, in which the location of the intersections 21 between the guide vanes 8 and the rod 20 are fixed, and the distance is between the pivot 17 and the intersections 21 are made gradually larger from the left side towards the right side. Only a variable motor 31 is used as a driving system for controlling the angles of the guide vanes. With such a configuration, although the difference of inclination between the most inclined guide vane and the least inclined guide vane cannot be changed, the mechanism for changing the difference of the inclination angles, that is, the left and right cams 23 and 24, left and right cantilevers 25 and 26, rotation shafts 27 and 28, variable motor 29, cantilever 30, and so on, can be omitted, so that the mechanical reliability is increased with a reduction in cost.

If shafts 21 on the rod 20 are located to make all the guide vanes parallel with a vane inclination angle of 0°, it is possible to prevent the quantity of conditioned air from decreasing. This enables the range of delivery to be increased.

When the rotation centers of the guide vanes and the connection point of the guide vanes and a connection member are made different from one another, and only the variable motor 31 is used as a driving system, the system can be applied to embodiments 1 and 2 with an effect similar to that of this embodiment.

Although the mechanism for controlling the flow of air form an air conditioning unit was described in the above embodiment, this embodiment may be applied to other air conditioning units with an effect similar to that described above.

Although in the above embodiment a human body was regarded as the object toward which the conditioned air should be directed, any object may be regarded as the target for which conditioned air should be supplied. The only change to the system required is to replace the human sensor with a relevant sensor.

Embodiment 8

Figure 28:
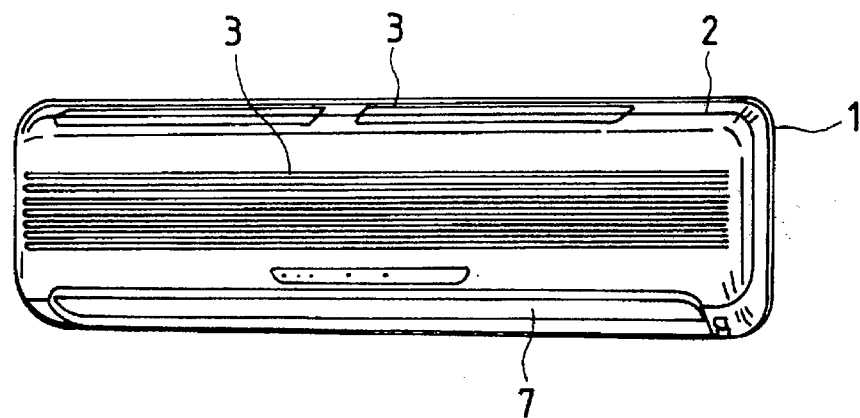
FIG. 28 shows the air-conditioning unit according to an eighth embodiment of the present invention.
Figure 30:
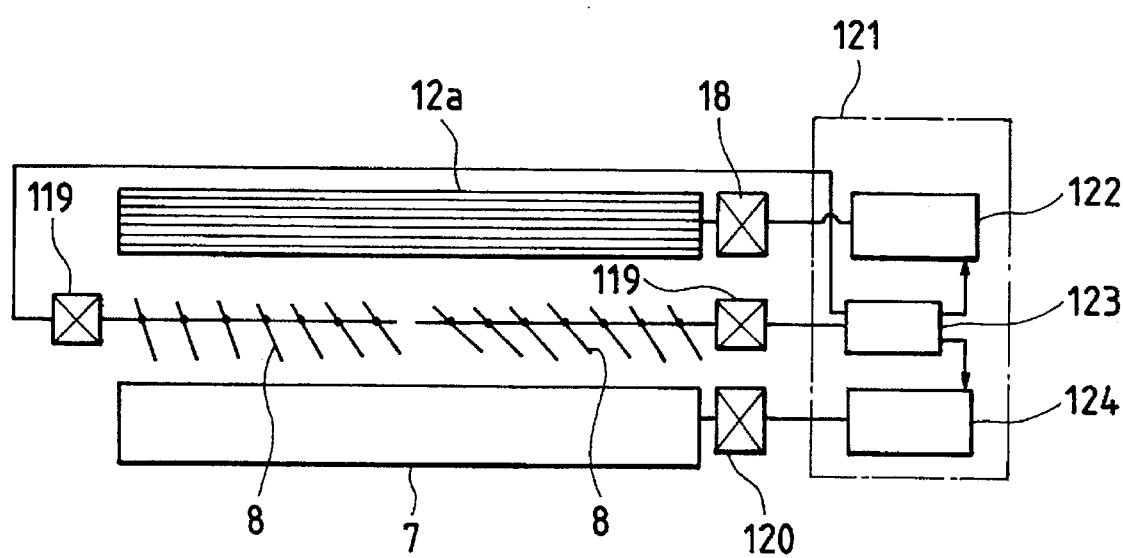
FIG. 30 is a typical view of a controller for the air outlet of the air-conditioning unit of FIG. 28.
Figure 29:
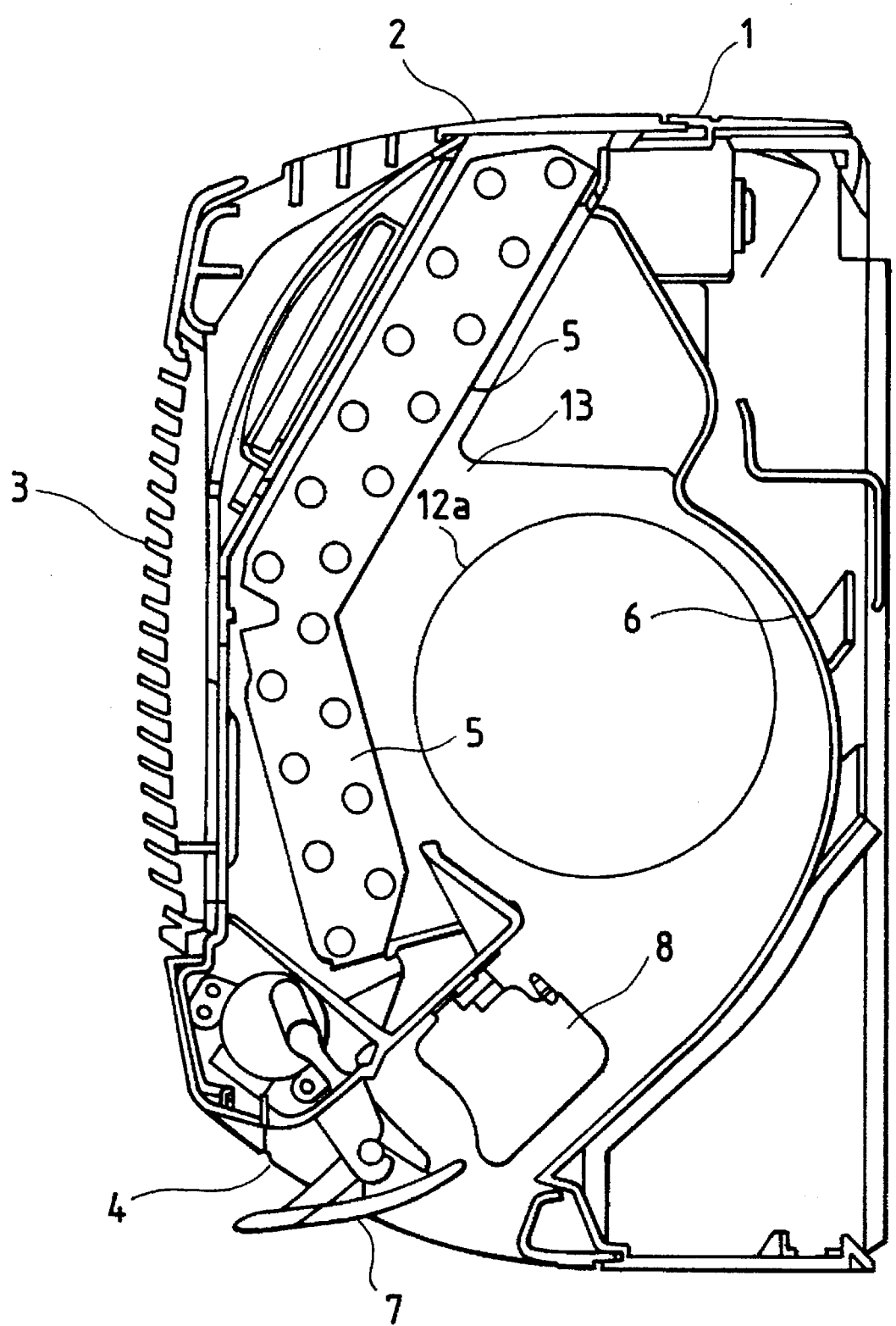
FIG. 29 is an enlarged vertical section through the side view of FIG. 28.
Figure 31:
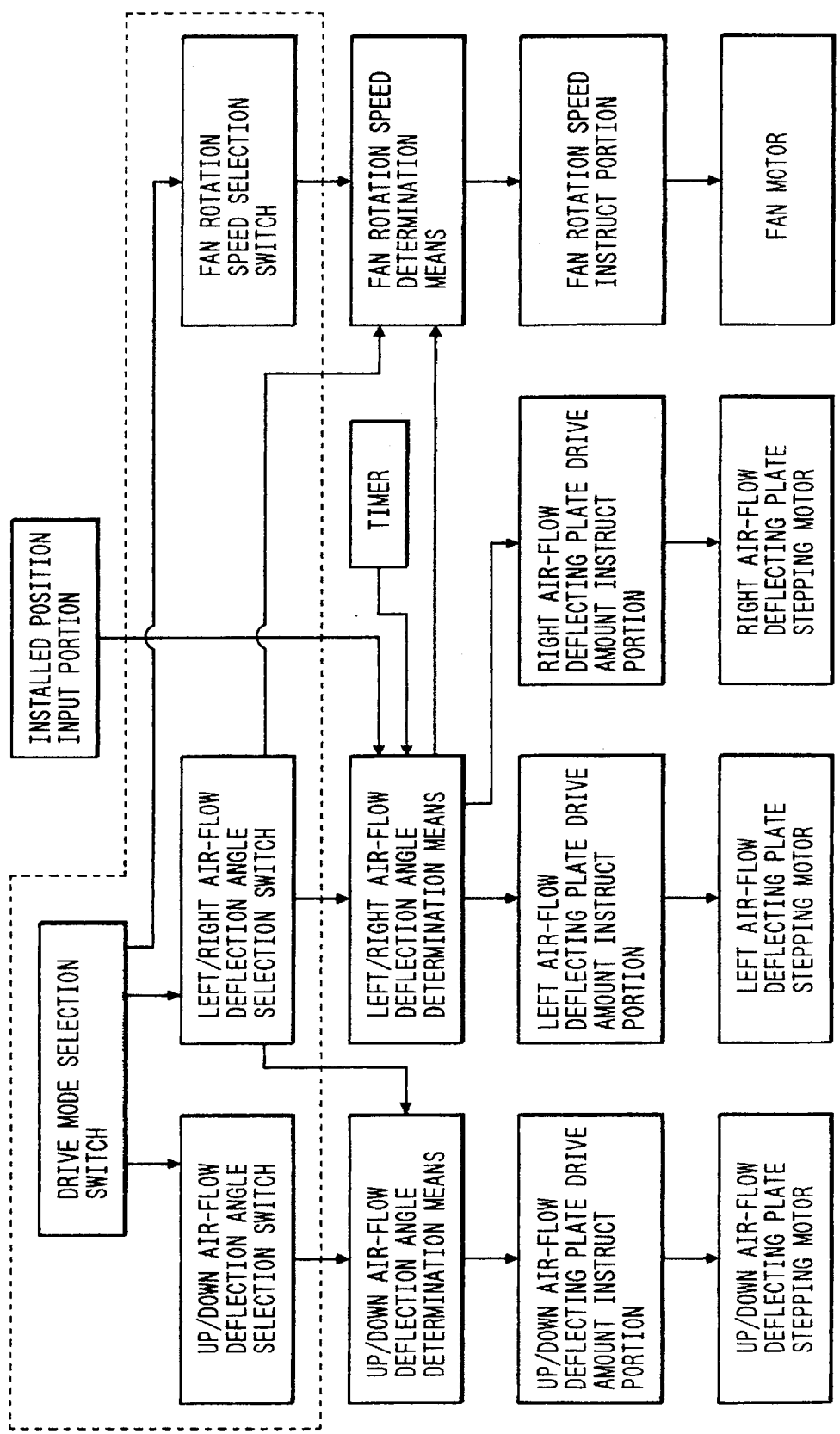
FIG. 31 is a system diagram of the air-conditioning unit of FIG. 28.
Figure 32:
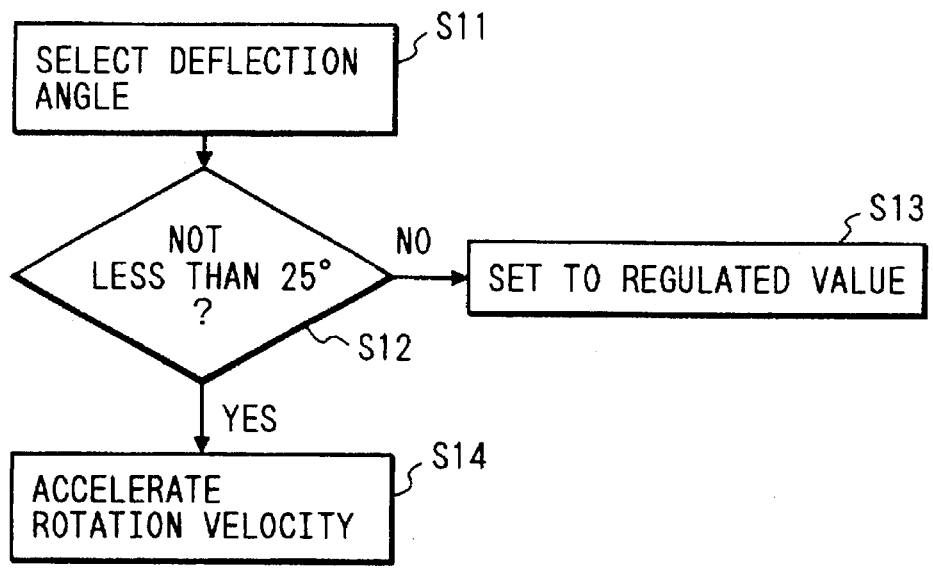
FIG. 32 is a flow chart which explains the operation of the air conditioning unit of FIG. 28.

FIGS. 28–32 are views illustrating another embodiment of the present invention. FIG. 28 shows an air conditioning unit; FIG. 29 shows an enlarged side view of a vertical section to FIG. 28; FIG. 30 shows the control apparatus for the air discharge system of FIG. 28; FIG. 31 shows the air discharge system diagram of the air conditioning unit of FIG. 28; and FIG. 32 shows a flow chart for explaining the operation of the air conditioning unit of FIG. 28. In the Figures, reference numeral 1 represents the units body, reference numeral 2 represents the front panel which covers the front side of the body 1 and has an air inlet opening 3, reference numeral 4 represents an air outlet in the lower portion of the front side of the body 1, reference numeral 5 represents a heat exchanger located between the fan and the air inlet 3, and reference numeral 6 represents an inner casing which forms an air course 13.

Reference numeral 7 represents an up/down air deflection plate located in the air outlet 4. This is pivotally attached to the left and right side wall of the air outlet 4 via a shaft fixed to the left and right ends of the unit. It consists of vanes which can direct the flow of air both horizontally and vertically, reference numeral 8 represents a series of left/ right air deflection plates (guide vanes) which are pivotally held between the walls of left and right ends of the air outlet 4. These guide vanes can direct the flow of air to the left/right. Reference numeral 12a represents a cross flow fan located in the air course 13 and is driven by motor 18.

The reference numeral 119 represents stepping motors which are used to change the inclination angles to the left/right air deflection plates 8, and reference numeral 120 represents a stepping motor which is used to change the inclination angle of the up/down air deflection plates 7.

The reference numeral 121 represents a control device. This has a rotational velocity instruction portion 122 for the motor 18, a driving quantity detection portion 123, and a driving quantity instruction portion 124 for the motors 119 and 120.

In a mechanism for controlling the air flow from an air conditioning unit with a configuration as described above, the direction of the air flow exiting the cross flow fan 12a is controlled by the left/right air deflection plates 8 and the up/down air deflection plates 7. The deflection angle of the left/right air deflection plates 8 and the up/down air deflection plates 7 are changed by the motors 119 and 120. The rotational velocity of the motor 18 is controlled by the rotational velocity instruction portion 122. The driving quantities of the motors 119 and 120 are controlled by the driving quantity detection portion 123 and the driving quantity instruction portion 124.

FIG. 31 shows a system for deciding the instruction contents of the above instruction portions of the control device 121. That is, though not shown in the drawing, respective selection switches are operated manually to select running conditions such as cooling, heating, dehumidifying, etc. The following selections can also be performed: the selection of an up/down air deflection angle, the selection of a left/right air deflection angle, and the selection of the rotation of velocity of the cross flow fan 12a.

Correction as follows is performed in accordance with respective selected conditions, so that they up/down air deflection angle, the left/right air deflection angle, and the rotation of velocity of the cross flow fan 12a are decided and supplied from the respective instruction portions.

The operation of the mechanism for controlling the flow of air from an air conditioning unit such as that described in embodiment 8 will now be described with reference to the flowchart in FIG. 32. That is, the deflection angle of the left/right air deflection plates 8 is selected in step S11, the right side and the left side of the deflection plates 8 are driven in the right and left directions by the motors 119 and 120, and the time of the maximum deflection is zero pulses. Thus, the deflection angles are set.

The processing is advanced to step S12, and then advanced to step S14 when the input values of the motors 119 and 120 are not more than 160 pulses and not less than 420 pulses, that is, when the deflection angle of the left/right air deflection plates 8 is 25° or greater, and the rotational velocity of the cross flow fan 12a is accelerated to more than its standard value. The processing is advanced to step S13 when the deflection angle of the left/right air deflection plates 8 is less than 25°, and the rotational velocity of the cross flow fan 12a is set to a rated value.

If the deflection angle of the left/right air deflection plates 8 is 25° or greater, then the conditioned air current is separated and air from the conditioned space will flow into the outlet 4. As a result, dew drops will form when the unit is in a cooling mode.

As the quantity of air blown from the air unit becomes lower, high temperature air is apt to flow into the outlet 4. If the volume of the air passing through the unit is low, then so too will be the temperature of the air as it discharges from the unit. This phenomenon will accelerate the formation of dew drops upon the outlet 4.

Therefore, when the angle of the left/right air deflection plates 8 is greater than 25°, the rotational velocity of the cross flow fan 12a is increased above a standard value. This ensures that the temperature of discharge air current will be higher than normal and thus air within the conditioned space will not be able to flow into the air outlet 4 and consequently condense. The above control system does not need any special detectors and can be employed without any additional constituents. When the unit is configured as above, it is possible to supply air to a space through a large air outlet area. This will prevent the conditioned space from having temperature disuniformity and thus being less comfortable as would occur with conventional units.

In addition, since the control system mentioned above restrains the quantity of conditioned air from decreasing in a heating mode, it is possible for the air flow to reach the floor of the conditioned space and thus improve the level of comfort.

Embodiment 9

Figure 33:
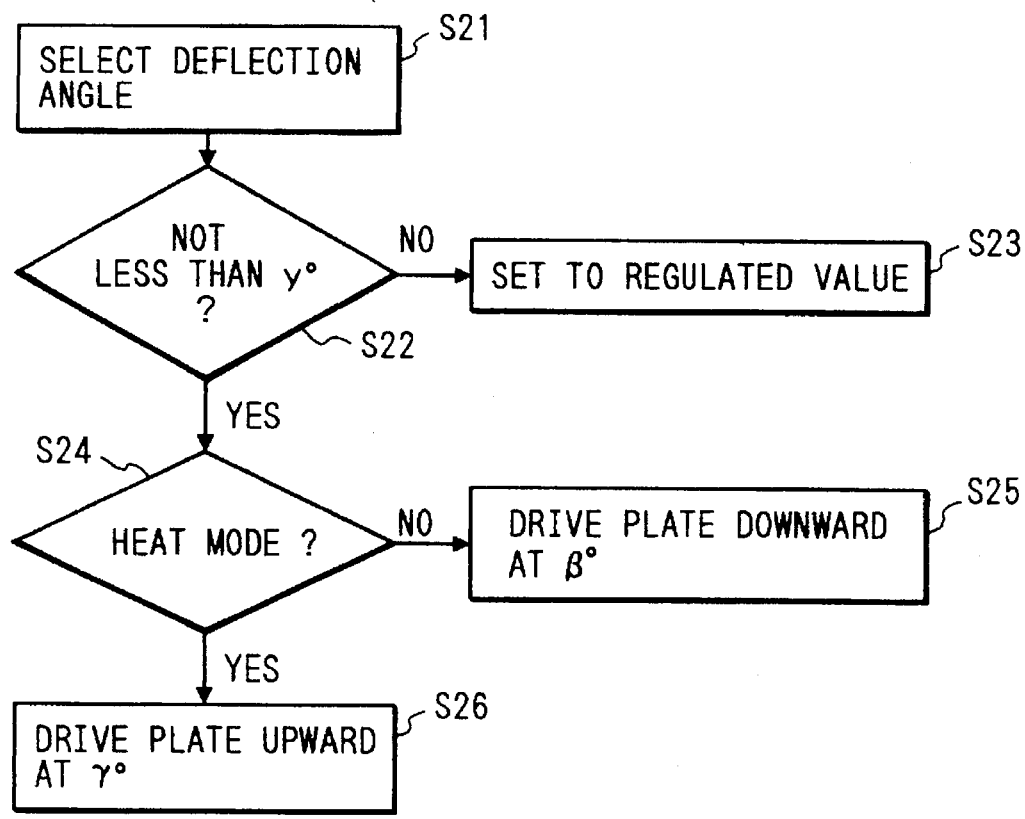
FIG. 33 shows a flow chart which explains the operation of the mechanism which controls the direction of air flow from an air conditioning unit according to a ninth embodiment of the present invention.
Figure 34:
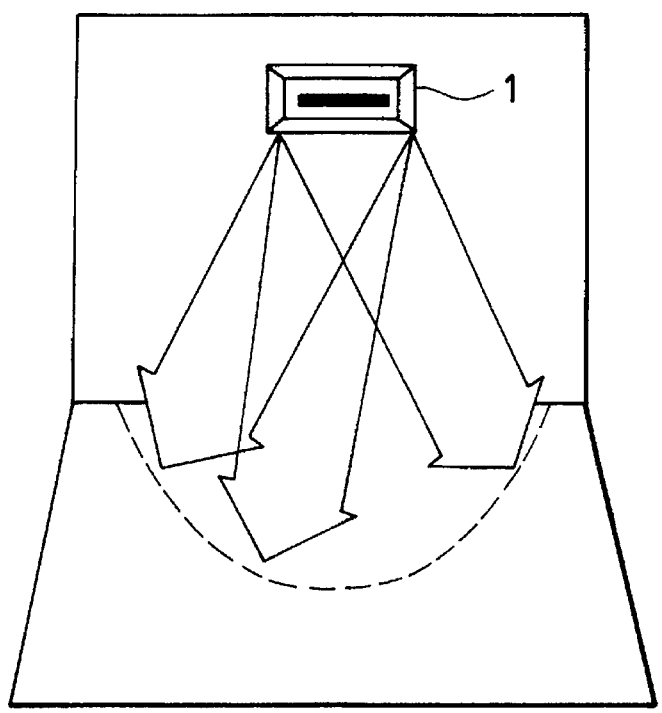
FIG. 34 shows the general air flow pattern from the air-conditioning unit of FIG. 33.
Figure 35:
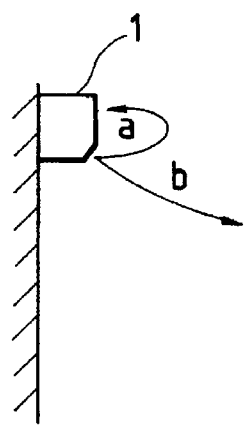
FIG. 35 shows the direction of the air flow from and into the air-conditioning unit of FIG. 33.

FIGS. 33–35 show a further embodiment of the present invention. FIG. 35 is a flowchart that explains the operation of a mechanism for directing the flow of air from an air conditioning unit in this embodiment; FIG. 34 shows an operating condition of the air conditioning unit described in FIG. 33; and FIG. 35 shows another operating condition of the air conditioning unit described in FIG. 33. The mechanism for directing the flow of air from an air conditioning unit as shown in FIGS. 33–35 is configured in the same manner as that in FIGS. 28–32.

The operation of this mechanism with reference to the flowchart presented in FIG. 32 will now be described.

When the deflection angle of the left/right air deflection plates 8 is selected in step S21, the routine will continue to step S22. If the angle of the left/right air deflection plates 8 is smaller than Y°, then the routine will continue to step S23 and the rotational speed of the cross flow fan 12a will be set to a predetermined value. However, when the angle of the left/right air deflection plates 8 is not smaller than Y°, the routine will continue to step S24. If the operating mode is not an air heating mode, then the routine will continue to step S25 and the angle of the up/down air deflection plates 7 will be set to a smaller value than the predetermined value. If, in step S24, the operating mode is an air heating mode, the routine will continue to step S26 and the angle of the up/down air deflection plate 7 will be set to a higher value than the predetermined value.

For example, in an air heating mode, heated air is generally blown downward. If the angle of the up/down air deflection plate 7 is in the predetermined position, then the blown air current will reach the floor of the space at equal distances from the body 1, that is, in a circular arc from its center as shown in FIG. 34.

As is obvious from FIG. 34, as the left/right air deflection angle becomes larger, the air current will reach the floor at a closer distance to the unit. Furthermore, when the unit is configured in accordance with embodiment 9, the location of the human body may be accurately determined by the use of the human body sensor and air can be supplied to the space to ensure comfort levels are at a maximum. When the angle of the left/right air deflection plates 8 is large in the aforementioned condition, then the angle of the up/down air deflection plate 7 is selected to be at a large angle value in order to improve the accuracy where the air flow is delivered so that levels of comfort can be improved.

In the configuration of embodiment 9, the value of the deflection angle Y° is of the left/right air deflection plates 8 is set to be 30° lower than the angle determined by the human body sensor. Furthermore, embodiment 9 improves the ability of the air conditioning unit to accurately supply air to a conditioned space or area whether a human body sensor is used or not.

When the up/down air deflection angle is lower than the predetermined value irrespective of the operating mode, the deflection angle of the left/right air deflection plates 8 is selected to be a larger value. This thereby sets the angle of the up/down air deflection plate 7 to a large value to improve the accuracy in the position where the conditioned air current arrives. Comfort can therefore be improved. When the deflection angle of the left/right air deflection plates 8 is larger or equal to the predetermined value, then the angle of the up/down air deflection plate 7 can be corrected to be a large value which will therefore improve the accuracy in the positions where the conditioned current arrives so that comfort can therefore be improved.

In an air cooling mode, the up/down air deflection plate 7 is generally directed upwards. Accordingly, when the left/right air deflection angle is large, the quantity of conditioned air is reduced so that the speed of conditioned air is lowered. As a result, there is a tendency that the conditioned air current is sucked back into the body 1 through the inlet 3. This is represented by the arrow a shown in FIG. 35. In this condition, the temperature of the conditioned air current falls and dew is deposited onto the air outlet 4 which inhibits the level of comfort in the conditioned space.

A solution to the aforementioned problem is to correct the angle of the up/down air deflection plate 7 to the downward direction and thereby prevent the conditioned air current from entering into the suction inlet 3. As a result, the blown air current can circulate in the living room. A comfortable environment can subsequently be maintained and dew deposition on the air outlet 4 can be prevented.

Embodiment 10

Figure 36:
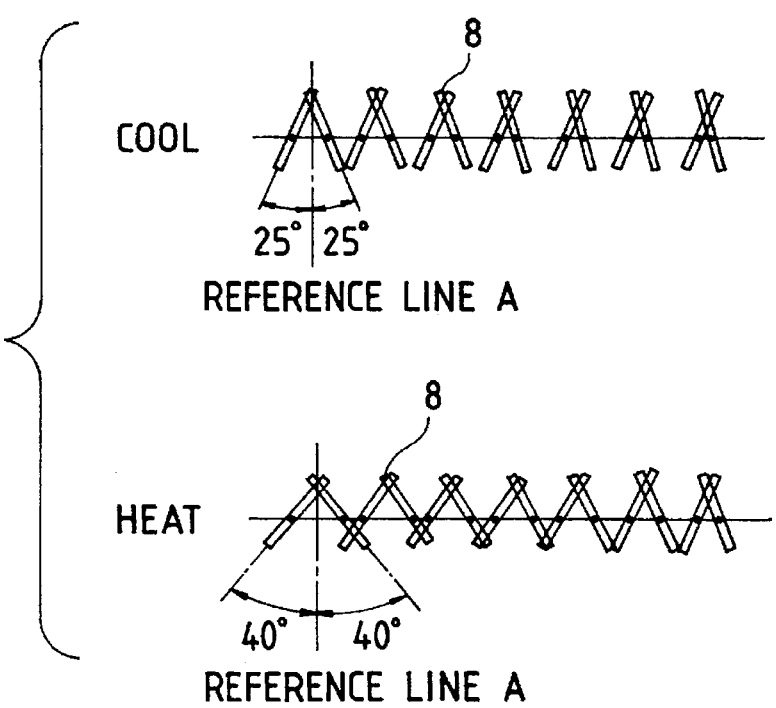
FIG. 36 shows a tenth embodiment of the present invention and a conceptual view showing the angle range of the left/right air deflection plates when the unit is in an air cooling mode.
Figure 37:
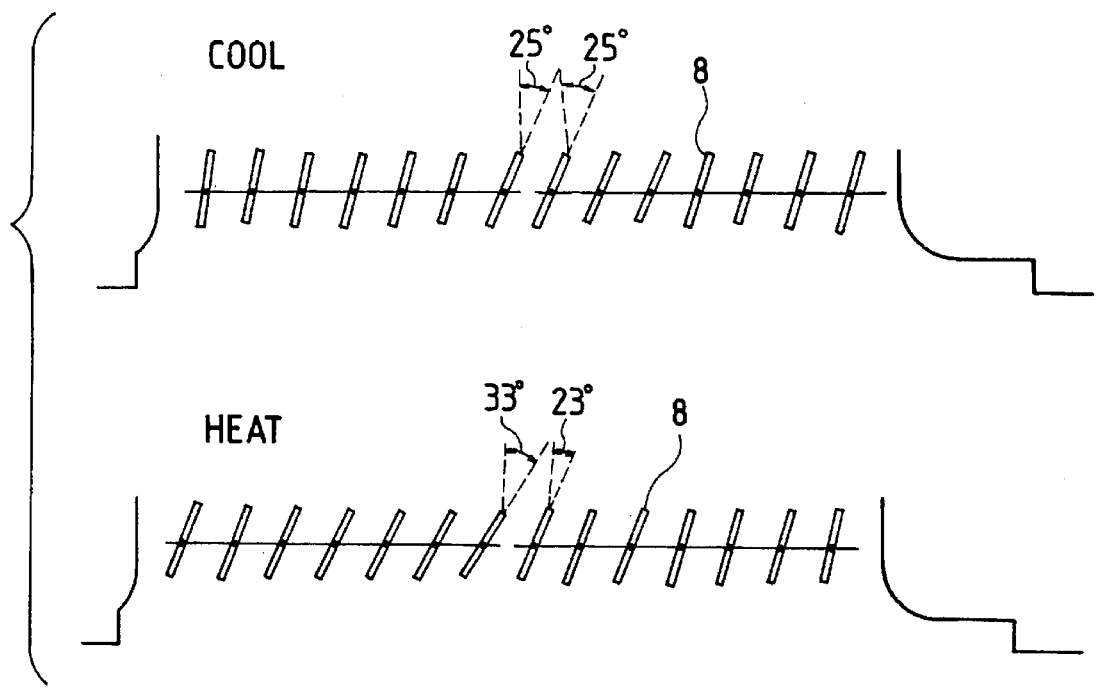
FIG. 37 shows an example of the angles of the left/right air deflection plates in both heating and cooling modes, corresponding to FIG. 36.
Figure 38A:
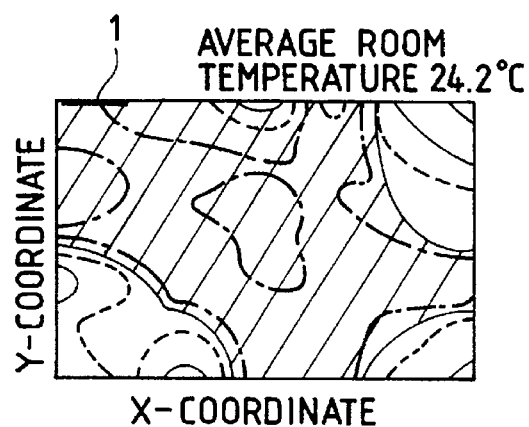
FIGS. 38a and 38b show the air temperature distribution at 50 cm above the floor surface of a room in an air heating mode in accordance with the configuration of FIG. 36.
Figure 38B:
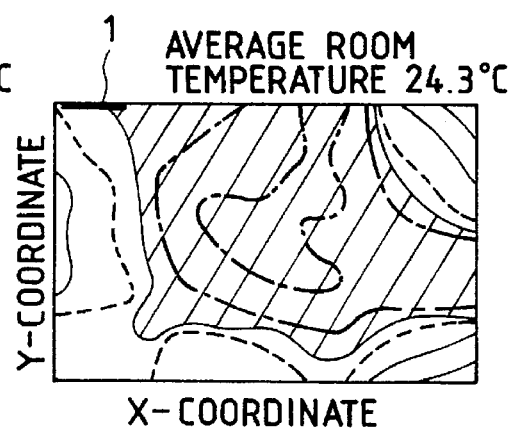
Figure 39:
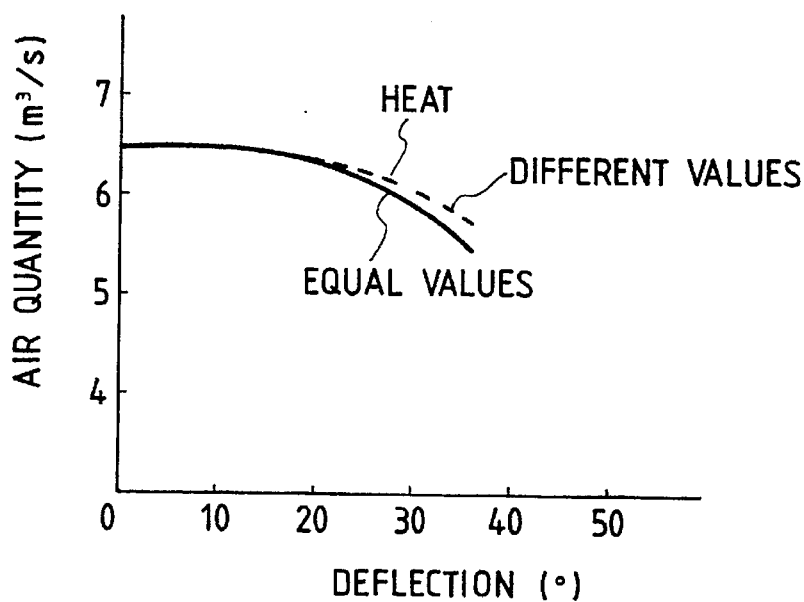
FIG. 39 shows the relationship between the angles of the left/right air deflection plates and the quantity of air, corresponding to FIG. 36.

FIGS. 36–39 show a further embodiment of the present invention. FIG. 36 shows a driving range of the left/right air deflection plates in air cooling and air heating modes in the mechanism for controlling the air flow from an air conditioning unit in this embodiment. FIG. 37 is an example of the left/right air deflection plates similar to those of FIG. 36; FIG. 38 shows the temperature distribution at a height of 50 cm from the floor of the conditioned space in an air heating mode corresponding to FIG. 36; and FIG. 39 shows the relationship between the left/right air deflection angle and the quantity of air discharged from the unit corresponding to FIG. 36. This mechanism for controlling the air flow from an air conditioning unit in FIGS. 36–39 is configured similarly to that in FIGS. 28–32.

In the mechanism, the series of left/right air deflection plates 8 are constructed as shown in FIG. 36. In an air heating mode where it is difficult to circulate air in a space, they are controlled through a wide deflection angle of 40° with respect to the reference line A, shown in FIG. 36. They are made to be perpendicular to the air outlet 4 so that the conditioned air can reach the whole region of the room to be conditioned. When the left/right air deflection plates are controlled in an air cooling mode, they are only moved through a 25° angle which prevents dew deposition on the air outlet 4. This doesn't impair the comfort conditions in the living room because in contrast to heated air, cooled air can be circulated easily.

In this embodiment which is shown in FIGS. 36–39, two driving systems control the left/right air deflection plates 8, so that comfort within the living room can be improved. FIG. 38a shows the temperature distribution at a height of 50 cm from the floor of the conditioned space in the case where the left/right air deflection plates 8 are set at different angle to diffuse the air current. FIG. 38b shows the temperature distribution at a height of 50 cm from the floor of the conditioned space and in the case where the left/right air deflection plates 8 are set at equal angles.

The unit is set in the position marked with a heavy black line in FIG. 38 and air is blown from the unit to the right corresponding to FIG. 37. The shaded region in FIG. 38 is deemed to have a comfortable temperature distribution. A wider shaded region is achieved in FIG. 38a because the air current is diffused as it is discharged.

FIG. 39 shows the relationship between the angle of deflection of the main air current and the quantity of blown air both when the left/right air deflection plates 8 are set to have equal values and when they are set to have different values. As can be seen in FIG. 39, when the angle of deflection of the deflection plates is set to have equal values then the quantity of heated air the unit supplies to the space is less. This shows that setting the deflection plates to different angles not only improves comfort levels in the space but also improves performance.

Although the embodiment shown in FIGS. 36–39 examines where the conditioned air current is diffused, it may be more effective to actually condense the conditioned air current in accordance with the characteristics of the controller 121.

Embodiment 11

Figure 40:
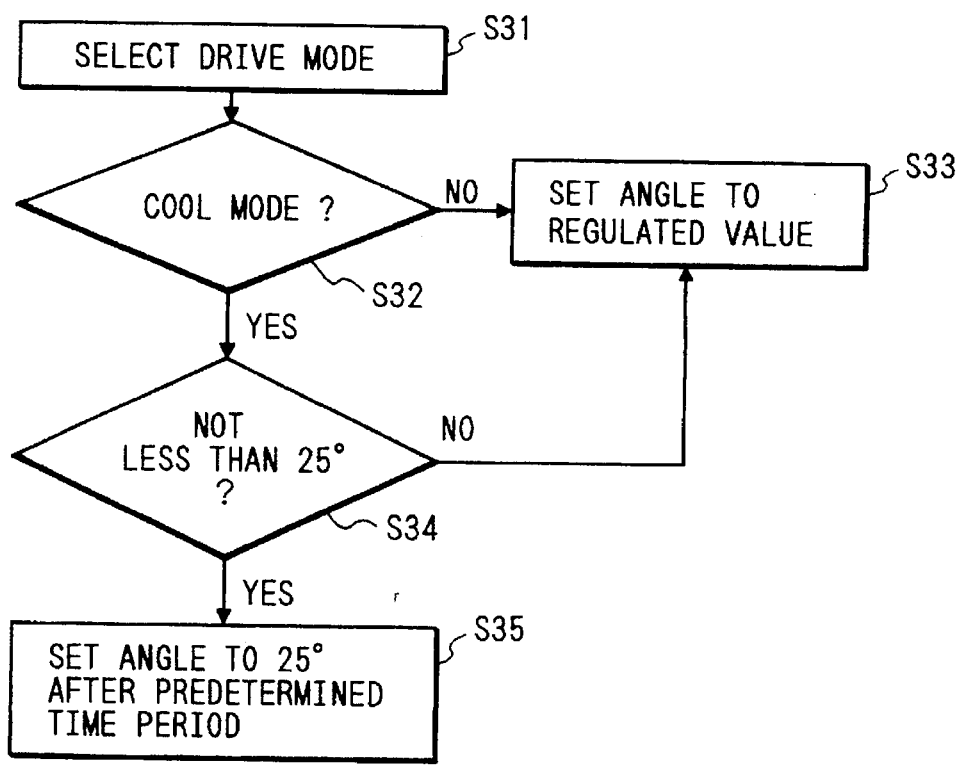
FIG. 40 is a flow chart which explains the operation of the mechanism for controlling the direction of air flow from an air-conditioning unit in accordance with an eleventh embodiment of the present invention.
Figure 41:
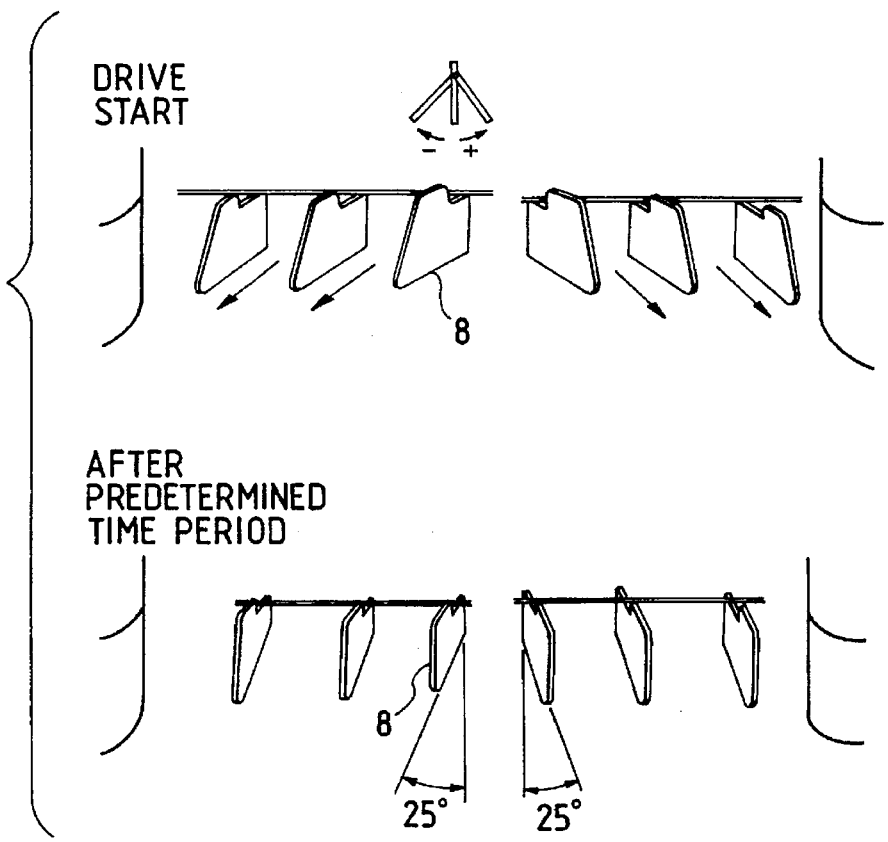
FIG. 41 is a typical view of the left/right air deflection plates during operation of the air-conditioning unit of FIG. 40.

FIGS. 40 and 41 show a further embodiment of the present invention. The flowchart in FIG. 40 explains the operation of the mechanism for controlling the air flow from an air conditioning unit in accordance with this embodiment; FIG. 41 shows the operation of the left/right air deflection plates. This mechanism as depicted in FIGS. 40 and 41 is configured in the same way as that in FIGS. 28–32.

The deflection driving range of the left/right air deflection plates 8 can be widened by applying the following method to the embodiment shown in FIGS. 36–39.

The operation of the mechanism for controlling the air flow from an air conditioning unit is described below with reference to the flowchart shown in FIG. 40.

In step S31, the operating mode of the system is selected and the routine then continues to step S32. If an air cooling mode has not been selected then step S32 is bypassed and the angle of the left/right deflection plate 8 is set to a predetermined value in step S33.

If an air cooling mode has been selected, step S33 is bypassed and step S34 determines whether the angle of the left/right air deflection plates 8 is less than 25°. If so, the routine returns to step S33. If not, then it progresses to step S35. This stage selects a time after the unit has started at which the angle of the deflection plates will return to 25°.

As an example, if the temperature in the conditioned space is high, then it is not desirable for the person occupying the space to suddenly have cold air blown at them. However, once the space temperature has equalized to be similar to the cooling temperature, then it is desirable to have the main air flow directed at the person.

When the angle of the left/right air deflection plates 8 is set to a large value in order to increase the level of comfort at the time the air conditioning process starts, then the air deflection plates cause the flow of air to separate. This causes dew deposition on the air outlet 4. This dew deposition can be prevented by reducing the angle of the left/right air deflection plates 8 and subsequently preventing the air from separating as it leaves the unit.

For this reason, air is blown along the walls of the space to be conditioned so that an unpleasant feeling is not encountered and as soon as the temperature of the space approaches the desired temperature, then the angle of the deflection plates is reduced to 25°. This ensures that dew will not form and that the levels of comfort can be maintained at a maximum.

This effect can also be achieved when the left/right air deflection plates 8 are deflected at equal angles, and air is being blown to the right or left of the body 1.

Embodiment 12

Figure 42:
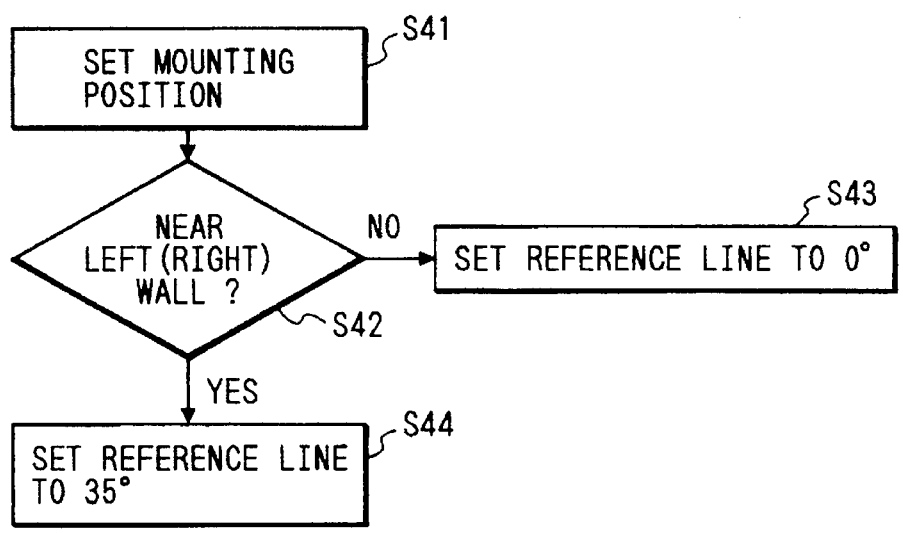
FIG. 42 is a flow chart that explains the operation of the mechanism for controlling the direction or air flow from an air conditioning unit in accordance with the twelfth embodiment of the present invention.
Figure 43:
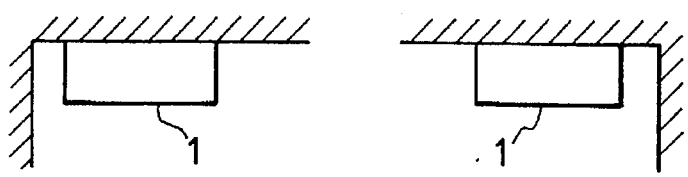
FIG. 43 is a plan view showing an example of mounting the air conditioning unit near a wall using the flow chart presented in FIG. 42.
Figure 44:
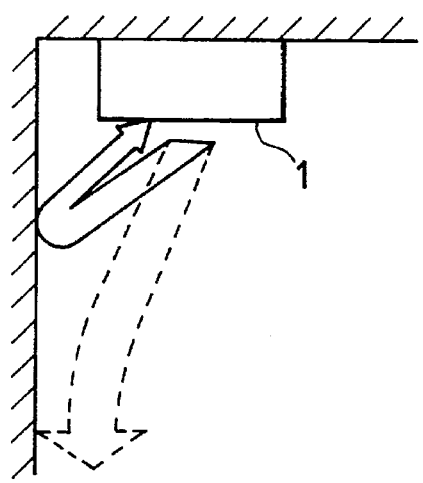
FIG. 44 is a plan view showing the direction of air flow from the unit located as in FIG. 42.
Figure 45:
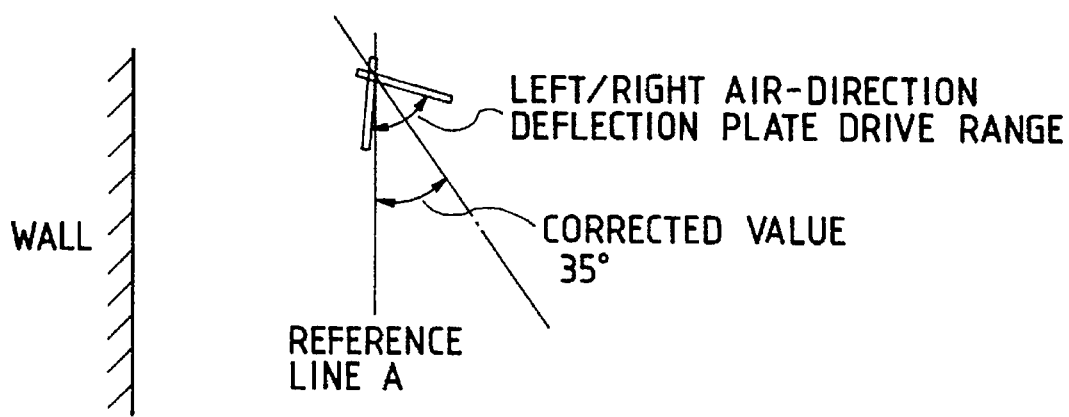
FIG. 45 shows an example of correcting the angle of the left/right air deflection plates in FIG. 44.

FIGS. 42–45 show a further embodiment of the present invention. FIG. 42 is a flowchart that explains the operation of a mechanism for directing the flow of air from air conditioning equipment in this embodiment; FIG. 43 shows an example of when the air conditioning unit of FIG. 42 is mounted on a wall; FIG. 44 shows the air flow conditions of FIG. 42; and FIG. 45 shows an example of correcting the deflection angle of the left/right air deflection plates of FIG. 44. This mechanism depicted in FIGS. 42–45 is configured in the same manner as that in FIGS. 28–32.

The reference line A in FIG. 36 can be corrected according to the mounting position of the unit by applying the following method to the embodiment shown in FIGS. 36–39. The operation of the mechanism for controlling the flow of air from an air conditioning unit will be described below with reference to the flowchart shown in FIG. 42.

Step S41 sets the mounting position. Step S42 determines whether the unit is located near a left or right wall and if neither, then in step S43 the deflection reference line of the left/right air deflection plates 8 are set to 0°.

If step S42 determines that the unit is located near the left or right wall, then the routine continues to step S44. Step S44 sets the deflection reference line of the left/right air deflection plates 8 to be 35 degrees away from the wall as shown in FIG. 45. As shown in FIG. 44, this large angle ensures that air is not recirculated in the unit but is discharged into the space to be conditioned. When the unit has a room temperature sensor, cooled/heated air blown out through the air outlet 4 may come into contact with the room temperature sensor, directly resulting in an incorrect sensor reading. Obviously, in such a case, the room will either be underheated or cooled. To ensure that this does not occur, the angle of the air jet is set so that the blown air current is not reflected off of the wall as is shown in FIG. 44.

Embodiment 13

Figure 46:
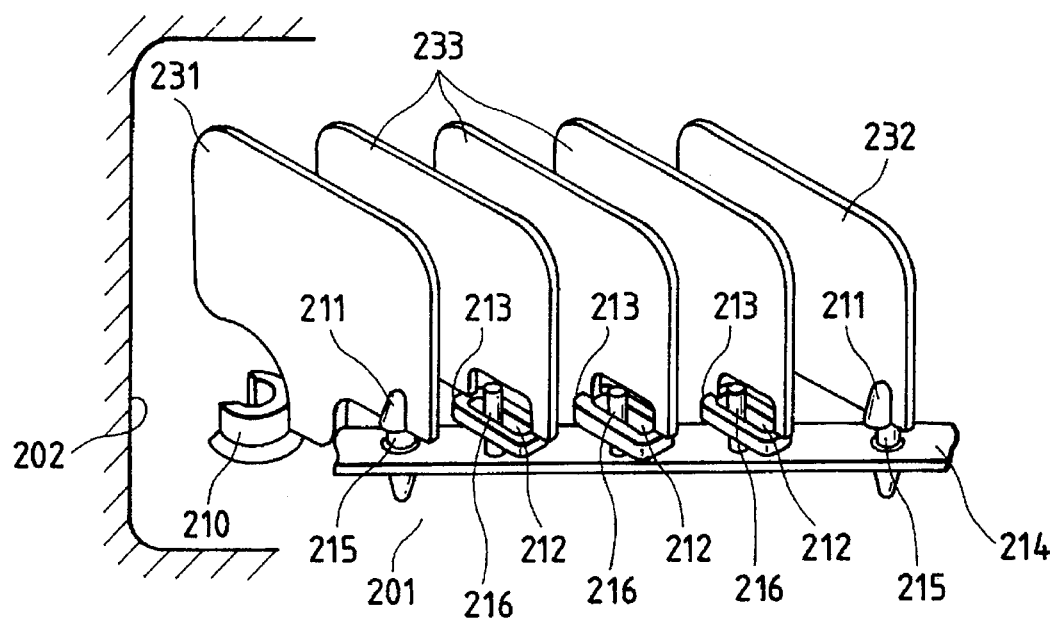
FIG. 46 is a diagram showing a thirteenth embodiment of the present invention.
Figure 47:
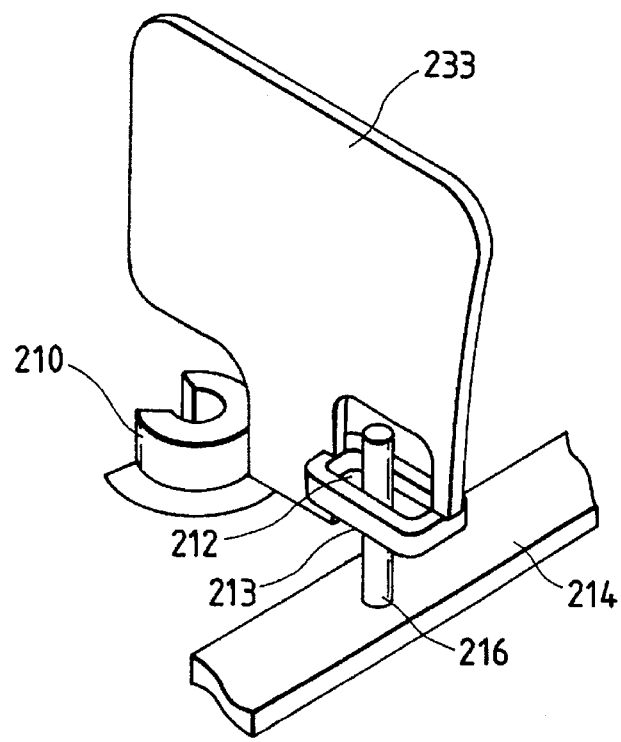
FIG. 47 is an enlarged view of a part of FIG. 46.

FIGS. 46 and 47 show an embodiment of the present invention. FIG. 47 is an enlarged view of the end vane of FIG. 46. In the Figures, the reference numeral 201 represents an air outlet; reference numeral 202 represents the inner wall of the air outlet; reference numeral 231 represents a type 1 vane located so as to be near the inner wall 202 which is one side of the air outlet 201; and reference numeral 210 represents a C-shaped pivotal bearing located at the bottom of the type 1 vane 231. The reference numeral 211 represents a rotational bearing which is also located on the type 1 vane; reference numeral 232 represents a type 2 vane and similar to the type 1 vane is has both a pivotal bearing 210 and a rotational bearing 211 however the two bearings are located closer together than they are in the type 1 vane 231.

The reference numeral 233 represents a series of type 3 vanes located separately between the type 1 vane 231 and the type 2 vane 232. The type 3 vanes are formed in the same manner as the type 1 vane 231 and have similar pivotal bearings 210. Each of the type 3 vanes have an engagement portion 213.

The reference numeral 214 represents a connection arm which has connection shafts 215 at its opposite ends which ensure that it is pivotally held by the rotational bearings 211 of the type 1 and type 2 vanes 231 and 232, respectively. Intermediate connection shafts 216 enable it to be movably fitted into the elongated holes 212 of the engagement portion 213 of the type 3 vanes 233, respectively.

Figure 66:
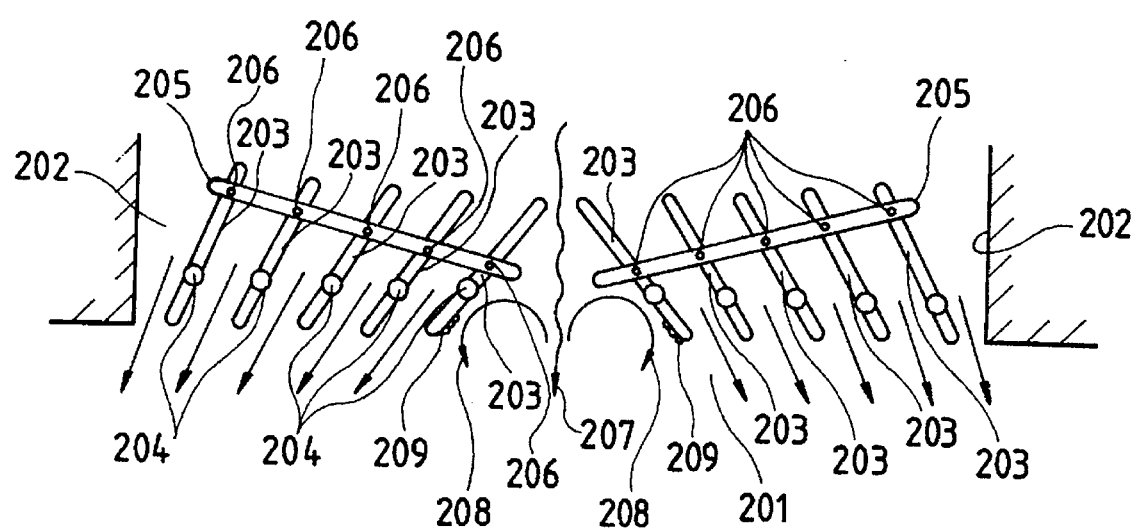
FIG. 66 shows the operational state of the unit of FIG. 65.

In the mechanism for controlling the flow of air from an air conditioning unit configured as described above, the following operation is performed when a left and right group of vanes are arranged as shown in FIG. 66. The type 1, 2, and 3 vanes 231, 232, and 233 are moved in accordance with the lengthwise movement of the connection arm 214 so that they incline as shown in FIG. 66. It is unnecessary to produce the type 3 vanes 233 while the distances between the pivotal bearings 210 and the engagement portions 213 are successively changed in accordance with the positions of the arrangement of the type 3 vanes 233. Accordingly, the type 3 vanes 233 can be produced easily, so that the mechanism can be assembled but simply and easily.

Embodiment 14

Figure 48:
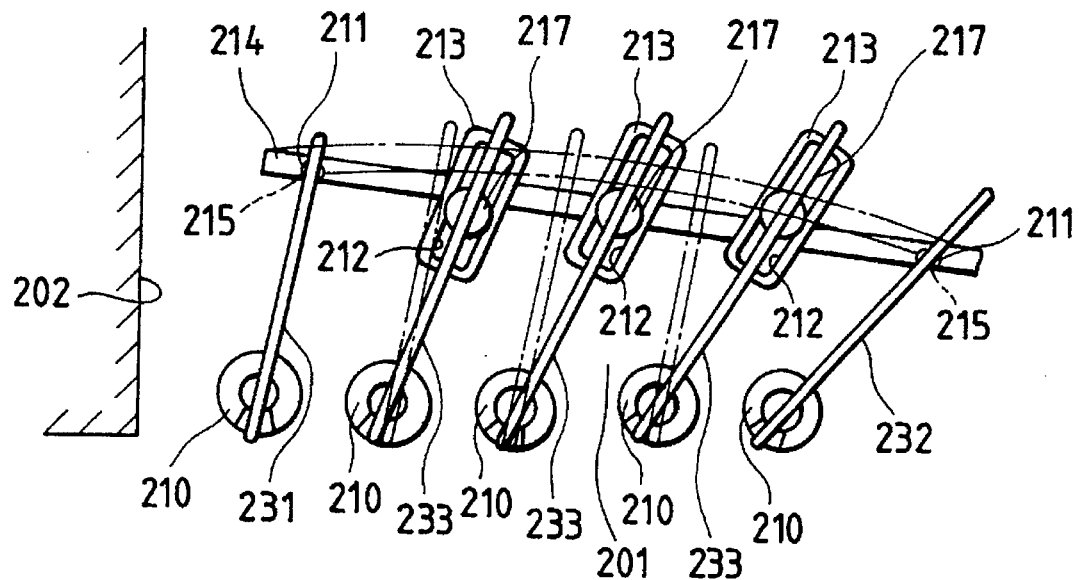
FIG. 48 is a cross sectional plan view of the air-outlet of a fourteenth embodiment of the present invention.
Figure 49:
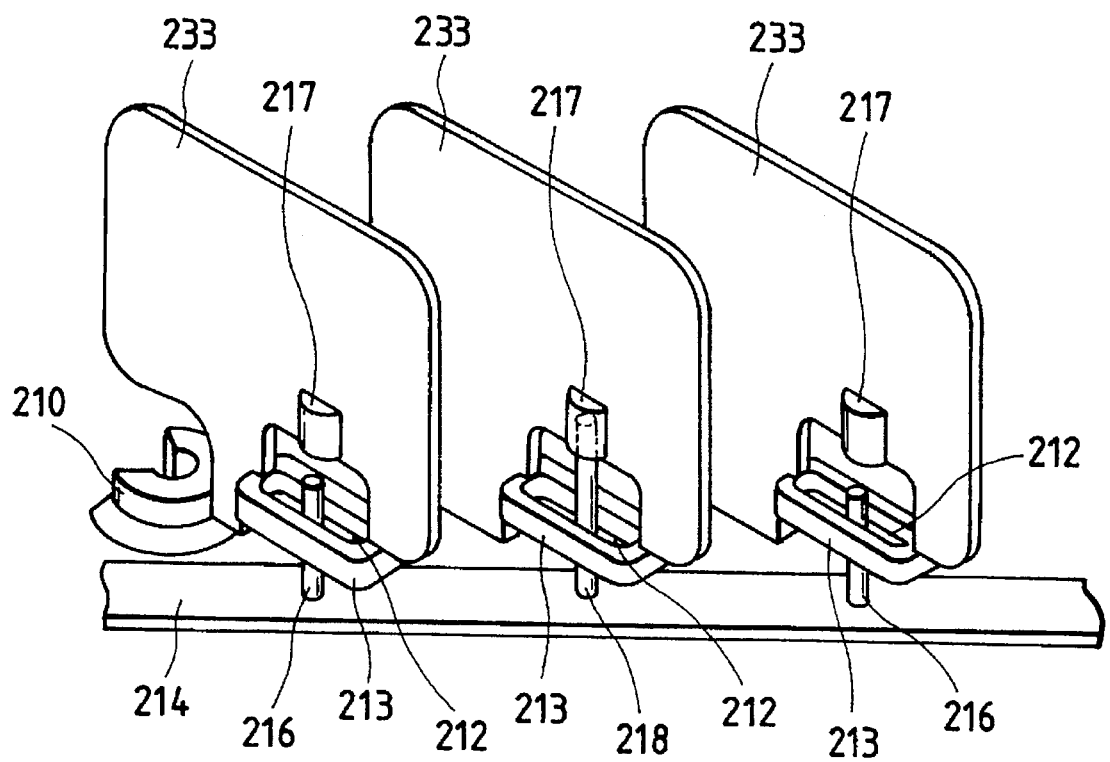
FIG. 49 is an enlarged perspective view of a part of FIG. 48.
Figure 65:
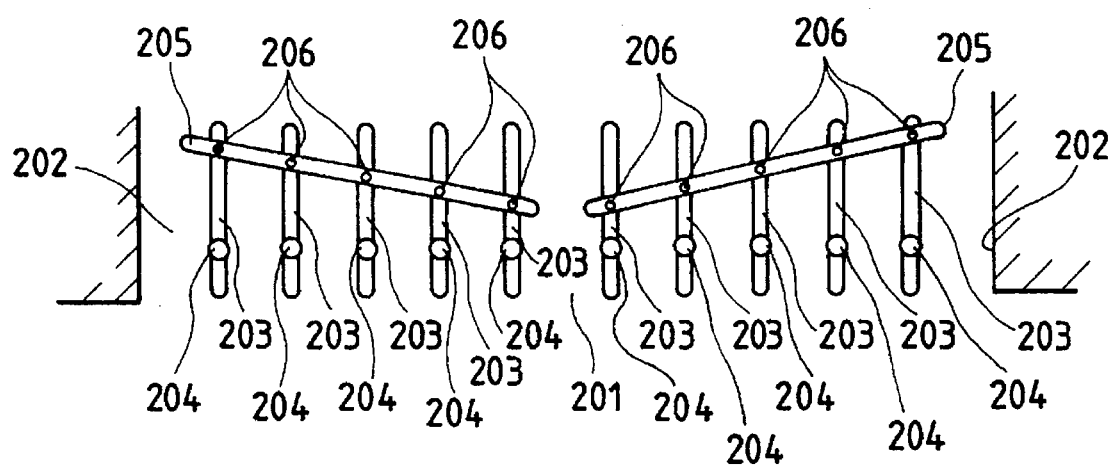
FIG. 65 is a cross-sectional view of showing the mechanism for changing the air direction in a conventional air-conditioning unit.

FIGS. 48 and 49 show another embodiment of the present invention. FIG. 48 is a cross-sectional plan view of an air outlet; and FIG. 49 is an enlarged view of a part of FIG. 48. The parts not shown on these Figures are the same as those of FIG. 65. In the Figures, the reference numeral 201 represents an air outlet; reference numeral 202 represents an inner wall of the air outlet 201; reference numeral 231 represents a type 1 vane located near the inner wall 202; and reference numeral 210 represents a C-shaped pivotal bearing located on one side of the type 1 vane 231. The reference numeral 211 represents a rotational bearing; reference numeral 232 represents a type 2 vane constructed similarly to the type 1 vane so that it has a pivotal bearing 210 and a rotational bearing 211, but the two bearings are arranged at a short distance than in the type 1 vane 231.

The reference numeral 233 represents a series of type 3 vanes located separately between the type 1 and type 2 vanes. The type 3 vanes are constructed similarly to the type 1 vanes 231 and thus have pivotal bearings 210, an engagement portion 213, and the elongated hole 212 along the lengths of the edge portion. The type 3 vanes also have bearing portions 217 located above the elongated holes 212, respectively. The reference numeral 214 represents a connection arm which has connection shafts 315 and is pivotally held by the rotational bearings 211 of the type 1 and type 2 vanes 231 and 232, respectively. Intermediate connection shafts 216 are located at its intermediate portion and are movably fitted into the elongated holes 212 of the engagement portions 213.

In the mechanism configured as described above and in the case when there are two sets of vanes, a right and a left set as shown in FIG. 66, the arrangement is as follows. The pivotal bearings 210 of the three vane types are arranged with the connection arm 214. The type 3 vanes are connected to the connection arm via the intermediate connection shafts 216, movably fitted into the elongated holes 212. The type 1, 2, and 3 vanes are moved within the lengthwise movement of the connection arm 214 so as to be inclined in the same way as those shown in FIG. 66. It is not necessary for the type 3 vanes 233 to be produced while the distances between the pivotal bearings 210 and the engagement portions 213 are successively changed in accordance with the positions of the arrangement of the type 3 vanes 233. Accordingly, the type 3 vanes 233 can be produced easily, so that the mechanism can be assembled simply and easily.

In the embodiment of FIGS. 48 and 49, because the type 3 vanes 233 are located in an intermediate portion and connected to the connection arm 214 through the intermediate joint shaft 218 pivotally held by the bearing portion 217, it is possible to prevent the occurrence of the disadvantage where the connection arm 214 is distorted by air blowing is represented by the chained line in FIG. 48 to shift the inclination angle of the type 3 vane 233 from a predetermined value to thereby spoil the air direction changing effect.

Embodiment 15

Figure 50:
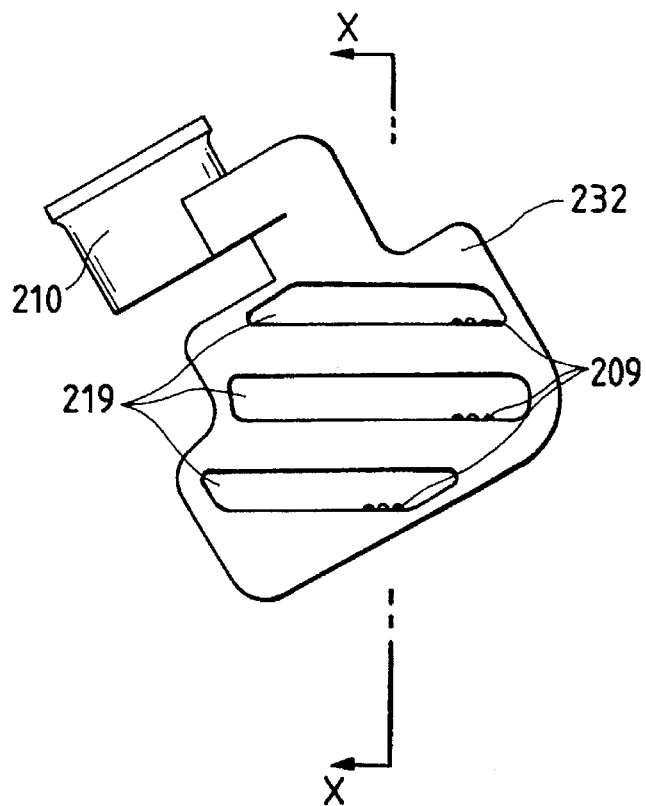
FIG. 50 is a front view of the vanes of a fifteenth embodiment of the present invention.
Figure 51:
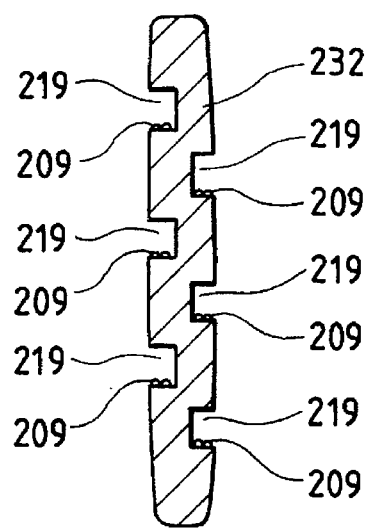
FIG. 51 is an enlarged view of a section along the X—X line in FIG. 50.

FIGS. 50 and 51 show a further embodiment of the present invention. FIG. 50 is a front view of the vane; and FIG. 51 is an enlarged section taken along the line X—X in FIG. 50. The structure not shown in FIGS. 50 and 51 is the same as that of FIG. 65. In the Figures, the reference numeral 232 represents a type 2 vane located in the center of the air outlet 201, said reference numeral 210 represents a C-shaped pivotal bearing obtained by cutting one side of a ring and is located at the bottom side edge of the type 2 vane 232. The reference numeral 219 represents dew-receiving cavities which consist of a series of horizontal grooves arranged separately and parallel to one another, each having a width of about 0.5 mm. Reference numeral 209 represents the dew generated in the type 2 vane 232 and deposited onto the dew receiving cavities 219.

In the mechanism which controls the flow of air from an air conditioning unit, configured as described above and shown in FIG. 66, the following operation is carried out in the case where there is a left and a right group of vanes. In this case, a narrow gap between the type 2 vanes 232 is formed in the center portion. The air 207 blown out through this as shown in FIG. 66 is so weak that secondary air 208 will be entrained. As a result, dew 209 is deposited on the type 2 vanes, reserved in the dew receiving cavities 219, and not blown out into the conditioned room.

Figure 52:
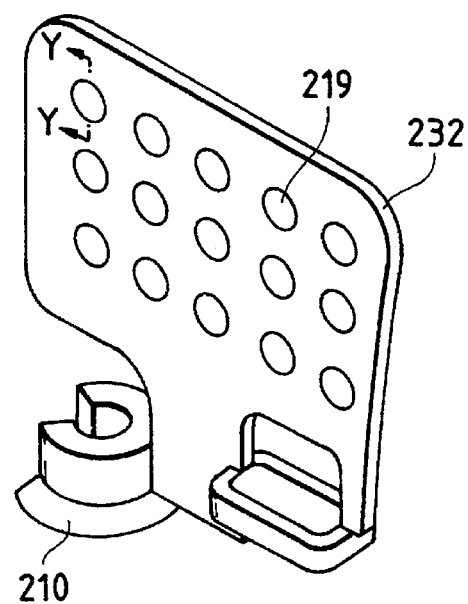
FIG. 52 illustrates a sixteenth embodiment of the present invention and a perspective view corresponding to the above-mentioned FIG. 50.
Figure 53:
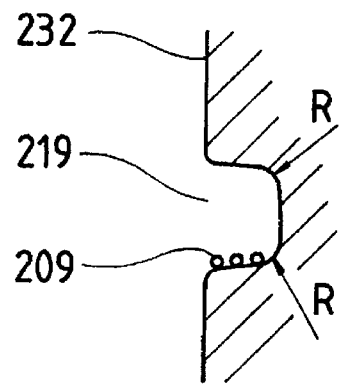
FIG. 53 shows the section along Y—Y line in FIG. 52.
Figure 54:
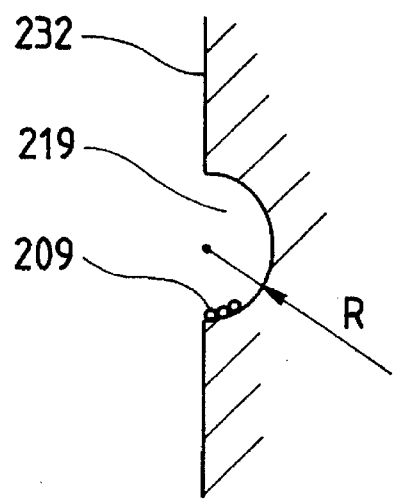
FIG. 54 shows another section along the Y—Y line in FIG. 52.
Figure 55:
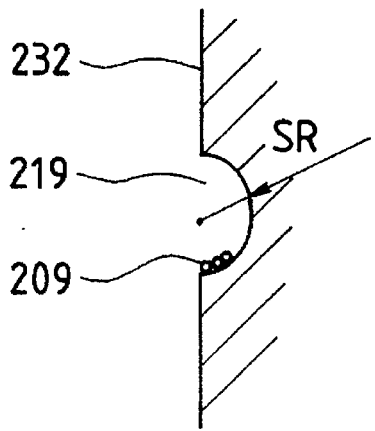
FIG. 55 shows another section along the Y—Y line in FIG. 52.

By applying the embodiment shown in FIGS. 50 and 51, the mechanism for controlling the air flow from an air conditioning unit can be configured easily as shown in FIGS. 52–55. FIG. 52 is a respective view of FIG. 50; and FIGS. 53–55 are views showing sections taken along the line Y—Y in FIG. 52. In the Figures, the reference numeral 219 represents the dew receiving cavities which are shown in various kinds of cross-sectional shapes in FIGS. 53–55 and are arranged separately and parallel to one another. Reference numeral 202 represents dew that has been generated on the type 2 vane 232 and has deposited into the dew receiving cavities 219.

Embodiment 16

Figure 56:
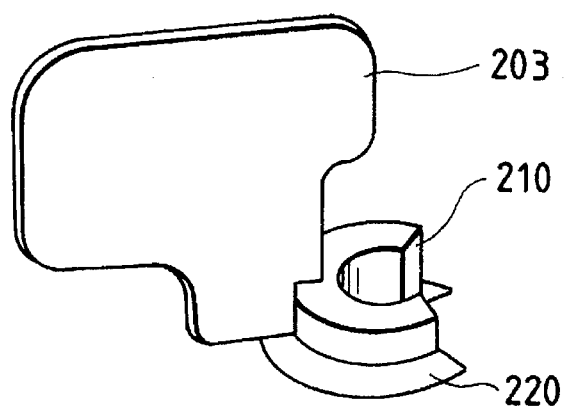
FIG. 56 shows a view of the vanes according to a seventeenth embodiment of the present invention.
Figure 57:
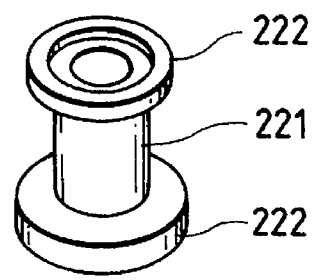
FIG. 57 shows the sleeve which is fitted into the pivotal bearing of FIG. 56.
Figure 58:
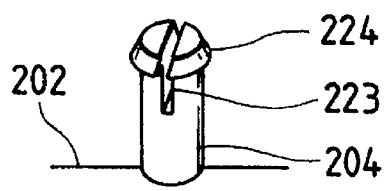
FIG. 58 shows the shaft erected on the inner wall of the air-outlet corresponding to the vane of FIG. 56.
Figure 59:
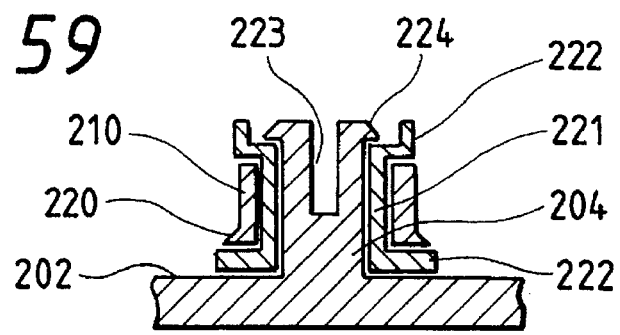
FIG. 59 is a vertical section showing the assembled state of the pivotal bearing of FIG. 56, the sleeve of FIG. 57, and the shaft of FIG. 58.
Figure 60:
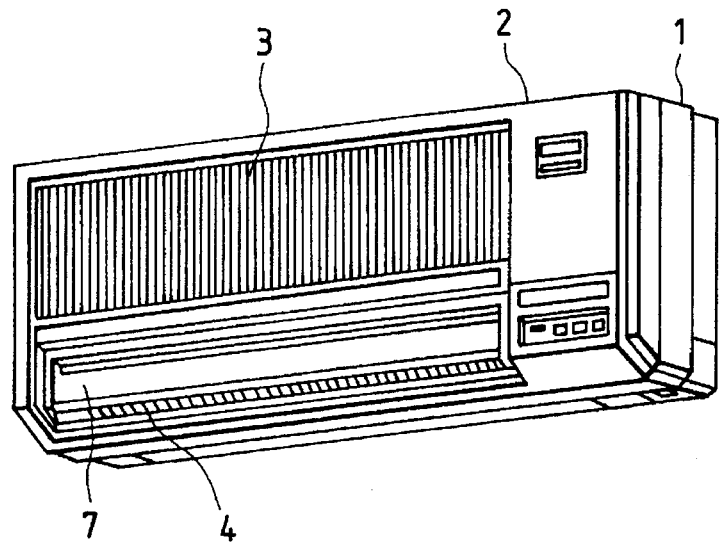
FIG. 60 shows a conventional air-conditioning unit.
Figure 61:
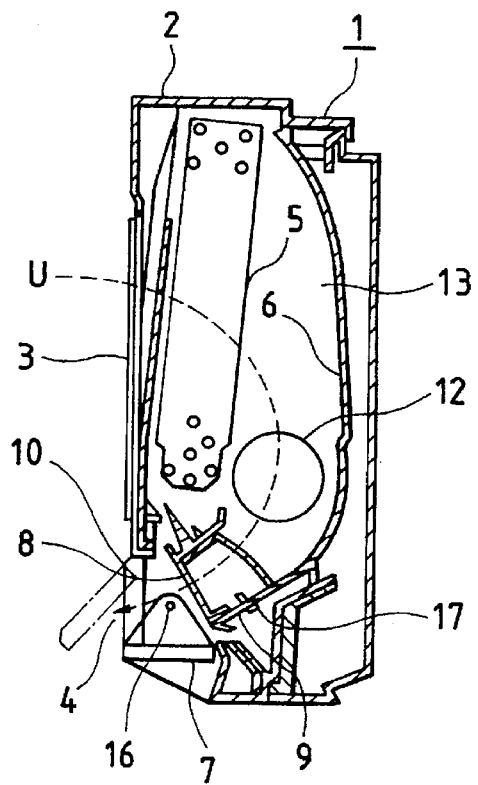
FIG. 61 is a cross sectional view of the conventional air-conditioning unit of FIG. 60.
Figure 62:
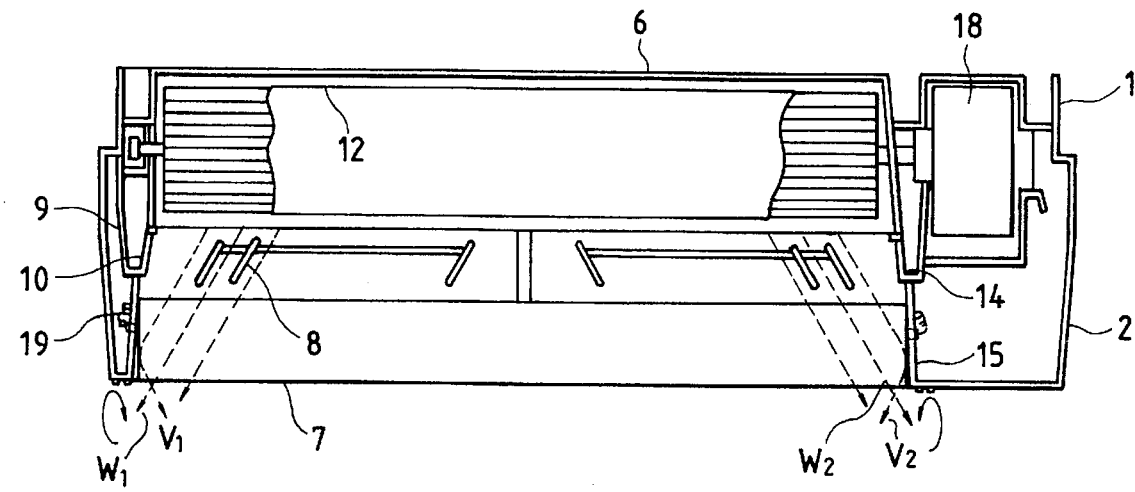
FIG. 62 is a vertical sectional view of the conventional air-conditioning unit of FIG. 60.
Figure 63:
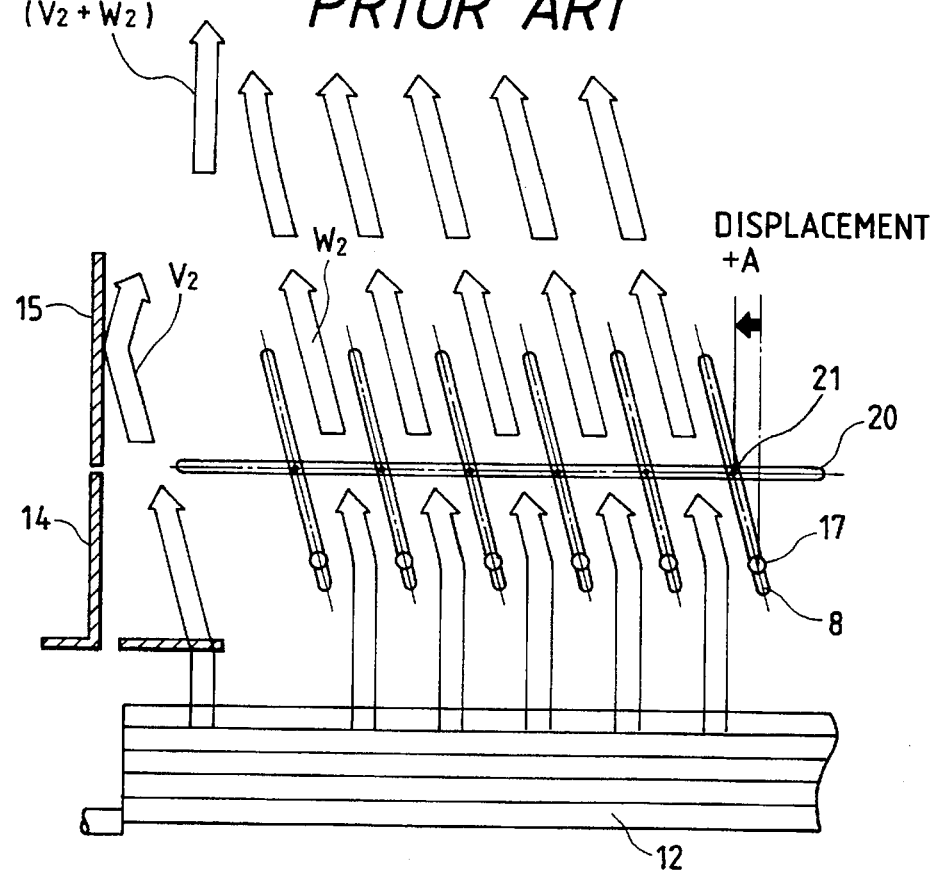
FIG. 63 shows the air flow pattern through the guide vane on the right side of the conventional air-conditioning unit.
Figure 64:
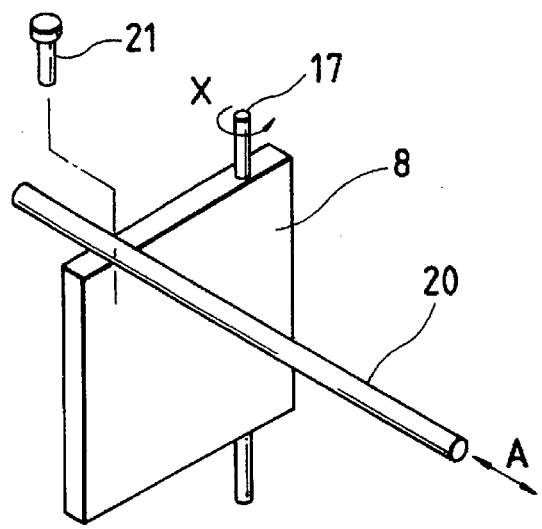
FIG. 64 is a perspective view of the guide vanes of the conventional air-conditioning unit.

FIGS. 56–59 are views showing a further embodiment of the present invention. FIG. 56 shows a guide vane; FIG. 57 shows a sleeve fitted into the pivotal bearing depicted in FIG. 56; FIG. 58 shows a shaft erected from the inner wall of the air outlet; and FIG. 59 shows a cross-section when the pivotal bearing of FIG. 56, the sleeve of FIG. 57, and the shaft of FIG. 58 are assembled together. The overall assembly not shown in FIGS. 56–59 is the same as that of FIG. 65. In the Figures, the reference numeral 210 represents a C-shaped pivotal bearing obtained by cutting one side of a ring, and is located on the lower edge portion of one side of the vane 203 and has a flange 220 at its lower side.

The reference numeral 211 represents a sleeve and has flanges 222 at its upper and lower portions, respectively. These are fitted into the pivotal bearing 210 so as to be held by the pivotal bearing 210. Reference numeral 204 represents a shaft erected from the inner wall 202 of the air outlet 201 and fits into the sleeve 221. In the upper end portion of the shaft 204, there is a groove 223 and a claw 224 projected to prevent the sleeve 221 from dropping out.

In this mechanism for controlling the air flow from an air condition unit configured as described above, two sets of vanes 203, left and right, are assembled as in FIG. 66. The two groups of vanes are arranged so as to be rotatable so that the lower sides are a long way from one another. The vanes 203 are pivotally held, via the sleeve 221 and the pivotal bearings 210, and by the shaft 204 erected from the inner wall 202 as shown in FIG. 59.

For this reason, the vanes 203 rotate smoothly around the shafts 204. The vanes 203 are held by the flanges 220 even when loads perpendicular to the shafts 204 act on the vanes 203. Accordingly, the pivotal bearings 210 and the sleeve 221 can be assembled in advance, so that assembling can be performed easily. Furthermore, the rotations of the vanes can therefore be made smooth and virtually noiseless.

As described above, in this mechanism for controlling the air flow from an air conditioning unit, the guide vanes are controlled so that the angle of inclination of each guide vane becomes larger as the end of the guide vane arrangement is approached. Accordingly, the whole air flow can be blown in the required left/right blowing direction accurately.

In the mechanism for controlling the air flow from an air conditioning unit, the angle of inclination of only the guide vane or vanes situated to the far left or far right of the guide vane arrangement are set to be larger than the remaining vanes. This therefore allows a space to be blocked between the side wall of the unit and a guide vane or vanes. The direction in which the air flow is blown can therefore be carefully controlled.

In the mechanism for controlling the air flow from an air conditioning unit, the side walls of the unit have been made smoothly curved so that the distance between them slowly increases as air flows out of the unit. This shape allows accurate control of the air flow direction even when the guide vanes are set to steep inclination angles.

If two independent driving systems are used to swing the guide vanes from left to right and make the required inclinations, then reduction in cost can be achieved.

If the distances between the rotating centers of the guide vanes and the connection points of the connection member are made different from one another, then only one driving means for swinging the guide vanes from left to right is required. This will result in manufacturing costs being reduced. In the mechanism for controlling the air flow from an air-conditioning unit, if the guide vanes situated to the far left or far right of the arrangement are connected to the unit wall via a bellows-like bulkhead, the space between the wall and the vane can be filled with a sponge-like member. The whole air flow can then be blown accurately in the left or right direction.

In each of the above mechanisms for directing the flow of air, if two independent systems, a left and right system, are used for guide vane control than the unit can be operated in a wide mode even when humans are located at different positions within the space to be conditioned.

In the mechanism for controlling the air flow from an air conditioning unit, the conditioned air flow from the unit can be directed toward a person within the space by using a human sensor.

In the mechanism for controlling the air flow from an air-conditioning unit, two systems (left and right) are used together with a human sensor. This enables the directions of the guide vanes to automatically and independently direct the air flow toward the location or the locations of people within the room. The system can be operated in a wide mode together with automatic adjustment.

In the mechanism for controlling the air flow from an air conditioning unit, the guide vanes are controlled so that the angle of inclination of each guide vane becomes smaller as the end of the arrangement of the guide vanes is approached. When the vane inclination angle or the distance between the guide vane and the air outlet nozzle is large, and when a large part of the air interferes with the wall of the nozzle, an inclination angle of the guide vanes closest to the unit wall can be made smaller so that less interference occurs. The inclination angles of the remaining guide vanes can be made larger so that the resultant direction of air flow is as desired. As air interference with the unit wall causes a pressure drop and consequently a reduction in the volume of air flow, then removing this interference not only increases the accuracy of the air supply but also ensures that the volume of air flow is not decreased.

In the mechanism for controlling the air flow from an air-conditioning unit as mentioned above, the side walls of the unit have been made smoothly curved so that the distance between them slowly increases as the air flows out of the unit. This shape allows accurate control of the air flow direction, even when the guide vanes are set to steep inclination angles.

If two independent driving systems are used to produce the required inclinations of the guide vanes and to swing them from left to right, then a reduction in cost can be achieved.

The guide vanes can be made to swing from left to right with the use of only one driving system. This is achieved by fixing the connection member to the guide vanes via the connection points and making the distance between the rotating centers of the guide vanes and the respective connection points different. By only using one driving system, the reliability of the mechanism is increased and the cost is further reduced.

In the mechanism for controlling the air flow from an air-conditioning unit, if the guide vanes situated to the far left or far right of the guide vane arrangement are connected to the unit wall via a bellows-like bulkhead, the space between the wall and the vane can be filled with a sponge-like member. The whole air flow can then be blown accurately in the left or right direction.

In each of the above mechanisms for directing the flow of air, if two independent systems (a left and a right system) are used for guide vane control, then the unit can be operated in a wide mode even when humans are located at different positions within the space.

In the mechanism for controlling the air flow from an air-conditioning unit, the conditioned air flow from the unit can be directed toward a person within the space by using a human sensor.

In the mechanism for controlling the air flow from an air-conditioning unit, two systems (left and right) are used together with a human sensor. This enables the directions of the guide vanes to automatically and independently direct the air flow toward the location or locations of people within the room. This system can be operated in a wide mode together with automatic adjustment.

The mechanism for controlling the air flow from an air-conditioning unit consists of a cross flow fan which is in the body of the unit, up/down air deflection plates located at the air outlet, a series of left/right air deflection plates connected to one another, a motor which changes the angles of the left/right air deflection plates, and a controller which ensures that the rotational speed of the fan is increased when the angles of the left/right air deflection plates exceed a predetermined angle. Increasing the fan speed ensures that the quantity of blown air remains approximately the same. This enables the temperature of the air in an air heating mode to be kept comparatively high, ensures that secondary air is not entrained onto the air outlet to create dew, and enables the warm air in an air heating mode to reach the floor.

The mechanism for controlling the air flow from an air conditioning unit consists of a cross flow fan which is located in the body of the unit, up/down air deflection plates located at the air outlet, a series of left/right air deflection plates connected to one another, a motor which changes the angles of the left/right air deflection plates, and a controller which ensures that the deflection angle is changed by the motor when the angle of the deflection plates exceed a predetermined angle. The up/down air deflection plate directs air downward in an air cooling mode and upward in an air heating mode. When the deflection angle is larger than the predetermined value and the system is in a cooling or heating mode, the up/down air deflection plates direct air more upward and more downward than when in a normal state.

The mechanism for controlling the air flow from an air conditioning unit consists of a cross flow fan which is located in the body of the unit, up/down air deflection plates located at the air outlet, a series of left/right air deflection plates connected to one another, a motor which changes the angles of the left/right air deflection plates, and a controller to ensure that the angles of the left/right air deflection plates are reduced in a cooling mode and increased in a heating mode. This prevents dew formation in an air cooling mode and ensures that warm air reaches the necessary part of the space rapidly in a heating mode. Comfort in the conditioned space is therefore increased.

The mechanism for controlling the air flow from an air-conditioning unit consists of a cross flow fan which is located in the body of the unit, up/down air deflection plates located at the air outlet, a series of left/right air deflection plates connected to one another, a motor which changes the angles of the left/right air deflection plates, and a controller which ensures that in an air cooling mode, when the angles of the left/right air deflection plates are greater than a predetermined value, the angles of the left/right deflection plates will be reduced after a certain period of time has elapsed from the start of the cooling operation. When the air cooling operation starts, cool air will be delivered to positions in the space that humans do not occupy. As the temperature of the space and the cool air flow equalize, cool air flow will gradually be directed toward the humans. This operation succeeds in increasing space comfort level together with preventing dew deposition upon the air outlet.

The mechanism for controlling the air flow from an air-conditioning unit consists of a cross flow fan which is located in the body of the unit, up/down air deflection plates located at the air outlet, a series of left/right air deflection plates connected to one another, a motor for changing the angles of the left/right air deflection plates, and a controller which ensures that when the unit is located close to a wall, the air deflection plates deflect the air flow so that it is not incident on the wall. It is therefore possible to mount a unit close to a wall without fear of reducing its heating or cooling performance.

The mechanism for controlling the flow of air from the air conditioning unit has three types of vanes. These are mounted in the air outlet via a pivotal bearing and make rotational movement to direct the flow of air. Vanes 1 and 2 are located at opposite ends of the series of vanes and both have rotational bearings. The rotational and pivotal bearings of vane 2 are closer together than those in vane 1. The rotational bearings of vanes 1 and 2 are connected by a connection arm. From this arm intermediate connection shafts are pivotally connected into the movable fittings of vanes 3. These movable fittings consist of elongated holes having a length equal to the bottom of the type 3 vanes. Construction of a mechanism in this way makes it unnecessary to make the distance between the pivotal bearings and the engagement portions of the type 3 vanes gradually different relative to the position of the vane. Therefore, manufacturing and assembly can be simplified and the cost subsequently reduced.

The mechanism for controlling the flow of air from an air-conditioning unit has three types of vanes. There are mounted in the air outlet via a pivotal bearing and make rotational movement to direct the flow of air. Vanes 1 and 2 are located at opposite ends of the series of vanes 3 and both have rotational bearings. The rotational and pivotal bearings of vane 2 are closer together than those in vane 1. The rotational bearings of vanes 1 and 2 are connected by a connection arm. From this arm intermediate connection shafts are pivotally connected into the movable fittings of vane 3. These movable fittings consist of a bearing located above an elongated hole which is the length of the bottom of the type 3 vane. This bearing pivotally holds the intermediate joint shaft which is connected to the intermediate connection shaft. This connection prevents the connection arm from bending and subsequently the vanes can be moved in the required direction to accurately supply air to the space. Another advantage is that by constructing the mechanism in this way, it is not necessary to make the distance between the pivotal bearings and the engagement portion of the type 3 vanes gradually different relative to the position of the vane. Therefore manufacturing and assembly methods can be simplified and cost subsequently reduced.

A mechanism for controlling the flow of air from the air-conditioning apparatus has two series of vanes located in the left and right sides of an air outlet. Both series of vanes make rotational movement in opposite directions and thereby change the air direction. A narrow space between the left and right groups of vanes is formed. Air being blown out through the space is weak so entrained secondary air generates dew drops. These are reserved in dew receiving cavities and subsequently dew is not blown into the space nor does it fall into the space.

A mechanism for controlling the flow of air from an air conditioning unit is provided with vanes located in an air outlet which make rotational movement to change the direction of air flow. Pivotal bearings located in the edge portions on one side of each of the vanes form a C-shape. Sleeves fitted over the pivotal bearings hold them in place and shafts connected to the unit's inner wall are inserted in the sleeves respectively. The vanes located at the air outlet are therefore pivoted on the shafts erected from the inner wall of the air outlet via the sleeves and the pivotal bearings. The rotational movement of the vanes is therefore quiet and smooth so that noise within the space will be kept to a minimum.

Obviously, numerous additional modifications and variations of the present invention are possible in light of the above teachings. It is therefore, to be understood that within the scope of the appended claims, the invention may be practiced otherwise than as specifically described herein.

What is claimed as new and desired to be secured by Letters Patent of the United States is:

1. A mechanism for controlling the flow of air from an air-conditioning unit, comprising:

a plurality of guide vanes spaced apart and arranged adjacent to one another in a row;

a first rod which is slidably coupled to each of said guide vanes such that, for each of said guide vanes, a distance between a pivot point of the guide vane and a point at which the first rod is slidably coupled to the guide vane is variable;

an outlet nozzle for pivotally holding said plurality of guide vanes; and an air course formed within a body of said air conditioning unit, wherein said plurality of guide vanes are positioned at a lower end of said air course and control said flow of air from said air-conditioning unit in both left and right directions.

2. The mechanism according to claim 1, wherein angles of inclination of each of said guide vanes are equal.

3. The mechanism according to claim 1, wherein angles of inclination of said guide vanes are a maximum for a guide vane at a center of said row and become progressively smaller for guide vanes toward each end of said row.

4. The mechanism according to claim 1, wherein angles of inclination of said guide vanes are a minimum for a guide vane at a center of said row and become progressively larger for guide vanes toward each end of said row.

5. The mechanism according to claim 1, further comprising a second rod slidably coupled to a guide vane located at least at one extreme end of said row and rotatably coupled to said first rod such that an angle of inclination of said guide vane located at least one extreme end of said row can be made larger than angles of inclination of all others of said plurality of guide vanes.

6. A mechanism for controlling the flow of air from an air-conditioning unit, comprising:

a plurality of guide vanes spaced apart and arranged adjacent to one another in a row;

a first rod which is slidably coupled to each of said guide vanes;

a second rod slidably coupled to a guide vane located at least at one extreme end of said row and rotatably coupled to said first rod such that an angle of inclination of said guide vane located at least at one extreme end of said row can be made larger than angles of inclination of all others of said plurality of guide vanes;

an outlet nozzle for pivotally holding said plurality of guide vanes; and an air course formed within a body of said air conditioning unit, wherein said plurality of guide vanes are positioned at a lower end of said air course such that at least a portion of said outlet nozzle is blocked between said guide vane located at least at one extreme end of said row and said body of said air conditioning unit.

7. The mechanism according to any of claims 1 or 6, wherein each of said plurality of guide vanes that is not located at an extreme end of said row is inclined at an angle of a magnitude which is parallel to a direction of said flow of air, and wherein said air conditioning unit comprises left and right side walls which are formed of smoothly curved surfaces to enable a cross-sectional area of said air to gradually become larger as it is blown out of said air conditioning unit.

8. A mechanism according to claim 7, wherein said plurality of guide vanes are controlled by two driving systems which swing each of said plurality of guide vanes in the left and right directions in order to set each of said plurality of guide vanes at appropriate angles of inclination with respect to a direction of said flow of air from said air-conditioning unit.

9. The mechanism according to claim 7, further comprising a connection member which is connected to each of said plurality of guide vanes such that for a given one of said plurality of guide vanes, a distance between a point about which said guide vane rotates and a point at which said connection member is connected to said guide vane is different than corresponding distances for all others of said plurality of guide vanes.

10. A mechanism according to any of claims 1 or 6, wherein said plurality of guide vanes is divided into a left set of guide vanes and a right set of guide vanes, and separate left and right driving systems are provided to independently control said left set of guide vanes and said right set of guide vanes, respectively.

* * * * *